(12) United States Patent
Yang et al.

(10) Patent No.: US 12,320,780 B2
(45) Date of Patent: Jun. 3, 2025

(54) WHISPERING GALLERY MODE RESONATORS FOR SENSING APPLICATIONS

(71) Applicant: DeepSight Technology, Inc., Los Altos, CA (US)

(72) Inventors: Lan Yang, Clayton, MO (US); Jiangang Zhu, University City, MO (US); Guangming Zhao, St. Louis, MO (US); Scott A. Miller, Ithaca, NY (US); Danhua Zhao, San Jose, CA (US); Liren Zhu, Sunnyvale, CA (US)

(73) Assignee: DEEPSIGHT TECHNOLOGY, INC., Santa Clara, CA (US)

( * ) Notice: Subject to any disclaimer, the term of this patent is extended or adjusted under 35 U.S.C. 154(b) by 21 days.

(21) Appl. No.: 17/832,507

(22) Filed: Jun. 3, 2022

(65) Prior Publication Data
US 2022/0365036 A1    Nov. 17, 2022

Related U.S. Application Data

(63) Continuation of application No. PCT/US2020/064094, filed on Dec. 9, 2020.
(Continued)

(51) Int. Cl.
*G01N 29/24* (2006.01)
*G01N 29/12* (2006.01)
*G02B 6/293* (2006.01)

(52) U.S. Cl.
CPC ......... *G01N 29/2418* (2013.01); *G01N 29/12* (2013.01); *G01N 29/2406* (2013.01);
(Continued)

(58) Field of Classification Search
None
See application file for complete search history.

(56) References Cited

U.S. PATENT DOCUMENTS 5,581,642 A * 12/1996 Deacon ................ G02F 1/313
385/40
6,490,039 B2   12/2002 Maleki et al.
(Continued)

FOREIGN PATENT DOCUMENTS

CN    101750280 A    6/2010
CN    112666562 A    4/2021
(Continued)

OTHER PUBLICATIONS

Bae et al. (2008). "A new ultrasonic Synthetic Aperture tissue Harmonic imaging system," 2008 IEEE Ultrasonics Symposium, pp. 1258-1261.
(Continued)

*Primary Examiner* — Isam A Alsomiri
*Assistant Examiner* — Vikas Atmakuri
(74) *Attorney, Agent, or Firm* — FINNEGAN, HENDERSON, FARABOW, GARRETT & DUNNER, LLP

(57) ABSTRACT

Sensing apparatuses and method of making the sensing apparatuses are disclosed herein. In some variations, a sensing apparatus can comprise at least one optical waveguide, and at least one whispering gallery mode (WGM) resonator configured to propagate a set of WGMs, where the WGM resonator communicates to the at least one optical waveguide a set of signals corresponding to the set of WGMs. In some variations, a polymer structure may encapsulate the at least one WGM resonator and/or the at least one optical waveguide. Furthermore, in some variations, the WGM resonator(s) may have one or more selectable modes with different bandwidth and sensitivity for sensing, which
(Continued)

may, for example, enable tailoring the sensing apparatus to specific applications having certain bandwidth and/or sensitivity requirements.

32 Claims, 36 Drawing Sheets

Related U.S. Application Data

(60) Provisional application No. 62/945,538, filed on Dec. 9, 2019.

(52) U.S. Cl.
CPC ..... *G01N 29/2437* (2013.01); *G02B 6/29341* (2013.01); *G01N 2291/044* (2013.01); *G01N 2291/106* (2013.01)

(56) References Cited

U.S. PATENT DOCUMENTS

| | | | |
|---|---|---|---|
| 6,795,481 B2 | 9/2004 | Malekl et al. | |
| 6,861,978 B2 | 3/2005 | Lam | |
| 7,184,624 B1 | 2/2007 | Matsko et al. | |
| 7,545,843 B2 | 6/2009 | Armani et al. | |
| 7,781,217 B2 | 8/2010 | Armani et al. | |
| 7,914,454 B2 | 3/2011 | Weber et al. | |
| 8,437,591 B1* | 5/2013 | Lu | G01N 21/7746 385/27 |
| 8,493,560 B2 | 7/2013 | Shopova et al. | |
| 8,515,227 B2* | 8/2013 | Sumetsky | G02B 6/29335 250/227.24 |
| 8,582,929 B2* | 11/2013 | Yi | G02F 1/2257 385/40 |
| 9,354,174 B2 | 5/2016 | Poetter et al. | |
| 9,554,774 B2 | 1/2017 | Moore et al. | |
| 9,588,061 B2 | 3/2017 | Sun et al. | |
| 9,733,125 B2 | 8/2017 | Liu et al. | |
| 9,846,126 B2 | 12/2017 | Gunn, III et al. | |
| 11,041,811 B2 | 6/2021 | Gunn, III et al. | |
| 2004/0022513 A1* | 2/2004 | Hryniewicz | G02B 6/132 385/131 |
| 2005/0263679 A1* | 12/2005 | Fan | G02B 6/4246 250/214.1 |
| 2007/0269901 A1* | 11/2007 | Armani | H01S 3/083 436/164 |
| 2008/0095490 A1* | 4/2008 | Ashkenazi | G02B 6/138 385/13 |
| 2013/0018266 A1* | 1/2013 | Nishikubo | A61B 8/4488 29/25.35 |
| 2014/0360273 A1* | 12/2014 | Zhang | G01N 21/1702 73/643 |
| 2016/0266110 A1 | 9/2016 | Ozdemir et al. | |
| 2016/0273943 A1* | 9/2016 | Grubel | G01H 9/00 |
| 2018/0164307 A1* | 6/2018 | Ozdemir | G01N 15/1463 |
| 2018/0238833 A1* | 8/2018 | Somekh | G01N 29/036 |
| 2018/0306696 A1* | 10/2018 | Ozdemir | G01N 21/7746 |
| 2021/0181422 A1 | 6/2021 | Lao et al. | |
| 2021/0362145 A1* | 11/2021 | Kim | B06B 1/0696 |
| 2022/0350082 A1* | 11/2022 | Yang | G01H 9/004 |

FOREIGN PATENT DOCUMENTS

| | | |
|---|---|---|
| CN | 112690827 A | 4/2021 |
| CN | 113177992 A | 7/2021 |
| EP | 3 781 982 A1 | 2/2021 |
| GB | 2557913 A | 7/2018 |
| WO | WO-2007/106601 A2 | 9/2007 |
| WO | WO-2007/106601 A3 | 9/2007 |
| WO | WO-2020/221777 A1 | 11/2020 |
| WO | WO-2021/055823 A2 | 3/2021 |
| WO | WO-2021/055823 A3 | 3/2021 |

OTHER PUBLICATIONS

Bae et al. (2011). "A new extended range ultrasonic synthetic aperture tissue harmonic imaging system," 2011 IEEE International Ultrasonics Symposium, pp. 401-404.
Bao, Y. et al. (2015). "A digitally generated ultrafine optical frequency comb for spectral measurements with 0.01-pm resolution and 0.7-μs response time," Light: Science & Applications, 4(6):e300.
Berneschi, S. et al. (2011). "High Q silica microbubble resonators fabricated by arc discharge," Optics letters 36:3521-3523.
Carmon, T. et al. (2007). "Wavelength-independent coupler from fiber to an on-chip cavity, demonstrated over an 850nm span," Optics Express 15:7677-7681.
Chistiakova, M. et al. (2014). "Photoelastic ultrasound detection using ultrahigh-Q silica optical resonators," Opt. Express 22:28169-28179.
Fan, X. et al. (2007). "Overview of novel integrated optical ring resonator bio/chemical sensors," Laser Resonators and Beam Control IX, vol. 6452, 64520-1-64520-20.
Friederich, F. et al. (2011). "THz Active Imaging Systems with Real-Time Capabilities," IEEE Transactions on Terahertz Science and Technology, vol. 1, No. 1, pp. 183-200.
Gallagher, K.A. et al. (2017), "Static and Moving Target Imaging Using Harmonic Radar," Electronics 6:30.
He, L. et al. (2011). "Detecting single viruses and nanoparticles using whispering gallery microlasers," *Nature Nanotechnology* 6:428-432.
Henze, R. et al. (2011). "Tuning whispering gallery modes using internal aerostatic pressure," Optics letters 36:4536-4538.
International Search Report mailed on Apr. 29, 2021, for PCT Application No. PCT/US2020/064094, filed on Dec. 9, 2020, 7 pages.
International Search Report mailed on Jun. 29, 2021, for PCT Application No. PCT/US2021/022412, filed on Mar. 15, 2021, 4 pages.
International Search Report mailed on Mar. 9, 2021, for PCT Application No. PCT/US2020/051596, filed on Sep. 18, 2020, 3 pages.
Ioppolo, T. et al. (2007). "Pressure tuning of whispering gallery mode resonators," J. Opt. Soc. Am. B. 24:2721-2726.
Jiang, X. et al. (2020). "Whispering-gallery sensors," Matter 3:371-392.
Kim, K.H. et al. (2017). "Air-coupled ultrasound detection using capillary-based optical ring resonators," Scientific Reports 7:109.
Kim, Hyung Ham (May 2010). "Array transducers for high frequency ultrasound imaging," Dissertation, 113 total pages.
Lee, W. et al. (2011). "A quasi-droplet optofluidic ring resonator laser using a micro-bubble," Applied Physics Letters 99:091102.
Li, M. et al. (2013). "Self-referencing optofluidic ring resonator sensor for highly sensitive biomolecular detection," Analytical chemistry 85:9328-9332.
Madhvapathy, S. et al. (May 2021). "Ultrasound detection with silicon microring resonators," Electrical Engineering and Computer Sciences, University of California, Berkeley, Technical Report No. UCB/EECS-2021-123, 53 total pages.
Maxwell, A. et al. (2020). " Polymer microring resonators for high-frequency ultrasound detection and imaging"; IEEE J. Sel. Top Quantum Electron 14:191-197.
Minamikawa, T. et al. (2017). "Optical-frequency-comb based ultrasound sensor," Photons Plus Ultrasound: Imaging and Sensing 2017, Proceedings vol. 10064, SPIE BiOS 2017, 7 total pages.
Monifi, F. et al. (2013). "Encapsulation of a fiber taper coupled microtoroid resonator in a polymer matrix"; pp. 1-6, located at https://arxiv.org/pdf/1304.6423.pdf, 6 total pages.
Monifi, F. et al. (2013). "Ultrasound sensing using a fiber coupled silica microtorold resonator encapsulated in a polymer," IEEE Photonics Conference, Bellevue, WA, USA, pp. 215-216.
Monifi, F. et al. (2012). "A robust and tunable add-drop filter using whispering gallery mode microtoroid resonator," Journal of Lightwave Technology 30:3306-3315.

(56) References Cited

OTHER PUBLICATIONS

Nikolov, S.I. et al. (2015). "Synthetic aperture imaging using a semi-analytic model for the transmit beams," 2015 IEEE International Ultrasonics Symposium (IUS), pp. 1-4.

Petermann, A.B. et al. (2017). "Polymer WGM arrays for optical sensing applications," 2017 Conference on Lasers and Electro-Optics Europe & European Quantum Electronics Conference (CLEO/Europe-EQEC), 1 total page.

Rasmussen, J.H. et al. (2012). "Implementation of tissue harmonic synthetic aperture imaging on a commercial ultrasound system," 2012 IEEE International Ultrasonics Symposium, pp. 121-125.

Rasmussen, J.H. et al. (2013). "Preliminary study of synthetic aperture tissue harmonic imaging on in-vivo data," Proceedings vol. 8675, SPIE Medical Imaging 2013: Ultrasonic Imaging, Tomography, Jand Therapy, 867512.

Seo, H. et al. (2019). "Synthetic aperture imaging of contact acoustic nonlinearity to visualize the closing interfaces using toneburst ultrasonic waves," Mechanical Systems and Signal Processing 125:257-274.

Srinivasan, K. et al. (2004). "Optical-fiber-based measurement of an ultrasmall volume high-Q photonic crystal microcavity," Physical Review B. 70:081306-1-081306-4.

Sumetsky, M. et al. (2010). "Optical microbubble resonator," Optics Letters 35:898-900.

Thijssen J.M. et al. (2014). "Cardiological Ultrasound Imaging." Curr Pharm Des. 20:6150-6161.

Vollmer, F. et al. (2012). "Label-free detection with high-Q microcavities: a review of blosensing Imechanisms for integrated devices," Nanophotonics 1(3-4):267-291.

Ward, J.M. et al. (2014). "Hollow core, whispering gallery resonator sensors," The European Physical Journal Special Topics 223:1917-1935.

Ward, J.M. et al. (2013). "Highly Sensitive Temperature Measurements with Liquid-Core Microbubble Resonators," IEEE Photonics Technology Letters 25:2350-2353.

Watkins, A. et al. (2011). "Single-input spherical microbubble resonator," Optics letters 36:2113-2115.

Wells, P.N.T. (1999). "Ultrasonic imaging of the human body," Rep. Prog. Phys. 62:671-722.

Written Opinion of the International Searching Authority mailed on Apr. 29, 2021, for PCT Application No. PCT/US2020/064094, filed on Dec. 9, 2020, 11 pages.

Written Opinion of the International Searching Authority malled on Jun. 29, 2021, for PCT Application No. PCT/US2021/022412, filed on Mar. 15, 2021, 7 pages.

Written Opinion of the International Searching Authority mailed on Mar. 9, 2021, for PCT Application No. PCT/US2020/051596, filed on Sep. 18, 2020, 10 pages.

Yang, Y. et al. (2014). "Quasi-droplet microbubbles for high resolution sensing applications," Optics lexpress 22:6881-6898.

Monifi, et al., "Ultrasound Sensing Using a Fiber Coupled Silica Microtoroid Resonator Encapsulated in a Polymer", 2013 IEEE Photonics Conference, Bellevue, WA, USA, doi: 10.1109/IPCon.2013.6656511, 2013, pp. 2015-2016.

Wei, et al., "High-Frequency Ultrasonic Sensor Arrays Based on Optical Micro-ring Resonators", Proc. SPIE 10600, Health Monitoring of Structural and Biological Systems XII, 1060003, Mar. 27, 2018, 8 pages.

Canadian Application No. 158,849, "Office Action", Feb. 23, 2024, 4 pages.

Monifi et al., "Ultrasound Sensing Using a Fiber Coupled Silica Microtoroid Resonator Encapsulated in a Polymer", Institute of Electrical and Electronics Engineers Photonics Conference, Sep. 2013, pp. 215-216.

Wei et al., "High-Frequency Ultrasonic Sensor Arrays Based on Optical Micro-ring Resonators", Health Monitoring of Structural and Biological Systems XII, Mar. 27, 2018, 8 pages.

Basiri-Esfahani, S. et al., "Precision ultrasound sensing on a chip", Nature Communications, 2019,10:132, https://doi.org/10.1038/s41467-018-08038-4, 9 pages.

Shi, L. et al., "In-fiber Whispering-Gallery-Mode Resonator Fabricated by Femtosecond Laser Micromachining", Optics Letters, vol. 40, No. 16, Aug. 2015, 4 pages.

Pongruengkiat, W., et al., "Whispering-Gallery Mode Resonators for Detecting Cancer", "Journal Sensors", Faculty of Biomedical Engineering, Rangsit University, Pathum Thani 12000, Thailand; doi:10.3390/s17092095, 2017, 25 pages.

Maxwell, A. et al., "Polymer Microring Resonators for High-Frequency Ultrasound Detection and Imaging", IEEE J Sel Top Quantum Electron. Jan. 14, 2008(1): 191-197. doi:10.1109/JSTQE.2007.914047, 21 pages.

Huang, S. et al., "Low-Noise Wideband Ultrasound Detection Using Polymer Microring Resonators", Applied Physics Letters 92, 193509, 2008, 3 pages.

\* cited by examiner

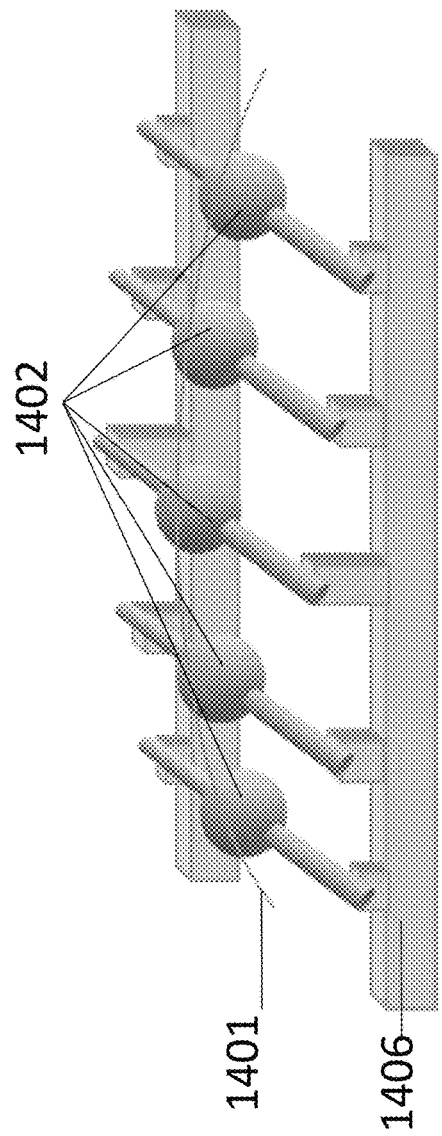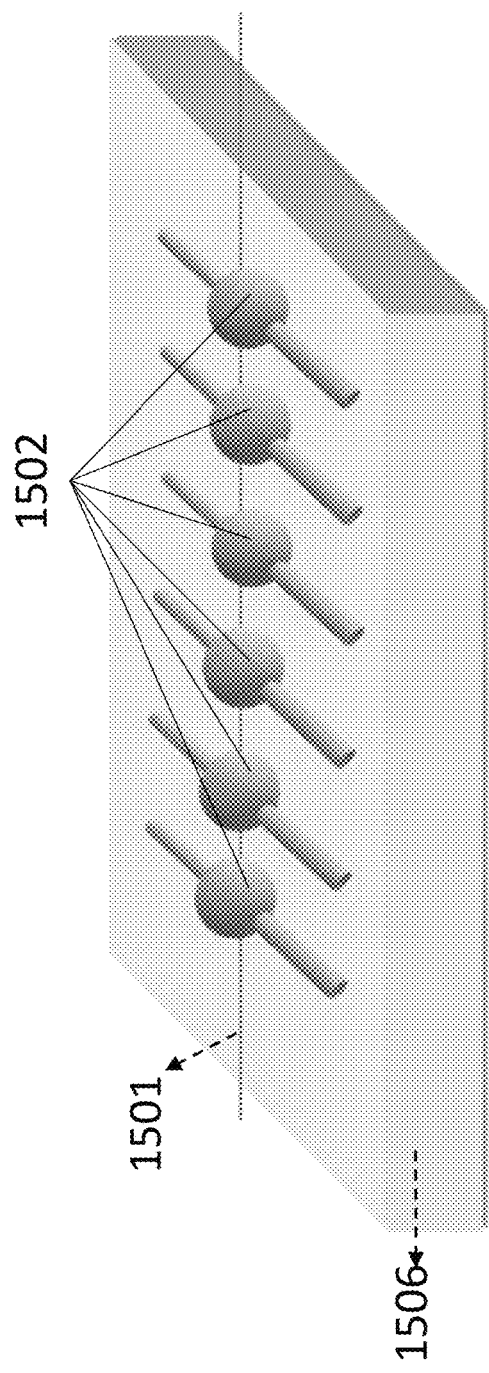

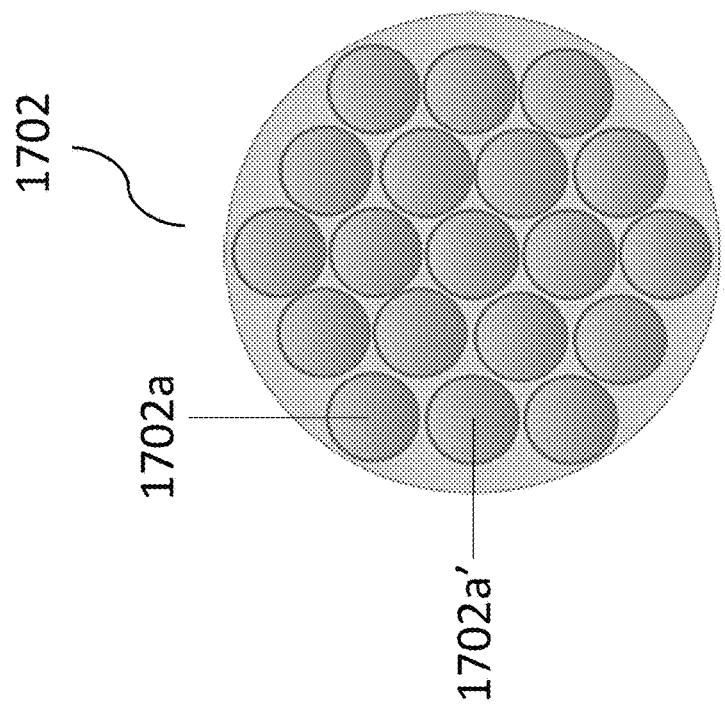
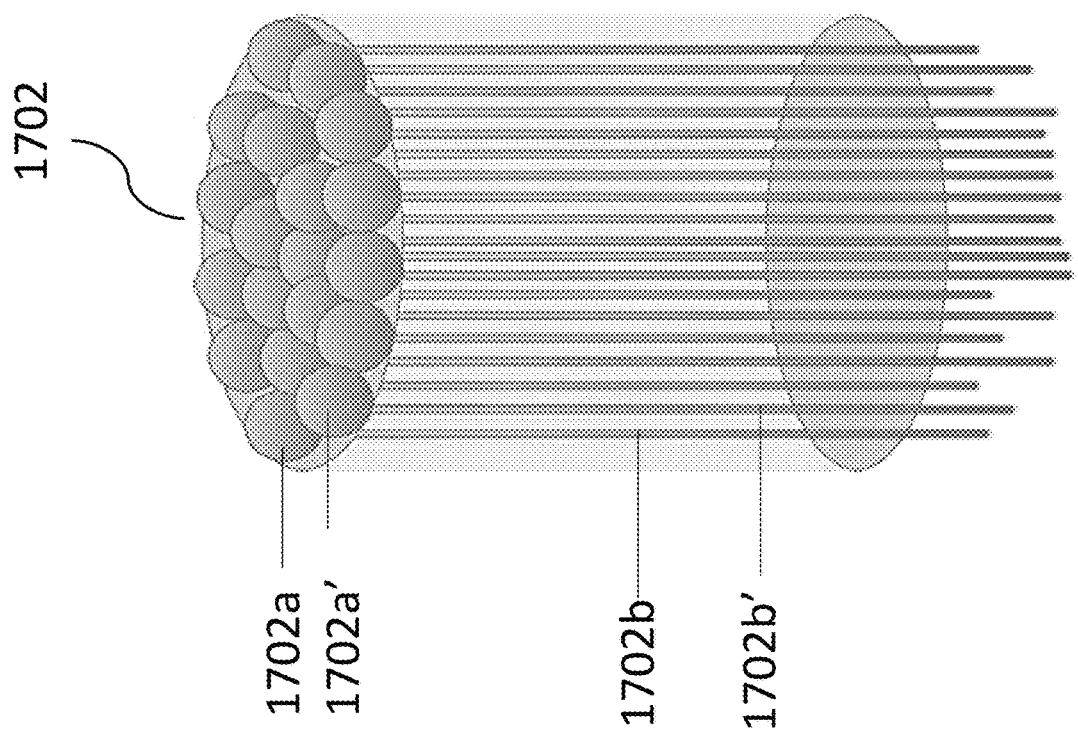
FIG. 17B
FIG. 17A

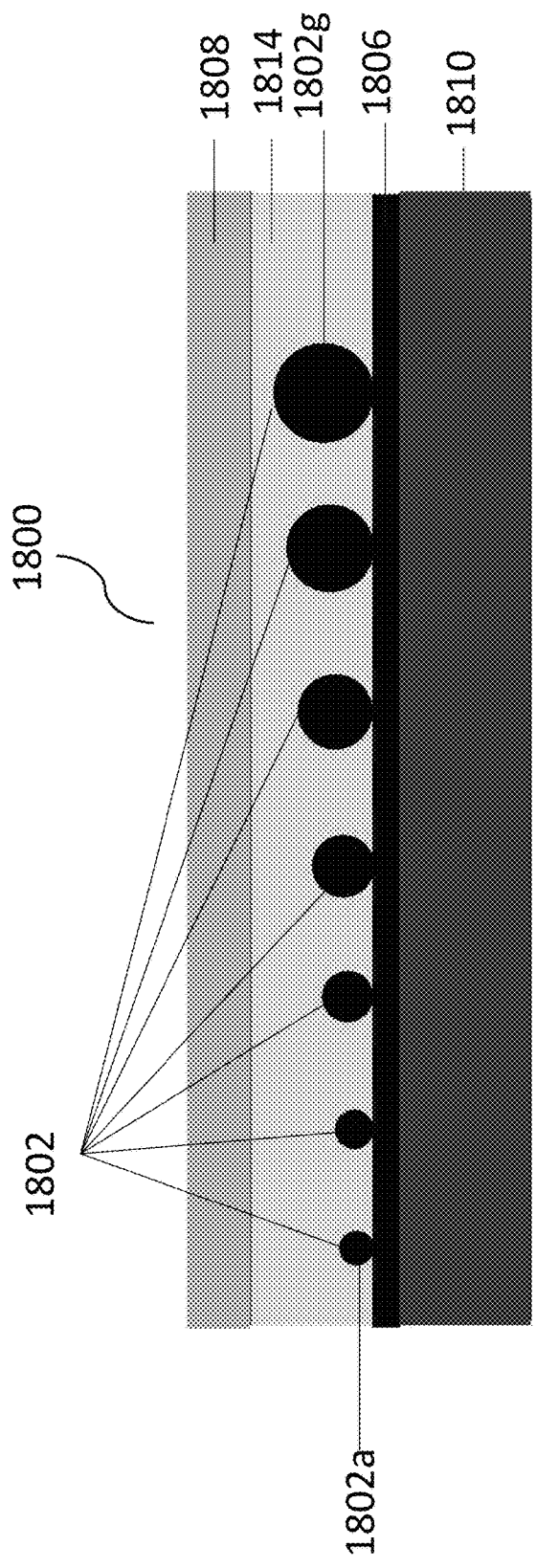
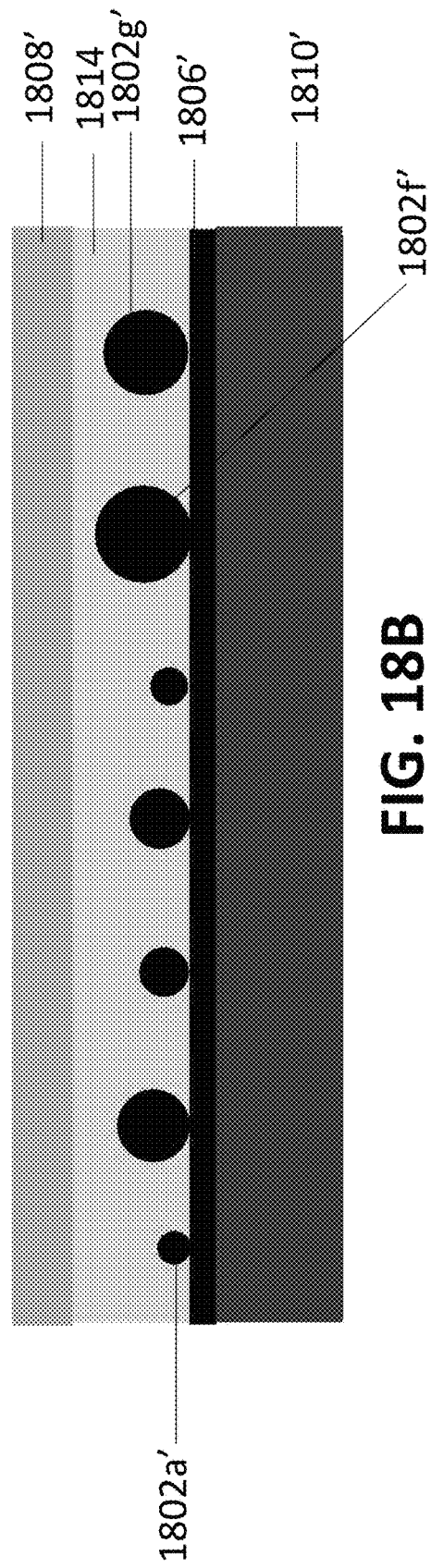
FIG. 18A
FIG. 18B

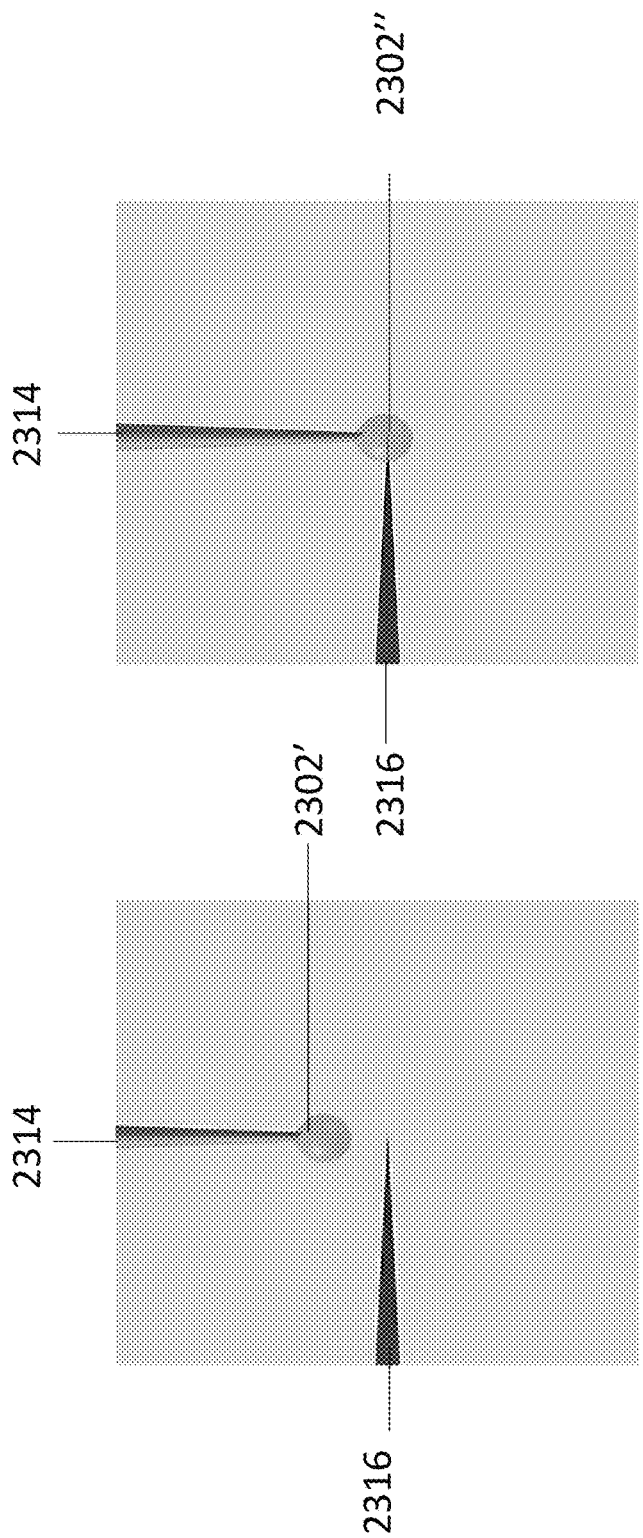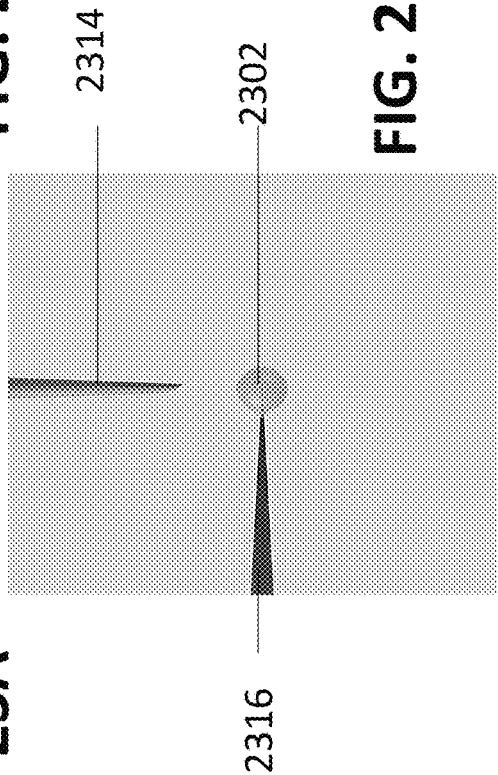
FIG. 23A
FIG. 23B
FIG. 23C

WHISPERING GALLERY MODE RESONATORS FOR SENSING APPLICATIONS

CROSS-REFERENCE TO RELATED APPLICATIONS

This application is a continuation of International PCT Application Serial No. PCT/US2020/064094, filed Dec. 9, 2020, which claims priority to U.S. Patent Application Ser. No. 62/945,538 filed Dec. 9, 2019, each of which is hereby incorporated in its entirety by this reference.

TECHNICAL FIELD

The present disclosure generally relates to the field of sensing platforms, and in particular to methods and devices that use whispering gallery mode (WGM) resonators for ultrasound sensing.

BACKGROUND

Sensing applications using ultrasound sensing are widely preferred due to the advantages that they offer. For example, in the field of medical imaging, ultrasound imaging is known to be an advantageously non-invasive form of imaging.

Conventional ultrasound sensing uses piezoelectric materials such as lead-zirconate-titanate (PZT), polymer thick film (PTF) and polyvinylidene fluoride (PVDF). These materials have several drawbacks. For example, some of the challenges associated with use of piezoelectric materials include high operation voltage requirements, a high electric field requirement (which may cause breakdown and failure), a non-linear response with high hysteresis, and limited angle of detection.

Thus, there is a need for new and improved devices and methods for various sensing applications including ultrasound sensing.

SUMMARY

Generally, in some variations, an apparatus may include at least one optical waveguide, one or more whispering gallery mode (WGM) resonators (e.g., a plurality of WGM resonators), and a polymer structure. Each WGM resonator may be confirgured to propagate a first set of WGMs. The polymer structure may encapsulate the at least one optical waveguide and at least one WGM resonator of the plurality of WGM resonators. The at least one WGM resonator may be optically coupled to the at least one optical waveguide such that the at least one WGM resonator may communicate to the at least one optical waveguide a first set of signals corresponding to the first set of WGMs.

In some variations, the polymer structure may include a backing region and/or a matching region. The backing region may be configured to attenuate residual ultrasound echoes to prevent reverberation. The matching region may be configured to increase a bandwidth of a WGM frequency response of the one or more WGM resonators. Furthermore, the matching region may be additionally configured to improve ultrasound transmission to the one or more WGM resonators.

In some variations, the at least one optical waveguide may be embedded in the backing region. Alternatively, the at least one optical waveguide may be embedded in the matching region. The backing region and/or the matching region may have a refractive index that is lower than the refractive index of the at least one optical waveguide.

In some variations, the at least one WGM resonator may be embedded in the matching region of the polymer structure. The effective refractive index of the polymer structure may be lower than the refractive index of the at least one WGM resonator. In some variations, the polymer structure comprises an ultrasonic enhancement material. The effective acoustic impedance of the polymer structure may match the effective acoustic impedance of the at least one WGM resonator.

In some variations, in response to receiving ultrasound echoes, the at least one WGM resonator may be configured to propagate a second set of WGMs. The at least one WGM resonator may communicate a second set of signals that correspond to the second set of WGMs to the at least one optical waveguide. The apparatus may further include an optical detector that is communicably coupled to the at least one optical waveguide. The at least one optical waveguide may be configured to propagate the first set of signals and the second set of signals to the optical detector. In some variations, a system comprising the apparatus and a plurality of array elements (e.g., a piezoelectric sensor, a single crystal material sensor, a piezoelectric micromachined ultrasound transducer (PMUT), and a capacitive micromachined ultrasound transducer sensor (CMUT)) may be configured to generate a set of ultrasound signals. The ultrasound echoes may correspond to the set of ultrasound signals.

In some variations, the at least one optical waveguide may comprise an optical fiber or an integrated photonic waveguide. In some variations, the at least one optical waveguide may be coupled to a light source. The light source may comprise a broadband light or a tunable laser source.

In some variations, the at least one WGM resonator may be a microsphere resonator or a microbubble resonator. In some variations, the at least one WGM resonator may comprise a hollow chamber (e.g., microbubble resonators). The hollow chamber may include an ultrasonic enhancement material.

In some variations, each WGM resonator of the plurality of WGM resonators may be optically coupled to the at least one optical waveguide. In some variations, the at least one optical waveguide may comprise more than one optical waveguide (e.g., a plurality of optical waveguides). Each WGM resonator may be optically coupled to a respective optical waveguide.

In some variations, at least a portion of the WGM resonators may be grouped in a linear arrangement. The WGM resonators may be equally spaced apart or unequally spaced apart. In other variations, the one or more WGM resonators may be bundled together in a circular arrangement. In some variations, at least some of the WGM resonators of the one or more WGM resonators may be of equal size. Alternatively, at least some of the WGM resonators may be of unequal sizes.

Generally, a method of ultrasound imaging include receiving a first set of signals from at least one optical waveguide. The first set of signals may correspond to a first set of WGMs propagating in one or more WGM resonators (e.g., plurality of WGM resonators). The method may also include receiving a second set of signals from the at least one optical waveguide. The second set of signals may correspond to a second set of WGMs propagating in the one or more WGM resonators in response to the one or more WGM resonators receiving a plurality of ultrasound echoes. The method also includes detecting a set of differences between the first set of signals and the second set of signals. The at least one optical waveguide and the plurality of WGM resonators may be in a polymer structure.

In some variations, the polymer structure may include a backing region and/or a matching region. The backing region can be configured to attenuate residual ultrasound echoes to prevent reverberation. The matching region may be configured to increase a bandwidth of a WGM frequency response of the one or more WGM resonators. Additionally, the matching region may also improve ultrasound transmission to the one or more WGM resonators.

In some variations, the at least one optical waveguide may be in the backing region. Alternatively, the at least one optical waveguide may be in the matching region. The backing region and/or the matching region may have a refractive index that is lower than that of the at least one optical waveguide. In some variations, the one or more WGM resonators may be in the matching region of the polymer structure. The effective refractive index of the polymer structure may be lower than the refractive index of the one or more WGM resonators.

In some variations, the polymer structure may comprise an ultrasonic enhancement material. An effective acoustic impedance of the polymer structure may match an acoustic imependance of the one or more WGM resonators. At least one WGM resonator of the plurality of WGM resonators may comprise at least one of a microsphere and a microbubble.

In some variations, each of the WGM resonator of the one or more WGM resonators may be optically coupled to the at least one optical waveguide. In some variations, the plurality of ultrasound echoes may correspond to a plurality of ultrasound signals.

In some variations, the method of ultrasound imaging may further include performing a synthetic aperture (SA) operation on the first set of signals and the second set of signals. An image of an object may be generated based at least in part on the SA operation. In some variations, the method of ultrasound imaging may further include performing a compressed sensing (CS) operation on the first set of signals and the second set of signals. An image of an object may be generated based at least in part on the CS operation.

Generally, an apparatus may include a WGM resonator that is configured to propagate a set of the WGMs. The WGM resonator may comprise a curved surface. The curved surface may comprise a first spherical segment corresponding to a first mode of the WGM resonator and a second spherical segment corresponding to a second mode of the WGM resonator. The second mode may be of higher frequency than the first mode. The second spherical segment may be covered with a polymer configured to attenuate the second mode. The apparatus may further include an optical waveguide optically coupled to the WGM resonator.

In some variations, a system comprising the apparatus may further include a plurality of array elements configured to generate a set of ultrasound signals. The WGM resonator can be configured to propagate the set of WGMs in response to receiving a plurality of ultrasound echoes corresponding to the set of ultrasound signals.

In some variations, the WGM resonator may be a microsphere or a microbubble resonator. The first spherical segment may not be covered by the polymer. The first mode may be a fundamental mode of the WGM resonator. In some variations, the second spherical segment may be a spherical cap of the WGM resonator. The based of the spherical cap may be between 3 μm and 15 μm distance from an equatorial plane of the WGM resonator.

In some variations, the WGM resonator may comprise a stem side and a non-stem side that is polar opposite the stem side. In some variations, the spherical cap may be on the stem side of the WGM resonator. Alternatively or additionally, the spherical cap may be on the non-stem side of the WGM resonator. In some variations, the second spherical segment may be coated with the polymer. In some variations, the second spherical segment may be encapsulated by the polymer. In some variations, the polymer may have a refractive index that is higher than that of the WGM resonator. In some variations, the polymer may comprise an optical adhesive.

Generally, in some variations, a method for making a WGM resonator may include a WGM resonator comprising a curved surface. The curved surface may comprise a first spherical segment corresponding to a first mode of the WGM resonator and a second spherical segment corresponding to a second mode of the WGM resonator. The second mode may be of a frequency different from the first mode. The method may further include covering the second spherical segment with a polymer configured to attenuate the second mode. The first mode may be a fundamental mode of the WGM resonator.

In some variations, the polymer does not cover the first spherical segment. The second spherical segment may be a spherical cap of the WGM resonator. In some variations, the WGM resonator may comprise a stem side and a non-stem side that is polar opposite to the stem side. The spherical cap may be on the stem side of the WGM resonator. Alternatively or additionally, the spherical cap may be on the non-stem side of the WGM resonator. In some variations, covering the second spherical segment with the polymer coating comprises coating the spherical cap with the polymer. In some variations, covering the second spherical segment with polymer coating comprises submerging the spherical cap into a solution comprising the polymer. The polymer may have a refractive index that is higher than that of the WGM resonator and/or the polymer may comprise an optical adhesive. In some variations, the WGM resonator may be a microsphere or a microbubble resonator.

BRIEF DESCRIPTION OF THE DRAWINGS

FIG. 14 is a schematic description of an exemplary WGM resonator array.

FIG. 15 is a schematic description of an exemplary WGM resonator array.

FIG. 17A is a side view of an exemplary WGM resonator array.

FIG. 17B is a top view of the exemplary WGM resonator array in FIG. 17A.

FIG. 18A is a schematic description of an exemplary variation of a WGM resonator array packaged in a polymer structure.

FIG. 18B is a schematic description an exemplary variation of a WGM resonator array packaged in a polymer structure.

FIGS. 23A-23C are schematic descriptions of an exemplary variation of a method of fabricating a WGM microsphere resonator using a transfer device.

DETAILED DESCRIPTION

Figure 1:
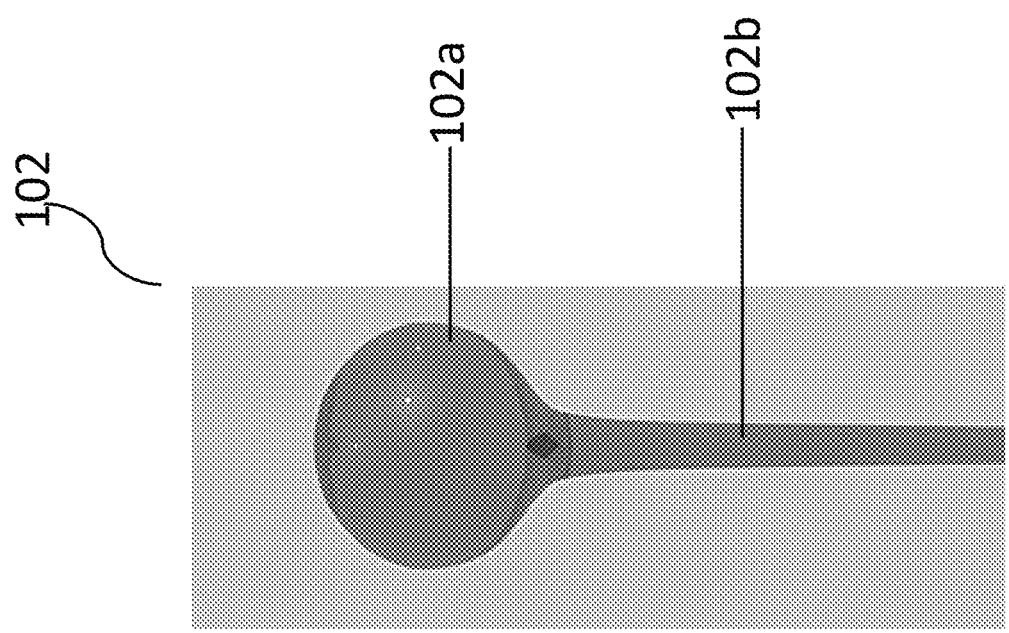
FIG. 1 illustrates an exemplary variation of a whispering gallery mode (WGM) microsphere resonator.

Non-limiting examples of various aspects and variations of the invention are described herein and illustrated in the accompanying drawings.

Systems for optical sensing platforms and methods of making such apparatuses are disclosed herein. More specifically, apparatuses that include whispering gallery mode (WGM) resonators and methods of making such apparatuses are described herein.

Optical sensing platforms are often simple and highly sensitive. They can be used in a variety of different applications (e.g., biosensors, chemical sensors, mechanical sensors, etc.). However, conventional optical sensing platforms have several drawbacks. For example, some conventional optical sensing platforms are fragile and are vulnerable to physical damage. As a result, to protect the conventional optical platforms from physical damage, they may be packaged in a manner such that they are bulky. This can, for example, make some conventional optical sensing platforms less portable.

Furthermore, conventional optical sensing platforms may be susceptible to interference from environmental effects. For instance, ambient light in the environment in which the optical sensing platform is placed in may affect the operation of the optical sensing platform. This in turn may affect the accuracy of the optical sensing platform. Additionally, the operating frequency of some conventional optical sensing platforms may be difficult to control. For instance, for many sensing applications, optical sensing platforms that operate within a sparse spectrum of frequencies may be preferred. This can make the corresponding modes traceable and identifiable which can be advantageous for most sensing applications. But, some conventional optical sensing platforms may not have the ability to limit the operation to a sparse spectrum of frequencies. Put differently, attenuating non-essential frequencies in conventional optical sensing platforms may be difficult.

Therefore, there is an unmet need for sophisticated optical sensing platforms that are compact, portable, and well-suited for sensing applications.

Apparatuses for Sensing Applications

Systems and apparatuses disclosed herein include a whispering gallery mode (WGM) resonator optically coupled to an optical waveguide. When light is coupled to the WGM resonator (e.g., via the optical waveguide), the WGM resonator can propagate a set of WGMs along the surface of the WGM resonator. The WGM resonator can communicate optical signals that correspond to the set of WGMs to the optical waveguide.

In some variations, the WGM resonator and the optically coupled optical waveguide may be encapsulated in a polymer structure. The polymer structure may protect the optically coupled WGM resonator and the optical waveguide from physical damages. Put differently, a WGM resonator coupled to an optical waveguide may be packaged in a polymer structure such that the package is less fragile and is portable. The polymer structure may protect the WGM resonator from interference due to environmental effects. Additionally, the polymer structure may include material(s) that enhance the sensing capabilities of the WGM resonator. For example, the refractive index, Young's modulus, elasto-optic coefficient, and/or acoustic impedance of the polymer structure may enhance the sensing capabilities of the WGM resonator based on the sensing application.

In some variations, at least a portion of the WGM resonator may include a polymer coating or other structure to attenuate WGMs of one or more non-essential frequencies. Put differently, polymer coating on the surface of the WGM resonator may limit the operation of the WGM resonator to a sparse spectrum of frequencies such that the corresponding modes are identifiable and traceable.

In some variations, to increase the sensitivity of the apparatuses, multiple WGM resonators may be arranged together as an array. For example, multiple WGM resonators may be bundled together to form a sensor array. As another example, multiple WGM resonators may be arranged linearly at a certain distance from each other (e.g., regular or irregular array that may be linear, rectangular, etc.). The sensor array can be incorporated into a suitable sensing platform for ultrasound sensing, endoscopy, etc.

WGM Resonators

Whispering gallery mode (WGM) resonators are suitable for high sensitivity applications because of their ability to trap light in highly confined volumes. In some variations, WGM resonators can include a closed loop (e.g., a closed concave surface, a closed circular path, etc.) of transparent medium. This may allow some permitted frequencies of light to continuously propagate inside the closed loop, and to store optical energy of the permitted frequencies of light in the closed loop. Put differently, the WGM resonator may permit propagation of whispering gallery modes (WGMs) that travel the surface of the WGM resonators and that correspond to permitted frequencies of light. The WGMs circulate the circumference of the WGM resonator. Each mode from the WGMs corresponds to a specific frequency of light.

In some variations, the WGM resonators may comprise acoustically and optically transparent material in order to optimize the WGM resonator's response to acoustic waves. Additionally, in some variations, WGM resonators may comprise material having a high elasto-optic coefficient such as polymer and plastic materials. Accordingly, WGM resonators are highly suitable for sensing applications such as ultrasound sensing (e.g., ultrasound scans, endoscopy, etc.).

WGM resonators can directly measure ultrasonic waves through the photo-elastic effect and/or physical deformation of the WGM resonator(s) in response to the ultrasonic waves (e.g., ultrasonic echoes). For example, in the presence of ultrasonic (or any pressure) waves, the WGMs traveling in a WGM resonator may undergo a spectral shift caused by changes in the refractive index and changes to the shape of the WGM resonator induced by the ultrasonic waves. These spectral changes can be easily monitored and analyzed to generate sensor signals that are useful and compatible for an ultrasound sensing application.

Although the above paragraph describes the properties of WGM resonators that make them suitable for ultrasound sensing, it should be readily apparent that WGM resonators described herein can be used for any other type of sensing applications. For example, some photonic filters such as microwave filters may include WGM resonators. Other example applications include spectroscopy, analysis of chemical and/or biological agents, mechanical sensors, lasers, switches and modulators, a combination thereof, and/or the like.

As mentioned above, WGM resonators may comprise a material that is suitably optically and/or acoustically transparent. For example, WGM resonators may comprise optically transparent material such as for example, glass, transparent polymer, silica glass, silicon nitride, titanium dioxide, and/or any other suitably optically transparent material. In some variations, WGM resonators may comprise ultrasonic enhancement material such as for example, polyvinylidene fluoride, parylene, polystyrene, and/or the like. Furthermore, WGM resonators may comprise a material with low Young's modulus (e.g., material with Young's modulus smaller than 2 GPa) so as to increase the mechanical deformation induced by ultrasound.

In some variations, a WGM resonator may include a substantially curved portion (e.g., a spherical portion, a toroid-shaped portion, a ring-shaped portion, etc.). The substantially curved portion may be supported by a stem portion. In some variations, the substantially curved portion and the stem portion of the WGM resonator may be formed from the same material.

In some variations, the substantially curved portion and the stem portion of the WGM resonator may be formed together. For instance, the substantially curved portion may be formed by applying heat at a targeted portion on a fiber tip and/or a capillary tube. Another portion of the fiber tip and/or the capillary tube that is not subjected to heat may form the stem portion of the WGM resonator.

The shape of a WGM resonator (e.g., the shape of the substantially curved portion of the WGM resonator) can be any suitable shape. For example, the shape of the WGM resonator can be spherical (i.e., a solid sphere), bubble shaped (i.e., spherical shape with a cavity), cylindrical, elliptical, ring, disk, toroid, etc. Some non-limiting examples of WGM resonators include microbottle resonators, microbubble resonators, microcylinder resonators, microdisk resonators, microtoroid resonators, and/or the like.

Although the structure and function of WGM resonators are shown and described with respect to microsphere and microbubble resonators, this is solely for illustrative purposes. It should be readily apparent that aspects of WGM resonators described herein may be extended to other shapes of WGM resonators, such as WGM microbottle resonators, WGM microcylinder resonators, WGM microdisk resonators, WGM microtoroid resonators, and/or the like. The apparatuses and methods described herein can use one or more WGM resonators of any suitable shape.

WGM Microsphere Resonator

FIG. 1 is an exemplary variation of a WGM microsphere resonator 102. The WGM microsphere resonator 102 can include a substantially curved portion 102a (e.g., a spherical portion). The substantially curved portion 102a may be supported by a stem portion 102b. In some variations, the substantially curved portion 102a of the WGM microsphere resonator 102 may be on top on a stem portion 102b of the WGM microsphere resonator 102.

As discussed above, the WGM microsphere resonator 102 can trap certain frequencies of light. The frequencies of light may circulate in the substantially curved portion 102a of the WGM microsphere resonator 102, thereby permitting propagation of whispering gallery modes along the surface of the WGM microsphere resonator 102 (e.g., along the circumference of the substantially curved portion 102a). Each set of WGMs propagated by the WGM microsphere resonator 102 may be confined to one or more planes within the WGM microsphere resonator 102. For example, a set of WGMs corresponding to a fundamental frequency (i.e., fundamental mode of WGMs) may be propagated within an equatorial plane in a WGM microsphere resonator 102.

The substantially curved portion 102a of the WGM microsphere resonator 102 can have a radius R. The WGMs propagated within the WGM microsphere resonator 102 may correspond to a set of resonant frequencies that depend on parameters including the radius R of the WGM microsphere resonator 102 and/or the effective thickness of the WGM microsphere resonator 102. Additionally or alternatively, the set of resonant frequencies may depend on parameters such as the refractive index of the material of the WGM microsphere resonator 102.

As mentioned above, WGM microsphere resonators 102 can directly measure the intensity of an ultrasonic wave through photo-elastic effect of the WGM microsphere resonator 102 and/or a physical deformation of the WGM microsphere resonator 102. An ultrasonic wave can induce a change in the refractive index and/or may cause a physical deformation of the WGM microsphere resonator 102. This can lead to a resonant frequency shift in the WGMs that may be proportional to the change in the refractive index and/or the amount of physical deformation. For example, the physical deformation of the WGM microsphere resonator 102 can be a change to the radius R of WGM microsphere resonator 102. A change to the radius R can change the set of resonant frequencies of the WGM microsphere resonator. The resonance frequency shift can be governed by:

$$\frac{\Delta \lambda}{\lambda} \propto \frac{\Delta n_{eff}}{n_{eff}}$$

and $$\frac{\Delta \lambda}{\lambda} \propto \frac{\Delta R}{R}$$

where $n_{eff}$ is the effective refractive index of the optical mode and is determined by the portion of light field in the optically transparent material and the refractive index of the resonator and surroundings, $\Delta n_{eff}$ is the effective refractive index change of the WGM in the microsphere resonator 102, $\lambda$ is an operating frequency, $\Delta\lambda$ is the resonant frequency shift, and $\Delta R$ is the change to the radius R of the WGM microsphere resonator 102.

Although the WGM microsphere resonator shown in FIG. 1 has a spherical shape, the substantially curved portion 102a can be any suitable shape. Generally, the performance of a WGM resonator 102 may depend on its shape. For example, in general a more spherical microsphere may have better performance in confining WGMs. Some suitable variations of the WGM microsphere resonator 102 may be elliptical (e.g., with some degree of eccentricity, such as between about 0 and about 0.9).

The WGM microsphere resonator 102 can be made from an optical fiber that comprises an optically transparent material such as for example, glass, transparent polymer, silica glass, or any other suitably optically transparent material at an operation wavelength of the WGM microsphere resonator 102. In some variations, the WGM microsphere resonator 102 can be fabricated by manipulating the end of a fiber that is made from an optically transparent material. For example, the end of a fiber (e.g., a fiber tip) can be melted by subjecting the end of the fiber to heat (e.g., using a CO2 laser, an arc discharger, a heating coil, or any other suitable heat source). The melted end of the fiber forms a spherical shape due to surface tension. Put differently, the WGM microsphere resonator 102 can be fabricated by subjecting the end of a fiber to a reflow process. Additionally or alternatively, a needle or a syringe can be used to transfer an optically transparent material onto the end of a tapered or non-tapered fiber tip. Once the droplet is transferred to the end of tapered or non-tapered fiber tip, the droplet can be cured using a suitable curing process (e.g., using heat, moisture, ultraviolet (UV) light, etc.). The surface tension of the optically transparent material maintains the spherical shape, thereby forming the WGM microsphere resonator 102. Additionally or alternatively, a tip of a tapered or non-tapered fiber can be dipped in a pool of an optically transparent material. When the tapered or non-tapered fiber is retracted, the surface tension of the optically transparent material forms the spherical shape. The spherical portion may be cured using a suitable curing process (e.g., using heat, moisture, ultraviolet (UV) light, etc.). Fabrication of WGM microsphere resonators is described in further detail below.

The geometrical dimensions of the WGM microsphere resonator 102, including radius R of the WGM microsphere resonator 102 can be changed by taper pulling the end of the optically transparent fiber. Additionally or alternatively, the radius R of the WGM microsphere resonator 102 can be manipulated by controlling the heating process. An operating frequency of the WGM microsphere resonator 102 can be set by applying a polymer coating on a portion of the surface of the WGM microsphere resonator 102 (described in further detail below). Changes to frequencies of WGMs propagated within the WGM microsphere resonator 102 in response to acoustic waves (or pressure waves) can be measured for sensing applications (e.g., ultrasound sensing).

WGM Microbubble Resonator

Figure 2:
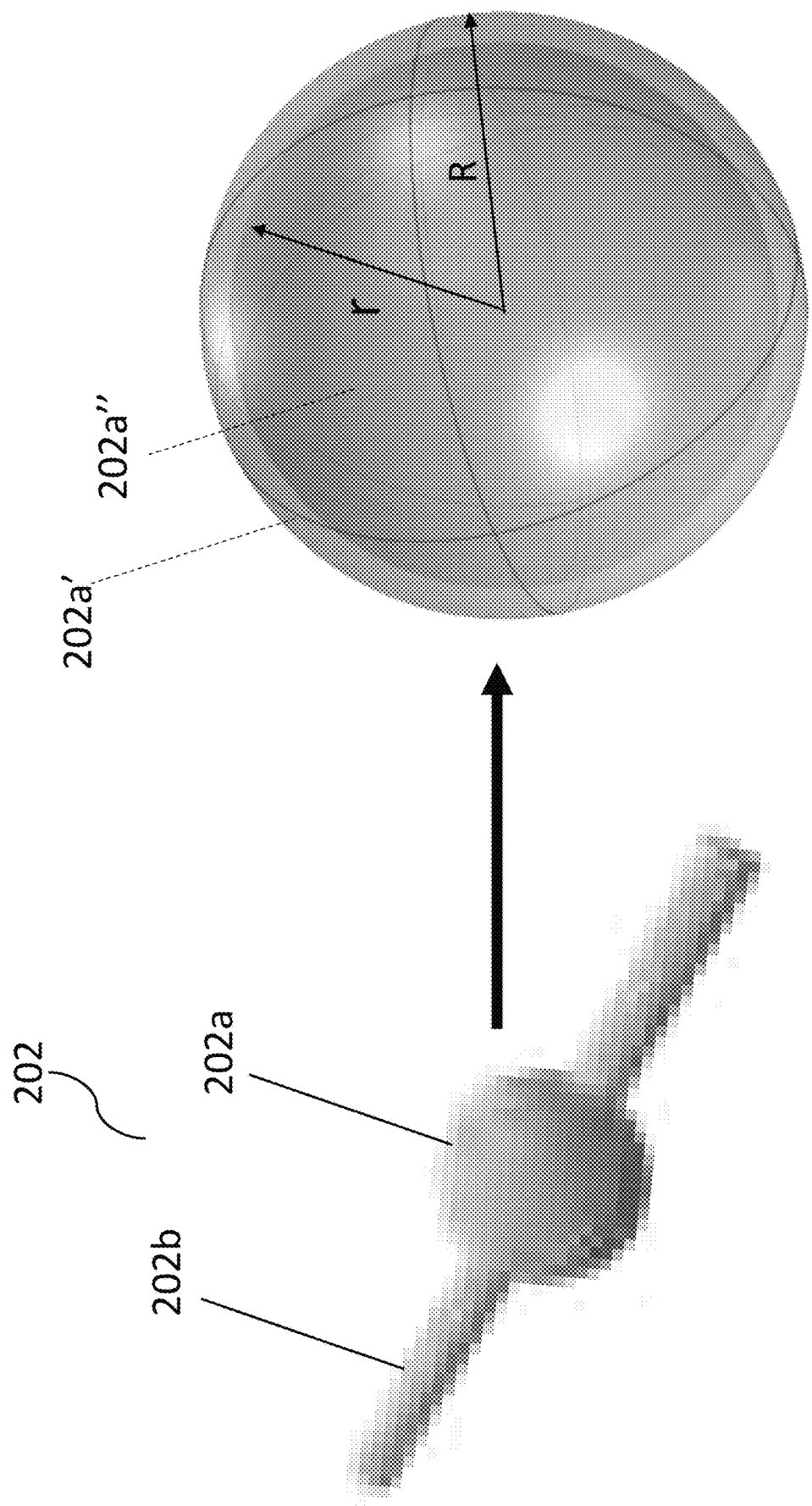
FIG. 2 is a schematic description of an exemplary variation of a WGM microbubble resonator.

FIG. 2 is a schematic description of an exemplary variation of a WGM microbubble resonator 202. The WGM microbubble resonator 202 can include a substantially curved portion 202a (e.g., a spherical portion with a hollow cavity). The substantially curved portion 202a of the WGM microbubble resonator 202 can include an outer microbubble surface 202a' with a radius denoted by R and an inner microbubble surface 202a" with a radius denoted by r, thereby defining a resonator wall thickness equivalent to (R-r). The space inside the inner microbubble surface 202a"

may be hollow (e.g., a cavity) or include a material such as an ultrasonic enhancement material as described in further detail below.

As discussed above, the WGM microbubble resonator 202 can trap certain frequencies of light. The frequencies of light may circulate in the substantially curved portion 202a of the WGM microbubble resonator 202, thereby permitting propagation of whispering gallery modes along the surface of the WGM microbubble resonator 202 (e.g., along the circumference of the substantially curved portion 202a). Each set of WGMs propagated by the WGM microbubble resonator 202 may be confined to one or more planes within the WGM microbubble resonator 202. For example, a set of WGMs corresponding to a fundamental frequency (i.e., fundamental mode of WGMs) may be propagated within an equatorial plane in a WGM microbubble resonator 202.

The WGMs propagated within the WGM microbubble resonator 202 may correspond to a set of resonant frequencies that depend on parameters including the radius R of the outer microbubble surface 202a', the radius r of the inner microbubble surface 202a", and/or the wall thickness of the WGM microbubble resonator 202. Additionally or alternatively, the set of resonant frequencies may depend on parameters such as the refractive index of the material of the WGM microbubble resonator 202.

As mentioned above, WGM microbubble resonators 202 can directly measure the intensity of an ultrasonic wave through photo-elastic effect of the WGM microbubble resonator 202 and/or a physical deformation of the WGM microbubble resonator 202. An ultrasonic wave can induce a change in the refractive index and/or may cause a physical deformation of the microbubble resonator 202. This can lead to a resonant frequency shift in the WGMs that may be proportional to the change in the refractive index and/or the amount of physical deformation. For example, the physical deformation of the WGM microbubble resonators 202 can be a change to the radius R of the outer microbubble 202a'. A change to the radius R can change the set of resonant frequencies of the WGM microbubble resonator 202. The resonance frequency shift can be governed by:

$$\frac{\Delta \lambda}{\lambda} \propto \frac{\Delta n_{eff}}{n_{eff}}$$

and $$\frac{\Delta \lambda}{\lambda} \propto \frac{\Delta R}{R}$$

where $n_{eff}$ is the effective refractive index of the optical mode and is determined by the portion of light field in the optically transparent material and the refractive index of the resonator and surroundings, $\Delta n_{eff}$ is the effective refractive index change of the WGM in the microbubble resonator 202, $\lambda$ is an operating frequency, $\Delta \lambda$ is the resonant frequency shift, and $\Delta R$ is the change to the radius R of the outer microbubble 202a'.

Figure 3:
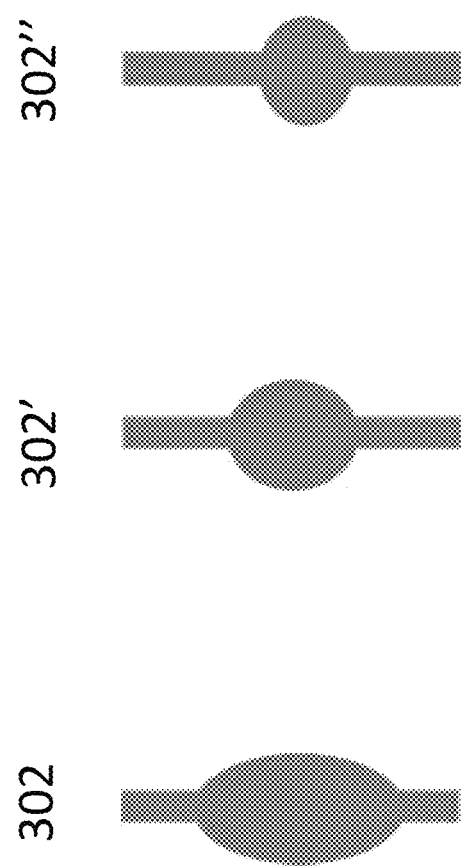
FIG. 3 is a schematic description of an exemplary variation of various geometrical shapes of a WGM microbubble resonator.

Although the WGM microbubble resonator 202 shown in FIG. 2 has a spherical shape, the substantially curved portion 202a can be any suitable shape. Generally, the performance of a WGM resonator 202 may depend on its shape. For example, a more spherical microbubble may have better performance in confining WGMs. Some suitable variations of the WGM microbubble resonator 202 may be elliptical (e.g., with some degree of eccentricity, such as between about 0 and about 0.5, between 0 and about 0.3, between about 0 and about 0.2, between about 0 and about 0.1, etc.). FIG. 3 depict exemplary variations of various geometrical shapes of a WGM microbubble resonator. For example, a WGM microbubble resonator can be an elliptical microbubble (e.g., more eccentric microbubble 302 or less eccentric microbubble 302') or spherical microbubble 302". As discussed above, the spherical WGM microbubble resonator 302" may have better resonator performance in comparison to elliptical WGM microbubble resonators 302 and 302'.

Referring back to FIG. 2, WGM microbubble resonator 202 can be made from a capillary tube, such as capillary tube 201. The capillary tube 201 can be made of an optically transparent material such as for example, glass, transparent polymer, silicon nitride, titanium dioxide, or any other material that is suitably optically transparent at an operation wavelength of the WGM microbubble resonator 202. The resonator wall (e.g., resonator wall indicated with a wall thickness equivalent to (R-r)) may include a material such as, for example, the same material as the capillary tube 201. The space inside the inner microbubble resonator surface 202a" can be a hollow chamber or can be filled with an ultrasonic enhancement material, such as for example, polyvinylidene fluoride, parylene, polystyrene, and/or the like. The ultrasonic enhancement material inside the optical WGM microbubble resonator 202 can increase sensitivity of the microbubble resonator. For example, the ultrasonic enhancement material can have a relatively high elasto-optic coefficient, such that in response to the WGM microbubble resonator 202 receiving a set of ultrasound echoes, the refractive index of the ultrasonic enhancement material changes more than the refractive index of the material of the resonator wall (e.g., upon receiving a mechanical stress or strain induced by the set of ultrasound echoes).

In some variations, the WGM microbubble resonator 202 may be formed by manipulating a capillary tube (e.g., capillary tube 201). The capillary tube 201 may be fabricated from an optically transparent material such as for example, glass, transparent polymer, silicon nitride, titanium dioxide, and any other suitable optically transparent material. The capillary tube 201 can be pressurized and heated at a location on the capillary tube 201 where the substantially curved portion 202a of the WGM microbubble resonator 202 is desired. Heating the capillary tube 201 can be performed by using a $CO_2$ laser, an arc discharger, a heating coil, or any other suitable heat source while maintaining the stable pressure inside the capillary tube 201 using the pressure source. Fabrication of WGM microbubble resonators is described in further detail below.

In some variations, the heat source may be manipulated (e.g., to control heat direction, focus energy, etc.), such as with a set of one or more lenses, beamsplitters, mirrors, thermally conductive surfaces, etc. Geometrical dimensions of the microbubble resonator, including radius R of the outer microbubble 202a', radius r of the inner microbubble 202a" and the wall thickness as described with respect to FIG. 2, can depend on a controlled heating and/or pressurizing process. For example, precise control of the fabrication process can result in fabrication of WGM microbubble resonators of a suitable shape (e.g., elliptical WGM microbubble resonators 302 or 302' in FIG. 3 and/or spherical WGM microbubble resonator 302" in FIG. 3). In some variations, the capillary tube 201 can be further processed by partially or wholly filling in a hollow chamber of the WGM microbubble resonator 202 with an ultrasonic enhancement material such as those described above. For example, the ultrasonic enhancement material may be injected into the WGM microbubble resonator 202 through the open end of the capillary tube 201.

An operating frequency of the WGM microbubble resonator 202 can be set by applying polymer coating on a portion of the surface of the WGM microbubble resonator 202 (described in further detail below). Changes to frequencies of WGMs propagated within the WGM microbubble resonator 202 in response to acoustic waves (or pressure waves) can be measured for sensing applications (e.g., ultrasound sensing).

As discussed above, WGM microsphere resonators 102 and WGM microbubble resonators 202 are described at length solely for illustrative purposes. The following sections describe properties of any suitable WGM resonators (e.g., WGM microsphere resonators, WGM microbubble resonators, WGM microbottle resonators, WGM microtoroid resonators, WGM microdisk resonators, WGM mirroring resonators, etc.).

Quality Factor (Q Factor)

The ability to trap the permitted frequencies of light in the closed loop may attribute towards the high quality factor (Q factor) of the WGM resonators, which makes WGM resonators highly suitable for high sensitivity applications. The Q factor of the WGM resonators may be based on factors including geometrical parameters of the WGM resonator, refractive index of the transparent medium, and/or refractive indices of environment surrounding the WGM resonators. For instance, spherical WGM resonators may have high Q factors owing to their geometrical shape.

The sensitivity of ultrasound sensing may be improved by increasing the Q factor of the WGM resonators. The Q factor can in turn be controlled by a physical factor of the WGM resonator such as, shape of a WGM resonator, wall thickness R-r of a WGM microbubble resonator, radius R of a WGM microsphere resonator, etc. For example, the shape of a WGM resonator can affect a confinement of optical fields within the WGM resonator which in turn affects the Q factor of the WGM resonator. The confinement of optical fields in a WGM resonator may depend, among other factors, on optical loss of the optical fields while propagating around the wall of the circumference of the WGM resonator. The optical loss of the optical fields can depend on geometrical parameters including the bending radius of the circumference as well as physical parameters including absorption coefficient of the material of the WGM resonator. Generally, stronger optical field confinement can help enhance the response of a WGM resonator to the pressure induced by received ultrasound echoes. Generally, WGM resonators with shapes such as spherical shape, elliptical shape, cylindrical shape, toroid shape, ring shape, and/or the like may have better resonator performance. For example, in FIG. 3 the spherical bubble 302" has a lower optical loss than the elliptical bubbles 302 and 302', and demonstrates higher Q factor that is more suitable for highly sensitive application.

Figure 4:
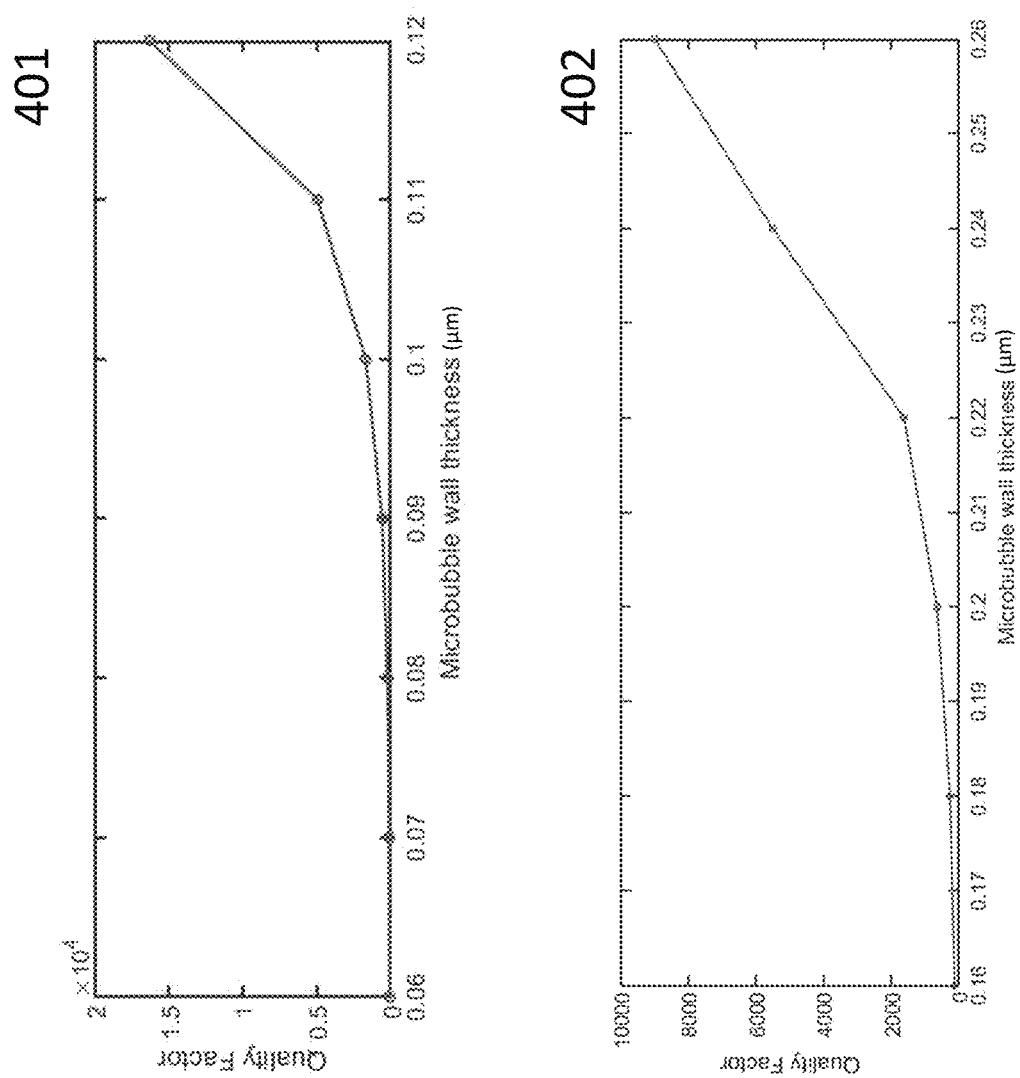
FIG. 4 illustrates quality factor of a WGM microbubble resonator for varying microbubble wall thicknesses.

Similarly, wall thickness of a WGM resonator may also affect the Q factor. FIG. 4 illustrates changes to Q factor limited by radiation loss for a WGM microbubble resonator as the wall thickness of the WGM microbubble resonator varies. Other losses, such as materials absorption loss, are not considered in the simulation. By increasing the inner microbubble surface radius and/or decreasing the wall thickness, generally the Q factor decreases. The Q factor can decrease from a certain radius depending on geometrical parameters and refractive indices of the WGM microbubble resonator and its surrounding medium. Graph 401 illustrates the Q factor for a WGM microbubble resonator with an outer microbubble diameter of 10 μm and refractive index of 2 surrounded by air with a refractive index of 1. As shown in 401, the Q factor drops when the wall thickness is decreasing and the WGM microbubble resonator can barely confine light when the wall thickness is thinner than 0.06 μm. Graph 402 illustrates the Q factor for a similar WGM microbubble resonator with an outer microbubble diameter of 10 μm and refractive index of 2 surrounded by a material with a refractive index of 1.33. Because of the higher index of refraction of the surrounding material, as seen in 402, the Q factor starts to drop significantly when the wall thickness is close to 0.26 μm and the WGM microbubble resonator can barely confine light when the wall thickness is thinner than 0.16 μm. It should be readily understood that the graph 401 and graph 402 include values for Q factor that are solely for illustrative purposes. For example, graph 401 and graph 402 merely illustrate one or more trends of Q factor for a WGM microbubble resonator. The values of the Q factor itself may vary depending on various factors. However, the general trend of the Q factor may be similar to the trends shown in graph 401 and graph 402.

WGM Modes

As described above, WGM resonators can trap certain frequencies of light. These frequencies of light can circulate along the surface of the WGM resonators, thereby permitting propagation of WGMs. Therefore, when a WGM resonator is coupled with light (e.g., using an optical waveguide) numerous modes corresponding to light with different spatial distributions may be excited in the WGM resonator.

Figure 5:
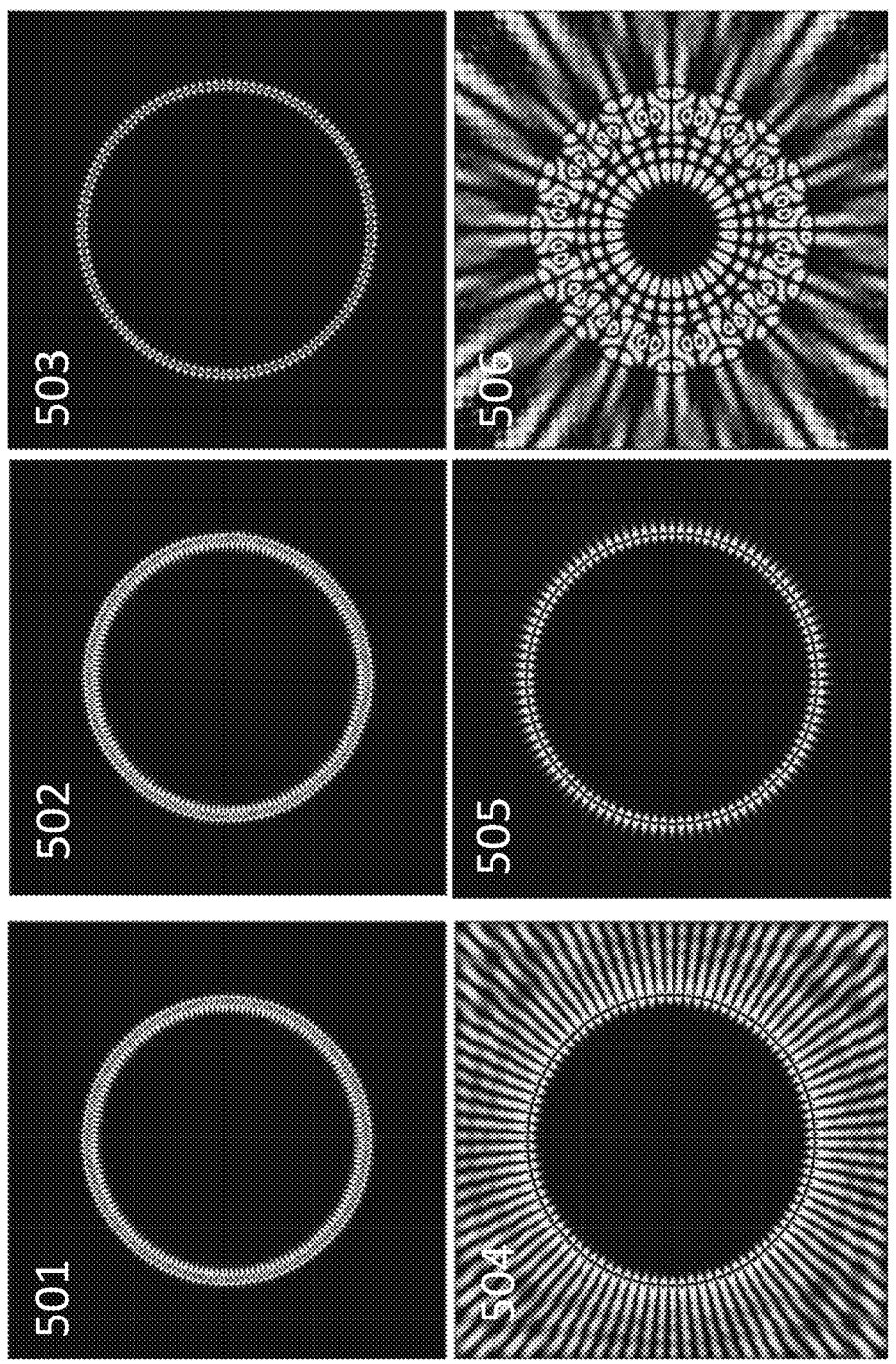
FIG. 5 is a schematic description of mode distributions of exemplary WGM microbubble resonators.

FIG. 5 is a schematic description of mode distribution in various WGM microbubble resonators. The WGM microbubble resonator can include an outer microbubble surface with a radius denoted by R and an inner microbubble surface with a radius denoted by r (as described in further detail in FIG. 2). Light propagation via a whispering gallery mode (WGM) in a WGM microbubble resonator with an outer microbubble surface radius of 10 μm and an inner microbubble surface radius of 0 μm is shown in a mode distribution 501. Light propagation via a WGM in a WGM microbubble resonator with an outer microbubble surface radius of 10 μm and inner microbubble surface radius of 8 μm is shown in a mode distribution 502. Light propagation via a WGM in a WGM microbubble resonator with an outer microbubble radius of 10 μm and an inner microbubble radius of 9.8 μm is shown in a mode distribution 503. Light propagation via a WGM in a WGM microbubble resonator with an outer microbubble radius of 10 μm and an inner microbubble radius of 9.94 μm is shown in a mode distribution 504. In all aforementioned mode distributions, a refractive index of the microbubble material is 2.

According to the mode distribution 501 and the mode distribution 502, there is a small difference between a microbubble with an outer microbubble surface radius of 10 μm and an inner microbubble surface radius of 0 μm and a microbubble with a wall thickness of 2 μm. For the WGM microbubble resonator with a wall thickness of 0.06 μm, however, the WGM microbubble resonator becomes lossy and cannot confine light in the wall thickness (e.g., see mode distribution 504). Light propagation via a WGM in a WGM microbubble resonator with an outer microbubble surface radius of 10 μm and inner microbubble surface radius of 9.9 μm is shown in a mode distribution 505. Light propagation via a WGM in a packaged WGM microbubble resonator (e.g., WGM microbubble resonator encapsulated in a polymer structure), surrounded by a polymer structure with a lower refractive index of 1.33 and having an outer microbubble radius of 10 μm and inner microbubble radius of 9.9 µm is shown in a mode distribution 506. The packaged WGM microbubble resonator becomes lossy and cannot confine light in the wall thickness. This is because the wall thickness of the WGM microbubble resonator is extremely small (i.e., 0.1 µm) which is smaller than the wavelength of light.

Figure 6A:
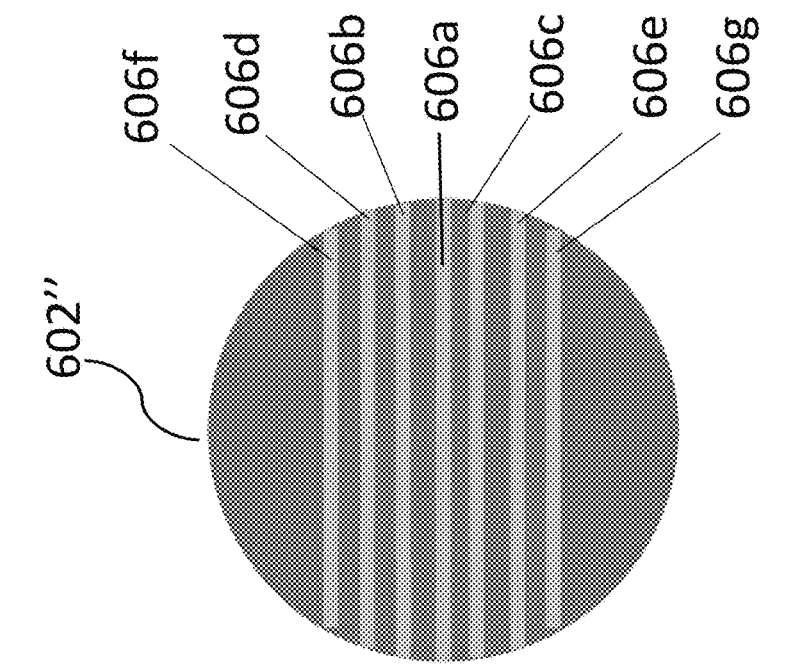
FIG. 6A is a depiction of the field distribution for a fundamental mode in an exemplary variation of a WGM resonator.

As seen in FIG. 5, numerous modes of WGMs with different spatial distributions (also referred to herein as "field distribution") can be excited in WGM resonators. The field distribution of each mode may be generally confined within one or more specific planes. Put differently, as a set of WGMs corresponding to a specific frequency propagates along the surface of the WGM resonator, the field distribution of that set of WGMs may be generally confined to a latitudinal range of one or more specific planes within the surface of the WGM resonator. For example, FIG. 6A is an exemplary variation of a depiction of the field distribution for a fundamental mode in a WGM resonator 602. The fundamental mode of WGM corresponding to a fundamental frequency may be propagated within a plane 606a. If the substantially curved portion of the WGM resonator is spherical (e.g., WGM microsphere resonator, a WGM microbubble resonator, etc.), then the WGMs may propagate in an equatorial plane. The fundamental modes may have a broader bandwidth response for ultrasound sensing than higher order modes, due to the thinner field distribution of fundamental modes.

Figure 6B:
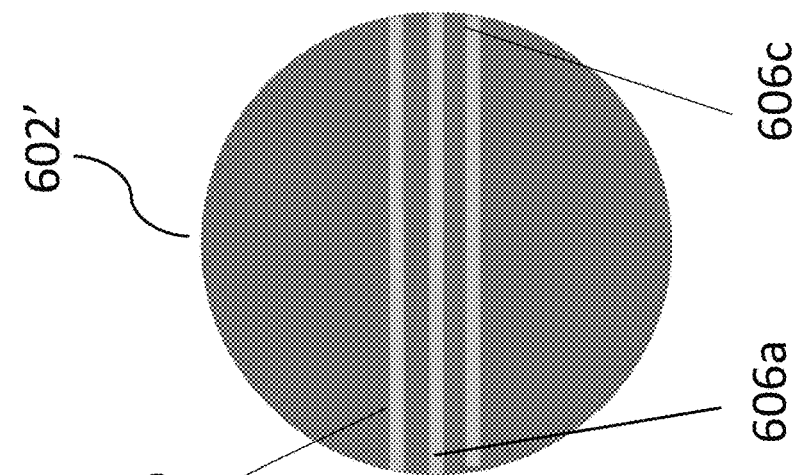
FIG. 6B is a depiction of the field distribution for a high order mode in an exemplary variation of a WGM resonator.

The field distribution for higher order modes that correspond with frequencies other than a fundamental frequency (e.g., frequency higher than fundamental frequency) may be confined within a wider range extending in radial or polar directions (north and south) beyond the field distribution for the fundamental frequency. For example, FIG. 6B is a depiction of the field distribution for a first high order mode in an exemplary variation of a WGM resonator 602'. As seen in FIG. 6B, the field distribution for the first high order mode extends in the radial or polar direction from the equatorial plane 606a. Put differently, the field distribution for the first high order mode extends between plane 606b and plane 606c. Plane 606b and plane 606c may be at equal distances from the equatorial plane 606a. Plane 606b and plane 606c may also be parallel to the equatorial plane 606a.

Figure 6C:
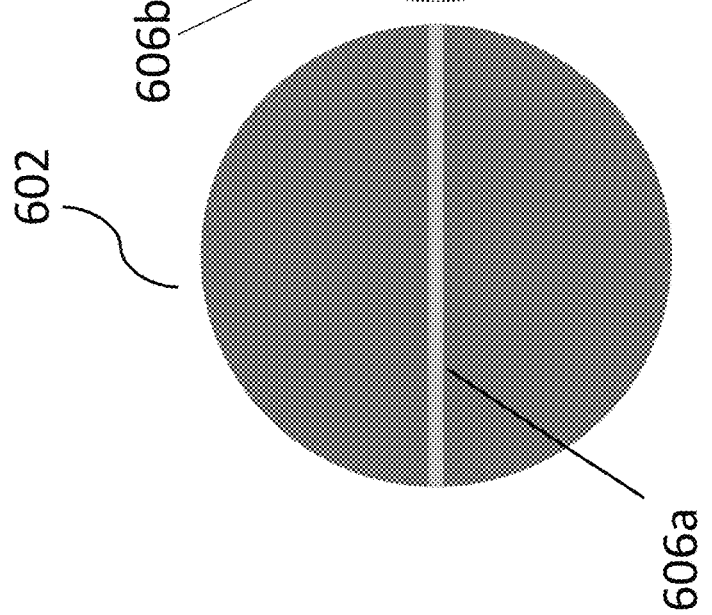
FIG. 6C is a depiction of the field distribution for a high order mode in an exemplary variation of a WGM resonator.

FIG. 6C is a depiction of the field distribution for a second high order mode (of higher order than the first high order mode described above with respect to FIG. 6B) in an exemplary variation of a WGM resonator 602". Similar to the field distribution for the high order mode depicted in FIG. 6B, the field distribution for the high order mode in FIG. 6C extends in radial or polar direction from the equatorial plane 606a. The field distribution in this scenario extends from plane 606f to plane 606g. Put differently, the field distribution for the higher order may be confined to latitudes ranging among: a) the equatorial plane 606a; b) plane 606f, 606d, and 606b in one direction; and c) plane 606g, 606c and 606e in the polar opposite direction. Plane 606f and plane 606g may be at equal distances from the equatorial plane 606a. Similarly, plane 606d and plane 606e may be at equal distances and plane 606b and plane 606c may be at equal distances from the equatorial plane 606a. As described above, the north and south boundaries of the field distribution for the high order mode depicted in FIG. 6C are plane 606f and plane 606g respectively. Compared to the field distribution for the high order mode shown in FIG. 6B, the field distribution for the highorder mode in FIG. 6C extends farther north and south from the equatorial plane 606a. For example, plane 606f and plane 606g may be at a greater distance from the equatorial plane 606a as opposed to plane 606b and plane 606c. Accordingly, the high order mode in FIG. 6C may have higher mode volume than the high order mode in FIG. 6B. The optical loss for the high order mode in FIG. 6C may be greater than the optical loss for the high order mode in FIG. 6B.

As described above, in WGM resonators that are spherical in shape, the field distribution for the fundamental mode may be generally confined to the equatorial plane, while the field distribution for high order modes may extend along the radial direction and/or the polar direction from the equatorial plane. Because of their numerous azimuthal and radial modes, WGM resonators exhibit dense spectral features. The dense spectrum may be highly attractive for applications such as cavity quantum electrodynamics. However, in most sensing applications, a sparse spectrum with traceable and identifiable modes may be preferred. Furthermore, lower order modes may have higher Q factor in comparison to higher order modes. Additionally, lower order modes may have a smaller mode volume in comparison to higher order modes.

The spectrum of modes may depend on acoustic impedance of the WGM resonator, refractive index of the WGM resonator, geometrical parameters of the WGM resonator (e.g., radius of the WGM resonator, effective thickness of the WGM resonator, wall thickness of the WGM resonator etc.), acoustic impedance of the environment surrounding the WGM resonator, and/or refractive index of the environment surrounding the WGM resonator. Accordingly, the acoustic impedance and/or refractive index of the materials for a WGM resonator and/or its surrounding materials, as well as the size of the WGM resonator, may be tailored to adjust the bandwidth of the resonant modes.

Additionally or alternatively, high order modes may be selectively attenuated by disrupting the geometry of the WGM resonator and/or its surrounding at selected points near the electric field, thereby reducing the number of high order modes present in the transmission spectrum. For example, in some variations, high order modes may be selectively attenuated by applying polymer coating on a portion of the WGM resonator (described in further detail below). For example, applying polymer coating on a portion of the circumference of the WGM resonator may disrupt the continuity of the geometry of the WGM resonator along the coated portions, thereby changing the operating modes of the WGM resonator. When the polymer coating is applied to a spherical segment as described in further detail below, the coating may furthermore change the effective "thickness" (along the polar direction) of the WGM resonator. Put differently, the polymer coating can reduce the effective thickness of the WGM resonator, thereby attenuating at least some of the higher order modes. In this manner, the WGM resonator can be highly suitable for sensing applications. This is described in further detail below.

Waveguides

Coupling the WGM resonators with light may enable the sensing capabilities of WGM resonators. Light can be coupled by merely shining light onto the WGM resonator. However, this can be an inefficient way to excite the WGM resonator. This is because in order to enable the sensing capabilities of the WGM resonators by coupling light, phase matching between resonant light and incoming light may be required. Thus, a more efficient way to couple light to WGM resonators would be to use optical waveguides with specific characteristics so as to achieve phase matching. Optical waveguides may provide controllable and robust light capable of exploiting the sensing capabilities of WGM resonators.

However, the sensitivity of the WGM resonator that is coupled to an optical waveguide may vary depending on the type of optical waveguide, the efficiency of the optical waveguide, the type of coupling between the optical waveguide and the WGM resonator, the shape of the optical waveguide, the shape of the WGM resonator, etc. Accordingly, it may be important to consider these factors when coupling the WGM resonator with an optical waveguide.

As discussed above, the sensitivity of the WGM resonator may depend on the efficiency of the optical waveguide that it is coupled to. The efficiency of optical waveguides may in turn depend upon phase synchronism, optimal overlap between modes of the WGM resonator and that of the optical waveguide, and criticality. For example, the efficiency of the optical waveguide may be based on the fraction of the total transmitted optical power that can be phase matched to the WGM resonator. An optical waveguide that can couple the maximum amount of light into a WGM resonator may be considered most efficient.

Additionally or alternatively, the sensitivity of the WGM resonator may depend on the coupling between the optical waveguide and the WGM resonator. Optimal optical coupling between the optical waveguide and the WGM resonator may depend on a number of factors. Some non-limiting examples of these factors include distance of a coupling point on the optical waveguide from the WGM resonator, alignment of a coupling point on the optical waveguide to the WGM resonator, etc. The optimal coupling achieves a whispering gallery mode (WGM) operation with a high Q factor of a set of resonant frequencies corresponding to a set of WGMs.

In some variations, the optical coupling between a WGM resonator and one or more optical waveguides may be achieved at least in part by placing the WGM resonator proximate one or more optical waveguides. For example, the WGM resonator and an optical waveguide may be positioned such that the optical waveguide is aligned to the largest diameter of the WGM resonator. In one example, the WGM resonator may have an elliptical shape, and the largest circular diameter of the WGM resonator can be aligned to the one or more optical waveguides.

Figure 7:
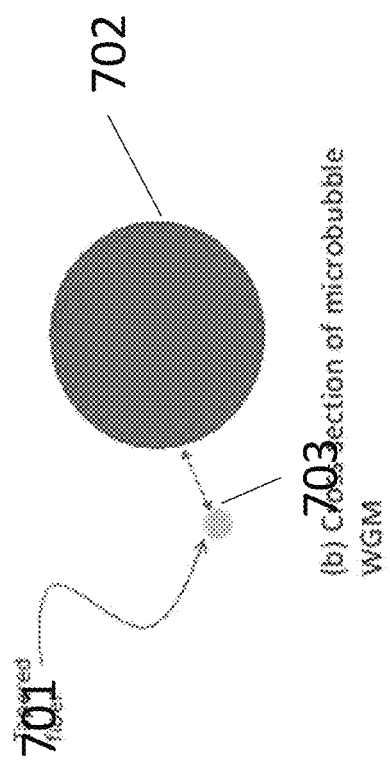
FIG. 7 is a schematic description of an exemplary optical coupling between a spherical WGM microbubble resonator and an optical waveguide.

FIG. 7 is a schematic description of an exemplary optical coupling between a spherical WGM microbubble resonator 702 and an optical waveguide 701. The coupling point 703 is a point on the optical waveguide 701 that has the closest distance from the spherical WGM microbubble resonator 702. To achieve a good coupling between the optical waveguide 701 and the spherical WGM microbubble resonator 702 the optical waveguide 701 may be aligned such that the coupling point 703 is at the closest distance from the spherical WGM microbubble resonator 702. For example, the optical waveguide 701 may be placed such that the coupling point 703 is at the closest distance from the spherical WGM microbubble resonator 702.

In some variations, the optical waveguide can be an optical fiber receiving a light from a light source, an integrated photonic waveguide that is receiving the light from an on-chip light source, an integrated photonic waveguide that is coupled to the optical fiber that propagates the light from the light source, or any other suitable medium to propagate a light from a light source to a coupling point from a WGM resonator. Some non-limiting examples of optical waveguides include optical fibers, integrated photonics waveguides, chip-scale waveguides, slab waveguides, prisms, angle polished fiber couplers, tapered fiber couplers, bent fiber couplers, etc.

Polymer Structure

In some variations, at least a portion of the optical waveguide and WGM resonator may be embedded into a polymer structure, thereby encapsulating the optical waveguide and the WGM resonator. As discussed above, WGM resonators may be fragile and susceptible to physical damages. The polymer structure may protect the WGM resonators and the optical waveguides from physical damages. Put differently, the polymer structure may package the WGM resonator and the optical waveguide together. In variations in which the packaged WGM resonator with the optical waveguide are used for sensing applications such as ultrasound sensing (e.g., ultrasound imaging such as endoscopy, etc.), the effective refractive index of the polymer structure may be lower than the effective refractive index of the WGM resonator. This may allow the packaged WGM resonator to respond to a broad range of frequencies of WGMs while having high ultrasound attenuation. The high ultrasound attenuation can prevent reverberation of ultrasound echoes when the packaged WGM resonator with the optical waveguide is being used for ultrasound sensing applications.

The polymer structure may include 1) a backing region (also referred to herein as "a backing polymer") and/or an acoustic matching region (also referred to herein as a "matching polymer"); 2) an encapsulating region; and 3) in some variations, a substrate. For example, referring to FIG. 18A, the polymer structure may include a matching region 1808, an encapsulating region 1814, a substrate 1806, and a backing region 1810.

The acoustic matching region 1808 may be configured to promote ultrasound transmission. For example, the matching region 1808 may comprise a polymer material with a low refractive index to reduce impedance of transmission of ultrasound echoes to the WGM resonator. The matching region 1808 may have a lower refractive index compared to a refractive index of the WGM resonator and a refractive index of the one or more optical waveguides.

The backing region 1810 may comprise a damping material such as a polymer material with a low refractive index configured to obtain a broad whispering gallery mode (WGM) frequency response while having high ultrasound attenuation to prevent reverberation of ultrasound echoes. In some variations, acoustic impedance of the damping material of the backing region 1810 can, for example, match with that of the matching polymer utilized for packaging the WGM resonator.

As discussed in some variations, the polymer structure may include a substrate (e.g., substrate 1806). The substrate may include silicon, silica, quartz, plastic, and/or any other suitable material. A suitable material to serve as substrate can include a damping material to eliminate a residual vibration and minimize ultrasound echoes. The substrate may be coated with one or more coating materials (e.g., a "coating layer"). In some variations, the coating layer may include one or more materials that serve as a reflecting surface so as to bounce ultrasound waves back to the WGM resonator. In some variations, the coating layer may additionally include the backing polymer and/or the matching polymer. For example, the substrate may be coated with coating materials including the backing polymer and/or the matching polymer. In some variations, layers of the backing polymer and/or the matching polymer may be deposited on the substrate.

The WGM resonator may be placed on the substrate 1806 and encapsulated within an encapsulating region 1814. Put differently, the encapsulating region 1814 may be sandwiched between the matching region 1808 and the backing region 1810 such that the WGM resonator may be encapsulated within the encapsulating region 1814.

In some variations, the encapsulating region 1814 may comprise ultrasonic enhancement material such as polyvinylidene fluoride, parylene, polystyrene, and/or the like. The ultrasonic enhancement material can increase sensitivity of the WGM resonators. For instance, the ultrasonic enhancement material may have high elasto-optic coefficient, such that in response to the WGM resonator receiving a set of ultrasound echoes, the refractive index of the ultrasonic enhancement material may change substantially (e.g., upon receiving a mechanical stress or strain induced by the set of ultrasound echoes) compared to that of a non-ultrasonic enhancement material. This would increase the WGM resonator's response to the ultrasound signals.

Figures 32A, 32B:
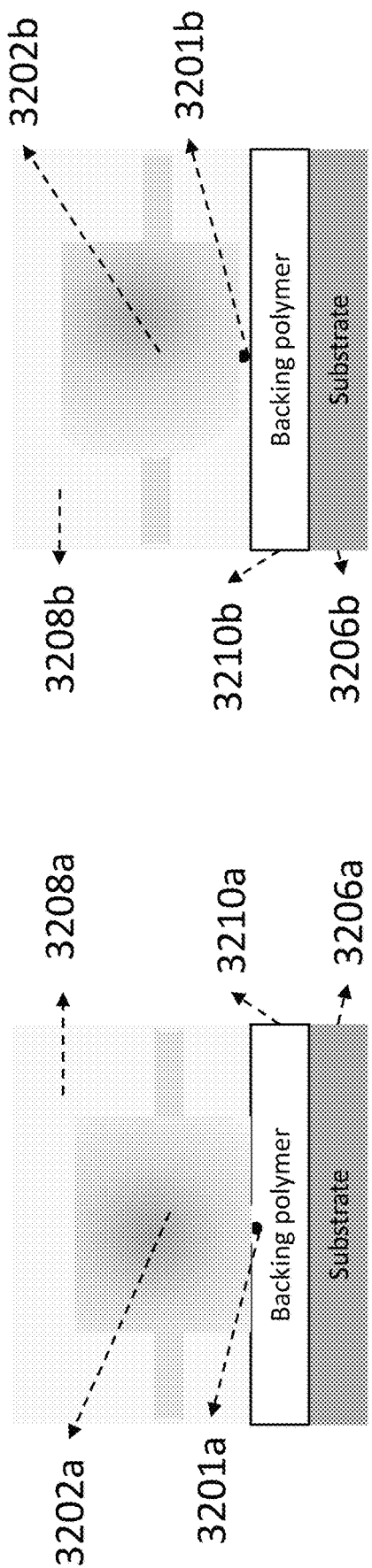
FIG. 32A is a schematic description of an exemplary method of encapsulating a WGM resonator and an optical waveguide.
FIG. 32B is a schematic description of an exemplary method of encapsulating a WGM resonator and an optical waveguide.

In an alternative arrangement, referring to FIG. 32A, the polymer structure may include a matching region 3208a, a backing region 3210a, and a substrate 3206a. In this arrangement, the matching region 3208a may function as the encapsulating region. Put differently, the WGM resonator may be encapsulated in the matching region 3208a. Accordingly, the matching region 3208a may comprise the ultrasonic enhancement material. The backing region 3210a may be adjoining the matching region 3208a and sandwiched between the matching region 3208a and the substrate 3206a. In such a variation, layers of backing polymer may be deposited on the substrate 3206a. Additionally, layer of matching polymer may be deposited over the backing polymer on the substrate.

In some variations, the acoustic impedance of the polymer structure (e.g., acoustic impedance of the matching region, acoustic impedance of the backing region, and/or the acoustic impedance of the encapsulating region) may match the acoustic impedance of the WGM resonator, thereby allowing majority of acoustic energy from an ultrasound signal pass through the WGM resonator. This can increase the output signal.

In some variations, the optical waveguide and the WGM resonator may be embedded in the matching polymer. Alternatively, the optical waveguide may be embedded in the backing polymer while the WGM resonator is embedded in the matching polymer. In some variations, an optical waveguide may be embedded partially in the backing polymer and partially in the matching polymer. In some variations, an optical waveguide may be coupled with a WGM resonator such that the WGM resonator is on a substrate included in the polymer structure while the optical waveguide is above the substrate. In some variations, an optical waveguide may be coupled with the WGM resonator such that the WGM resonator and the optical waveguide are both in direct contact with a substrate included in the polymer structure. Encapsulating the optical waveguide and the WGM resonator in the polymer structure is further explained in detail below. It should be readily apparent that a WGM resonator may be optically coupled to more than one optical waveguide. Therefore, the WGM resonator along with each of the coupled optical waveguides may be embedded in the polymer structure.

Thus, as described above, the WGM resonator and/or the one or more optical waveguides can be encapsulated in a polymer structure (e.g., a polymer structure including a backing polymer and a matching polymer). In some variations, a sensing device and/or a sensing apparatus may include at least one WGM resonator coupled with one or more optical waveguides packaged in the polymer structure as described above. Put differently, the sensing device and/or the sensing apparatus may include a single WGM resonator coupled with a single optical waveguide packaged in a polymer structure. Alternatively, the sensing device and/or the sensing apparatus may include a single WGM resonator coupled with more than one optical waveguide packaged in a polymer structure. In yet another variation, the sensing device and/or the sensing apparatus may include an array of WGM resonators (described in further detail below) coupled with a single optical waveguide (e.g., each WGM resonator in the array of WGM resonators is coupled to the same optical waveguide) packaged in a polymer structure. In yet another variation, the sensing device and/or the sensing apparatus may include an array of WGM resonators coupled with more than one optical waveguides (e.g., at least some WGM resonators in the array of WGM resonators may be coupled to different optical waveguides) packaged in a polymer structure.

The polymer structure can provide, for example: i) protection of the WGM resonator and the one or more optical waveguides which may, for example, improve portability of the sensing device and/or the sensing apparatus; ii) enhance the response of the WGM resonator to the incoming ultrasound echoes to be sensed by the sensing device and/or the sensing apparatus; and/or iii) broaden the operation bandwidth of a sensing device and/or a sensing apparatus. In some variations, the polymer structure also helps to maintain the optical coupling property between the WGM resonator and the one or more optical waveguides such as by maintaining consistency of the distance between the WGM resonator(s) and the one or more optical waveguides.

In one variation, the polymer structure including a matching region may broaden the operation bandwidth of the sensing device and/or the sensing apparatus as described below. Generally, in an ultrasound sensing application, the operating frequency of an input light can be adjusted to a resonance of the WGM resonators centered at a resonant frequency. The incoming ultrasound echoes change the resonant frequency of the WGM resonators to generate resonance shift, by modulating the refractive index of the material of the WGM resonators, or deforming the WGM resonators. If the linewidth of the resonance is too narrow, a resonance shift can be much larger than the linewidth of the resonance such that the resonance shift falls out of the dynamic range of the sensing device and/or the sensing apparatus. However, the matching region may broaden the linewidth of the optical resonance mode to better capture larger resonance shifts. For example, an evanescent wave extended from the WGM resonator to the matching region may experience extra loss, leading to a decreased photon lifetime which is reflected as linewidth broadening of the optical resonance mode. Because of this linewidth broadening, the sensing device and/or the sensing apparatus can thus tolerate a broader range of resonance frequency shift induced by the incoming ultrasound signals. In other words, the matching polymer encapsulating the WGM resonators can broaden the operation bandwidth of the sensing device and/or the sensing apparatus to improve the dynamic range of the sensing device and/or the sensing apparatus, and can prevent the resonance shift falling out of the dynamic range of the sensing device and/or the sensing apparatus. Therefore, the matching layer can enhance the dynamic sensing range of the sensing device and/or the sensing apparatus.

Exemplary Packaging

Figure 8:
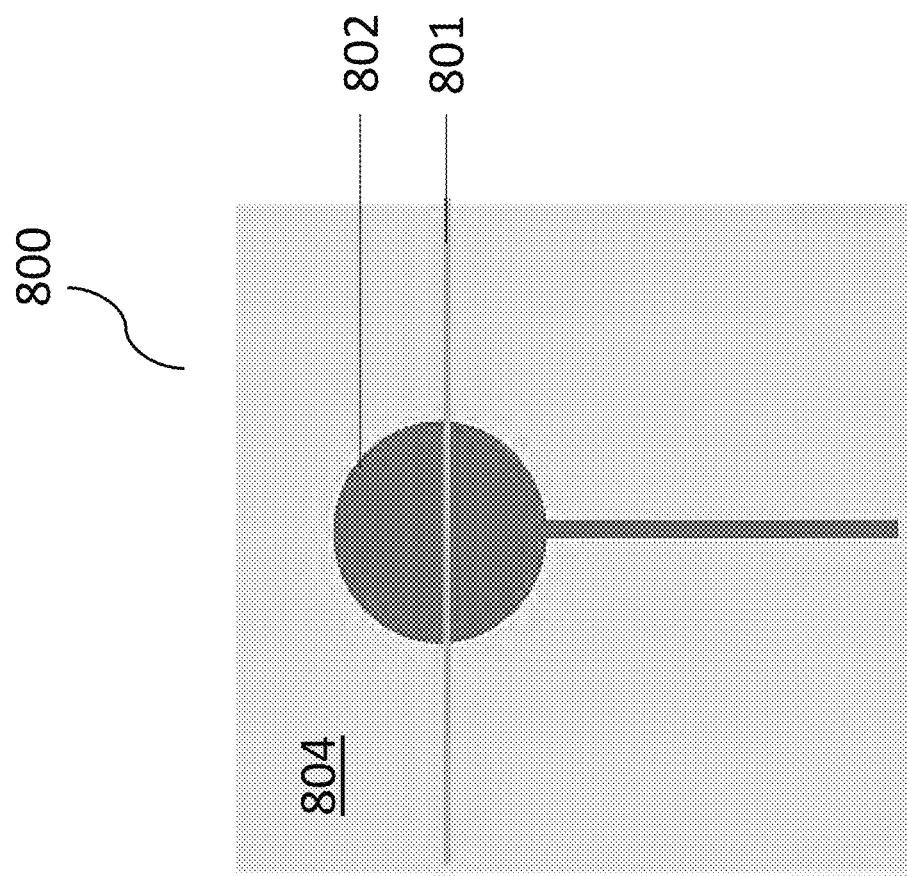
FIG. 8 illustrates an exemplary variation of WGM resonator and waveguide in a polymer structure.

FIG. 8 illustrates an exemplary variation of WGM resonator 802 and optical waveguide 801 in a polymer structure 804. As seen in FIG. 8, both the WGM resonator 802 and the optical waveguide 801 are embedded in the polymer structure. In one variation, the optical waveguide 801 may be embedded in a polymer structure 804 and then a WGM resonator 802 may be embedded in the polymer structure 804 such that the optical waveguide 801 optically couples with the WGM resonator 802. Alternatively, the WGM resonator 802 may be embedded in a polymer structure 804 and then the optical waveguide 801 may be embedded in the polymer structure 804 such that the optical waveguide 801 optically couples with the WGM resonator 802. In another alternative variation, the optical waveguide 801 and the WGM resonator 802 may be optically coupled together. Following the optical coupling, the coupled optical waveguide 801 and WGM resonator 802 may be embedded in the polymer structure 804. In this manner, the polymer structure 804 encapsulates the WGM resonator 802 and the optical waveguide 801. In one variation, the WGM resonator 802 may be a WGM microsphere resonator and the optical waveguide 801 may be a fiber taper.

As discussed above, the polymer structure may include a matching region, a backing region, a substrate, and an encapsulating region. In one variation, the WGM resonator may be placed on the substrate such that the WGM resonator is in direct contact with the substrate. The WGM resonator with the substrate may be sandwiched between the matching region and the backing region. In some variations, the space between the matching region and the substrate may be an encapsulating region that encapsulates the WGM resonator.

Figure 9:
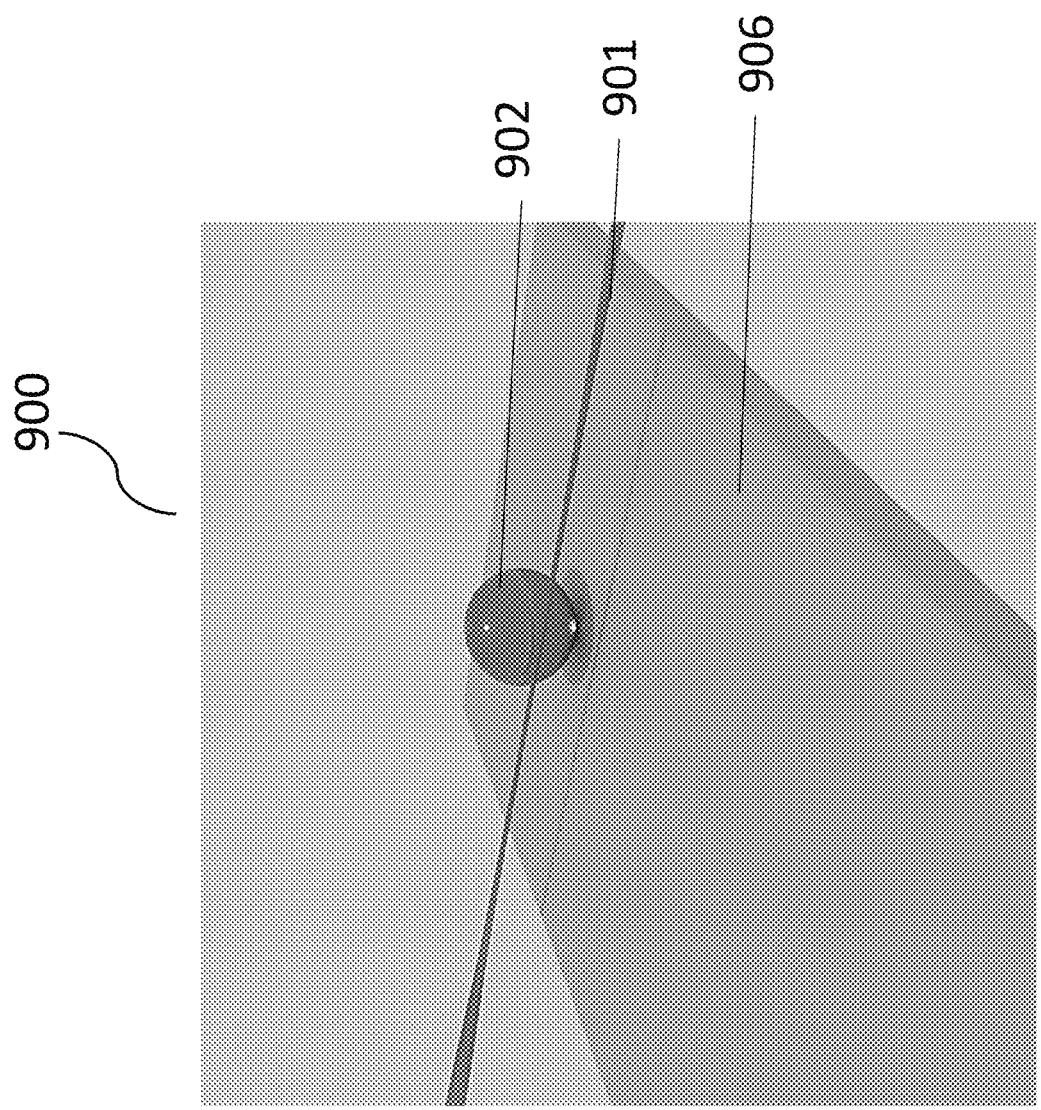
FIG. 9 illustrates an exemplary variation of a WGM resonator placed on a substrate and optically coupled to an optical waveguide.

FIG. 9 illustrates an exemplary variation of a WGM resonator 902 placed on a substrate 906 and optically coupled with an optical waveguide 901. As seen in FIG. 9, the WGM resonator 902 is in direct contact with the substrate 906. For example, the WGM resonator 902 may be fixed on the substrate 906 (e.g., using an adhesive such as polymer adhesive). Alternatively, the WGM resonator 902 may be embedded in the substrate 906. However, the optical waveguide 901 is coupled with the WGM resonator 902 such that the optical waveguide 901 is above the substrate 906 and not in direct contact with the substrate 906. As discussed above, the substrate 906 with the WGM resonator 902 and the optical waveguide 901 may be sandwiched between a backing region and a matching region. Put differently, the WGM resonator 902 and the optical waveguide 901 may be encapsulated in an encapsulating region that is in between the backing region and the matching region. In one variation, an array of WGM resonators may be placed on the substrate 906 in a similar manner to FIG. 9. In such a variation, an optical waveguide, such as optical waveguide 901 may be coupled to more than one WGM resonators in the array of WGM resonators. In some variations, the WGM resonator 902 may be a WGM microsphere resonator and the optical waveguide 901 may be a fiber taper.

Figure 10:
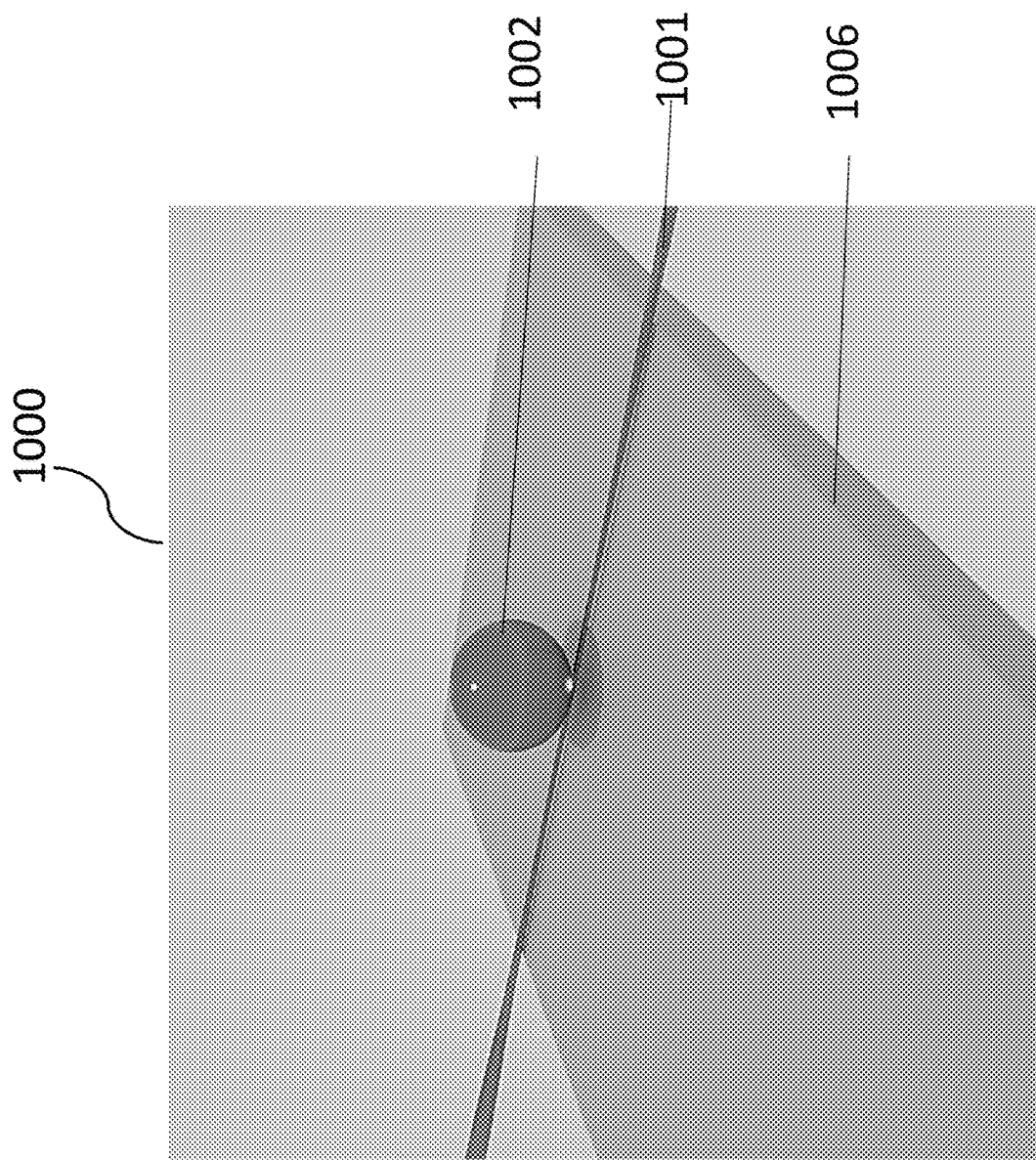
FIG. 10 illustrates an exemplary variation of a WGM resonator placed on a substrate and optically coupled to an optical waveguide.

In contrast to FIG. 9, FIG. 10 shows a WGM resonator 1002 coupled with an optical waveguide 1001 such that both the WGM resonator 1002 and the optical waveguide 1001 are in direct contact with the substrate 1006. Put differently, both the WGM resonator 1002 and the optical waveguide 1001 may be fixed on the substrate 1006 (e.g., using an adhesive). Alternatively, both the WGM resonator 1002 and the optical waveguide 1001 may be embedded in the substrate 1006. The refractive index of the substrate 1006 may be lower than the refractive index of the optical waveguide 1001. Similar to FIG. 9, the substrate 1006, the WGM resonator 1002, and the optical waveguide 1001 may be sandwiched between a backing region and a matching region. Put differently, the WGM resonator 1002 and the optical waveguide 1001 may be encapsulated in an encapsulating region that is between the backing region and the matching region. In some variations, an array of WGM resonators may be placed on the substrate 1006 such that the WGM resonators and the optical waveguides are both in direct contact with the substrate 1006 (similar to FIG. 10). In such a variation, an optical waveguide, such as the optical waveguide 1001 may be coupled with more than one WGM resonators in the array of WGM resonators. In one variation, the WGM resonator 1002 may be a WGM microsphere resonator and the optical waveguide 1001 may be a fiber taper.

Figure 11:
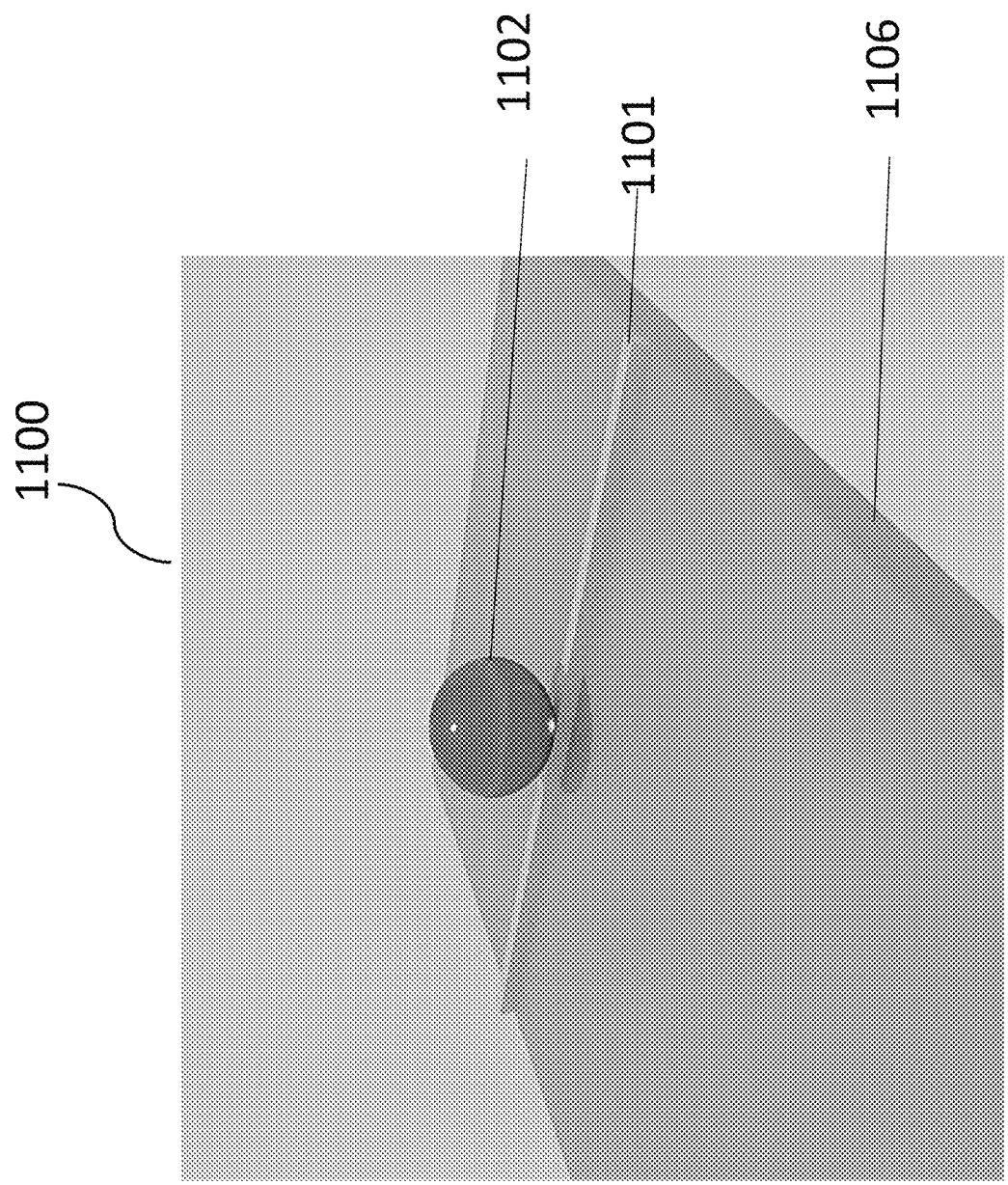
FIG. 11 illustrates an exemplary variation of WGM resonator optically coupled to a chip-scale optical waveguide placed on a substrate.

FIG. 11 illustrates an exemplary variation of a WGM resonator 1102 coupled with a chip-scale optical waveguide 1101 such that the chip-scale optical waveguide 1101 is placed on the substrate 1106. In this variation, the chip-scale optical waveguide 1101 may be in direct contact with the substrate 1106. The refractive index of the substrate 1106 may be lower than the refractive index of the chip-scale optical waveguide 1101. However, the WGM resonator 1102 although optically coupled to the chip-scale waveguide 1101 may not be in direct contact with the substrate 1106. For example, the chip-scale waveguide 1101 may be placed on the substrate 1106 (e.g., fixed on the substrate 1106 using an adhesive or embedded in the substrate 1106). The WGM resonator 1102 may be placed on the chip-scale waveguide 1101 (e.g., optically coupled to the chip-scale waveguide 1101) without being in contact with the substrate 1106. Similar to FIG. 9 and FIG. 10 the substrate 1106, the WGM resonator 1102, and the optical waveguide 1101 may be sandwiched between a backing region and a matching region.

WGM Resonator Arrays

In some variations, multiple WGM resonators may be packaged together in an array. The array of WGM resonators can be used in sensing devices and/or sensing apparatuses. Array of WGM resonators may increase the sensitivity of the sensing devices and/or sensing apparatuses owing to an increase in sensing area (i.e., area of multiple WGM resonators vs. area of a single WGM resonator). Additionally, each WGM resonator in the array of WGM resonators may coordinate in such a manner that they collectively respond to acoustic waves and/or pressure waves. This collective response may increase the strength of the output signal, thereby increasing the sensitivity of the sensing devices and/or sensing apparatuses.

An array of WGM resonators may be optically coupled to one or more optical waveguides. A polymer structure may encapsulate the optically coupled array of WGM resonators and optical waveguide(s). As described above, the polymer structure can include an encapsulating region encapsulating the WGM resonator(s) and/or the optical waveguide(s), a matching region, a backing region, and optionally a substrate. In some variations, the matching region and/or the backing region may function as the encapsulating region. For example, an array of WGM resonators may be included in a matching region of a polymer structure. One or more optical waveguides may be positioned in the polymer structure such that each WGM resonator may be optically coupled with the one or more optical waveguides. Each optical waveguide can be in the backing region, in the matching region, or both. Additionally or alternatively, each WGM resonator in an array of WGM resonators and/or one or more optically coupled optical waveguides may be placed on a substrate. The array of WGM resonators and the optical waveguides may be in an encapsulating region that is sandwiched between the matching region and the backing region.

Figure 12:
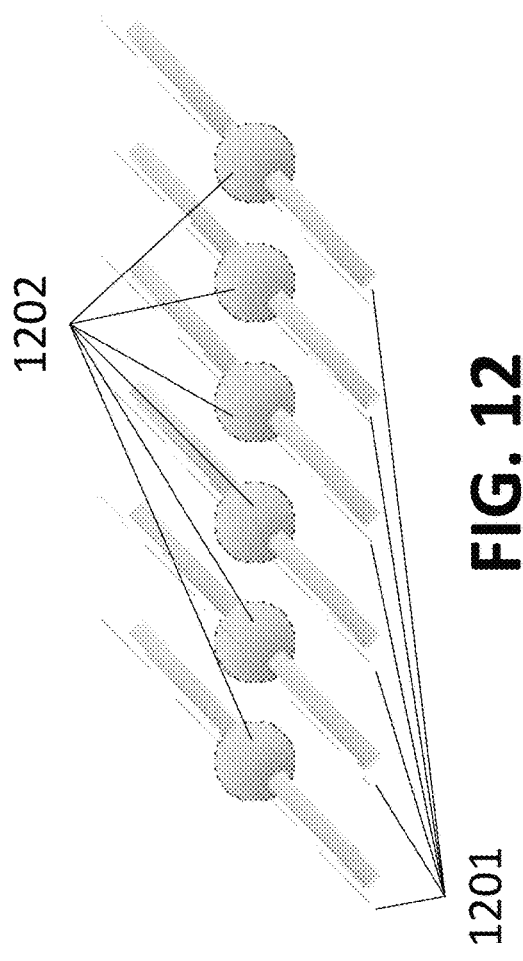
FIG. 12 is a schematic description of an exemplary WGM resonator array.

As shown in FIGS. 12-17, multiple WGM resonators may be arranged in various suitable kinds of arrays and in various suitable manners with respect to one or more optical waveguides. For example, FIG. 12 is a schematic description of a WGM resonator array 1202 in which individual WGM resonators are each coupled to a unique respective optical waveguide. For example, the WGM resonators in the WGM resonator array 1202 can be linearly arranged on a substrate (the substrate is not shown in FIG. 12) in parallel. Each WGM resonator from the WGM resonator array 1202 can then be optically coupled with one or more distinct optical waveguides 1201 such as through an alignment process (as described in FIG. 7). In at least some variations, the WGM resonators in the array 1201 can be equidistant from each other. Additionally or alternatively, at least some of the WGM resonators in the array 1201 can be separated by different distances.

Figure 13:
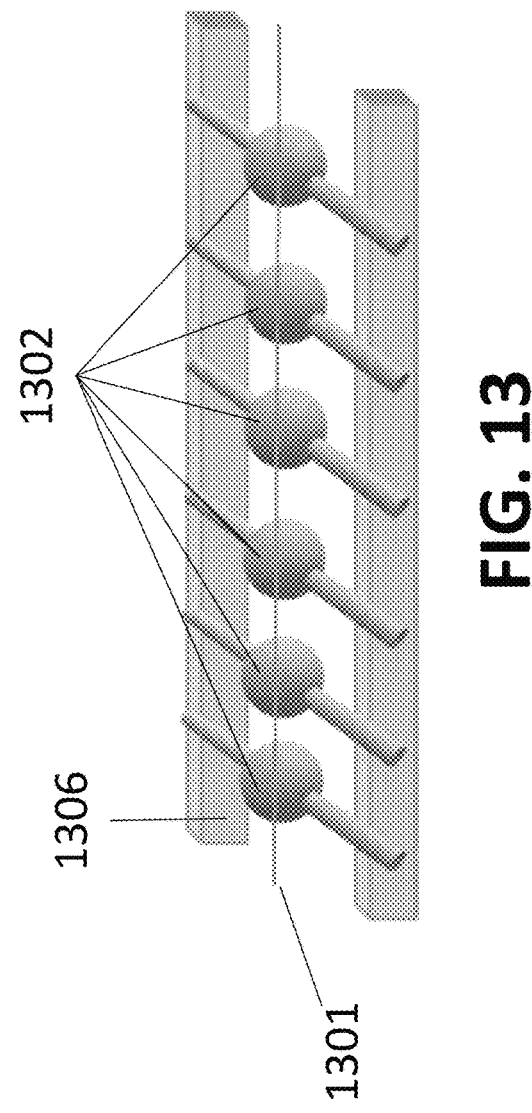
FIG. 13 is a schematic description of an exemplary WGM resonator array.

FIG. 13 is a schematic description of an exemplary WGM resonator array 1302. The WGM resonator array 1302 can be linearly arranged on a substrate 1306 in parallel, similar to the arrangement shown in FIG. 12. In some variations, at least some of the WGM resonators in the array 1302 can be equidistant from each other. Additionally or alternatively, at least some WGM resonators in the array 1302 can be separated by different distances. However, in contrast to the arrangement shown in FIG. 12, the multiple WGM resonators in the array 1302 can all be optically coupled with a single optical waveguide 1301. Accordingly, signals from the multiple WGM resonators can be coupled to and communicated by a single optical waveguide.

FIG. 14 is a schematic description of an exemplary WGM resonator array 1402. The WGM resonator array 1402 can include WGM resonators with various diameters and propagating various whispering gallery Modes (WGMs). In some variations, the WGM resonators in the array 1402 may not be the same size. In such a variation, it can be difficult optically coupling each of them to a single optical waveguide akin to the arrangement depicted in FIG. 13. To overcome this challenge, each WGM resonator in the WGM resonator array 1402 can be arranged non-linearly on the substrate 1406 with various vertical distances from a base plane of the substrate 1406. As shown in FIG. 14, the WGM resonators in the middle of the array 1402 are farther from the base plane of substrate than the WGM resonators at the ends of the array 1402. An optical waveguide 1401 can be placed in alignment to each WGM resonator in the WGM resonator array 1402 and then tightened, such that after fixing the position of the optical waveguide 1401 and the WGM resonator array 1402, the optical waveguide 1401 is configured to be optically coupled to every WGM resonator in the WGM resonator array 1402.

FIG. 15 is a schematic description of an exemplary WGM resonator array 1502. The WGM resonator array 1502 can be linearly arranged on a substrate 1506, such as a substrate 1506 with a low refractive index compared to refractive indices of the WGM resonator array 1502 and an optical waveguide 1501. The alignment procedure can become challenging with increasing number of WGM resonators in the WGM resonator array 1502 to be coupled with an optical waveguide 1501. To mitigate this, the optical waveguide 1501 can first be embedded in or be fixed on top of the substrate 1506. Then WGM resonators may be individually (e.g., one by one, or in other suitable grouping) and linearly arranged in parallel on top of the substrate 1506 and the optical waveguide 1501.

Figure 16:
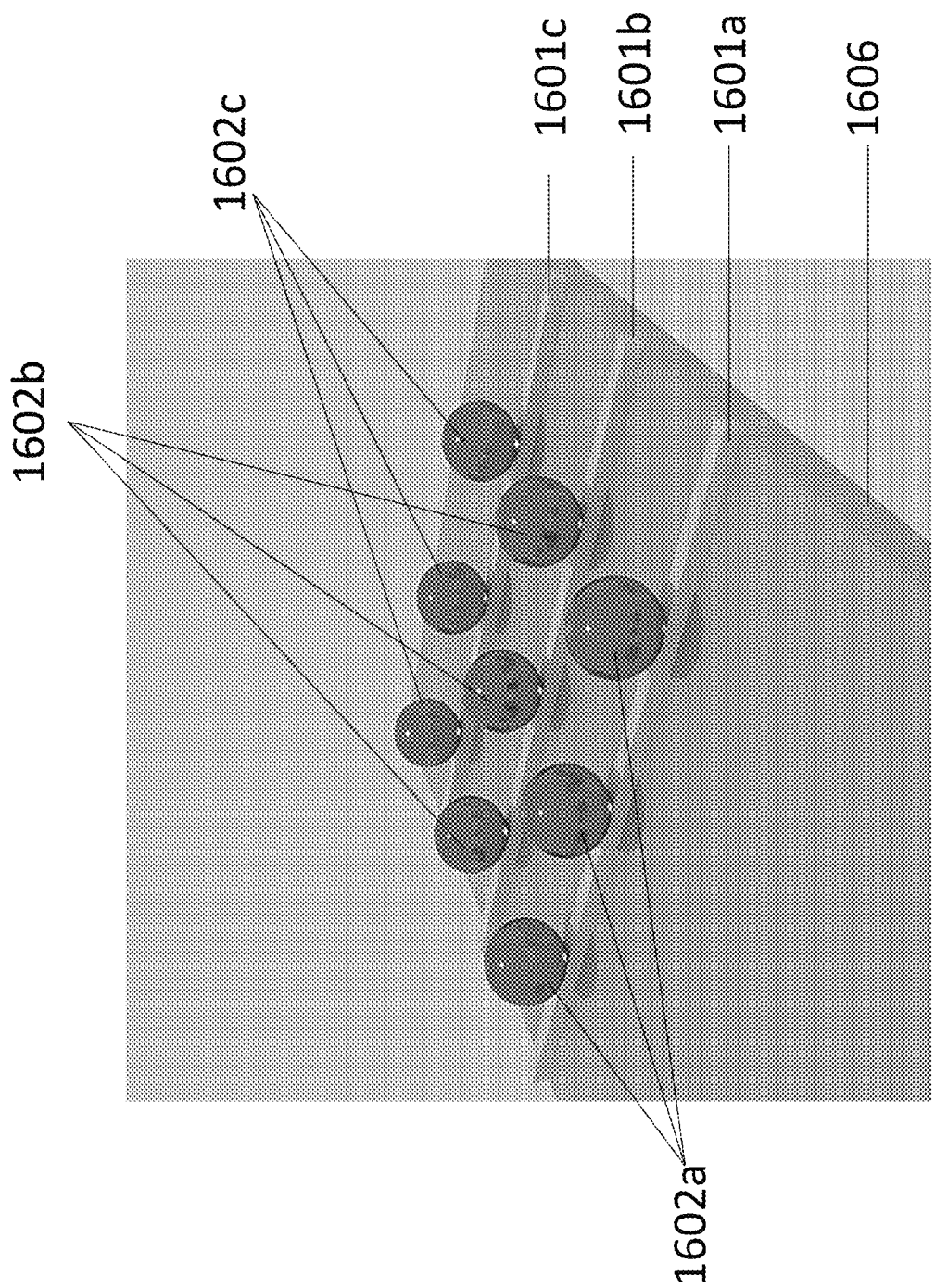
FIG. 16 is a schematic description of an exemplary WGM resonator array.

FIG. 16 is a schematic description of an exemplary WGM resonator array. The WGM resonator array 1602 may include multiple rows of WGM resonators to collectively form the resonator array. For instance, in FIG. 16, the array 1602 includes row 1602a, row 1602b, and row 1602c of WGM resonators. The rows 1602a, 1602b, and 1602c of WGM resonators may be arranged such that the WGM resonators collectively form an array 1602. The array 1602 may be rectangular array. It should be understood, however, that the arrangement shown in FIG. 16 is merely illustrative and a WGM resonator array in a rectangular array may have any suitable number of rows, columns, etc. and each row may have any suitable number of WGM resonators. Furthermore, the array may have any suitable form (e.g., radial array, hexagonal array, etc.).

In some variations, multiple optical waveguides (e.g., chip-scale optical waveguides) are arranged together on a substrate. For example, optical waveguides 1601a, 1601b, and 1601c are placed on the substrate 1606. They may be fixed on the substrate 1606 (e.g., using an adhesive) equidistant from each other in a linear manner. Alternatively, optical waveguides 1601a, 1601b, and 1601c may be fixed on the substrate 1606 at varying distances from each other. In some variations, the optical waveguides 1601a, 1601b, and 1601c may be embedded in the substrate 1606 at a predetermined distance from each other. Each optical waveguide may be optically coupled to a respective row of WGM resonators. For example, optical waveguide 1601a is optically coupled to WGM resonators in row 1602a, optical waveguide 1601b is optically coupled to WGM resonators in row 1602b, and optical waveguide 1601c is optically coupled to WGM resonators in row 1602c. The WGM resonators in each row 1602a, 1602b, and 1602c may be individually (e.g., one by one, or in other suitable grouping) and linearly arranged on top of their respective optical waveguides 1601a, 1601b, and 1601c.

For some sensing applications, it may be advantageous for the sensing device and/or the sensing apparatus to have a specific shape. For example, for applications such as endoscopy, it may be advantageous for the sensing device and/or the sensing apparatus to have a circular or otherwise compact cross-sectional shape. Similarly, a circular shaped sensing device and/or sensing apparatus may be best suited for use in catheters. For example, an endoscope or a catheter may include a slender tube or other member with a terminating sensing end. Therefore, in some variations, multiple WGM resonators may be bundled together in a circular arrangement to form a WGM resonator array such that the WGM resonator array forms the terminal sensing end of sensing device and/or the sensing apparatus.

FIG. 17A is a side view of an exemplary WGM resonator array 1702. As discussed in FIG. 1, some WGM resonators may include a substantially curved portion and a stem portion. In FIG. 17A, each of the WGM resonators in the WGM resonator array 1702 include a substantially curved portion and a stem portion (e.g., the substantially curved portion is supported by the stem portion). For instance, one WGM resonator in the array 1702 may include a substantially curved portion 1702a and a stem portion 1702b. Another WGM resonator in the array 1702 may include a substantially curved portion 1702a' and a stem portion 1702b'. The stem portion of the WGM resonators may be bundled together in a circular shape. That is, the stem portion of the WGM resonators may be bundled together so that collectively they may be within a circle. Alternatively, the stem portion of the WGM resonators may be bundled together so that collectively they may be within an ellipse. The stem portion of each WGM resonator may be parallel to each other. For example, stem portion 1702b and stem portion 1702b' are parallel to each other. The WGM resonator array 1702 may form a terminating sensing end of a sensing device and/or a sensing apparatus. For example, the stem portion of the WGM resonators may be arranged together in a circular shape on a common plane or otherwise compact cross-sectional shape. Alternatively, the stem portion of the WGM resonators may be aligned on a common plane such that they form a circular shape or otherwise compact cross-sectional shape. The substantially curved portion of the WGM resonators may collectively form the terminating end of a sensing device (e.g., a catheter or an endoscope).

FIG. 17B illustrates a top view of the exemplary WGM resonator array 1702. As seen in FIG. 17B, the substantially curved portion of the WGM resonators are collectively within a circle (which may be the terminating end of a sensing device and/or a sensing apparatus). Optical waveguide(s) may be coupled with each of the WGM resonators in the array 1702. The bundled WGM resonators may be embedded in a polymer structure and then included in a sensing device and/or a sensing apparatus.

It should be understood that any of the coupling arrangements described above with respect to FIGS. 12-17 can be combined in any suitable manner. In some variations, a WGM resonator array may include WGM resonators that may all be similar (e.g., similar size, similar thickness, similar material). Alternatively, a WGM resonator array may include WGM resonators that are different from at least some of the other WGM resonators in the array (e.g., different size, different thickness, different material). The choice of similar or dissimilar WGM resonators may depend on the sensing application for which the WGM resonator array might be used. Similarly, the number of WGM resonators in an array may also vary depending on the sensing application.

Exemplary Packaged WGM Resonator Arrays

After aligning one or more optical waveguides with a WGM resonator array, the one or more optical waveguides and the WGM resonator array can be encapsulated in a polymer structure as described above. The polymer structure can help to maintain the distances of the one or more optical waveguides from the WGM resonator array. The polymer structure can have a refractive index lower than refractive indices of the one or more optical waveguides and the WGM resonator array. In some variations, increasing the difference between the refractive index of the WGM resonators and the polymer structure can enable WGM resonators with smaller diameters to be utilized for sensing applications. Accordingly, the contrast between the refractive index of the WGM resonators in the array and the refractive index of the polymer structure may be high so as to include WGM resonators with smaller diameters in the array. This in turn may increase the operating bandwidth of the sensing device and/or the sensing apparatus that includes the WGM resonator array.

FIG. 18A illustrates an exemplary variation of a WGM resonator array 1802 packaged in a polymer structure. The WGM resonators in the array 1802 may be arranged on a substrate 1806. For example, the WGM resonators may be fixed on the substrate 1806 such that each WGM resonator may be at equal distance from their subsequent WGM resonator in the array 1802. Alternatively, the WGM resonators may be fixed on the substrate 1806 such that at least some WGM resonators may be at different distances from their subsequent WGM resonators. In yet another variation, the WGM resonators may be embedded in the substrate 1806 at a predetermined distance from each other. The WGM resonator array 1802 along with the substrate 1806 may be sandwiched between a backing region 1810 and a matching region 1808. The space between the matching region 1808 and the backing region 1810 encapsulating the WGM resonator array 1802 on the substrate 1806 may form an encapsulating region 1814.

As seen in FIG. 18A, the WGM resonators in the array 1802 may be arranged such that the size of the WGM resonators are in ascending order. For instance, WGM resonator 1802a is the smallest in the array 1802 while the WGM resonator 1802g is the largest in the array 1802. The smallest WGM resonator 1802a is at one end of the array 1802 while the largest WGM resonator 1802g is on the other end of the array 1802.

In contrast, FIG. 18B illustrates an exemplary variation of a WGM array 1802' packaged in a polymer structure such that the WGM resonators are arranged in a manner such that the sizes may not be in a specific order. Put differently, the WGM resonator array 1802' may include WGM resonators of randomly distributed sizes (e.g., not arranged in ascending order or descending order). For example, the largest WGM resonator 1802f is not at either end of the array 1802'. However, WGM resonator 1802g' arranged at one end of the array 1802' is neither the largest in the array 1802' nor the smallest in the array 1802'. Similar to FIG. 18A, the WGM resonator array 1802 may be packaged such that the WGM resonator array 1802' along with the substrate 1806' may be sandwiched between a matching region 1808' and a backing region 1810' (e.g., WGM resonator array 1802' may be encapsulated within an encapsulating region 1814').

Figure 19:
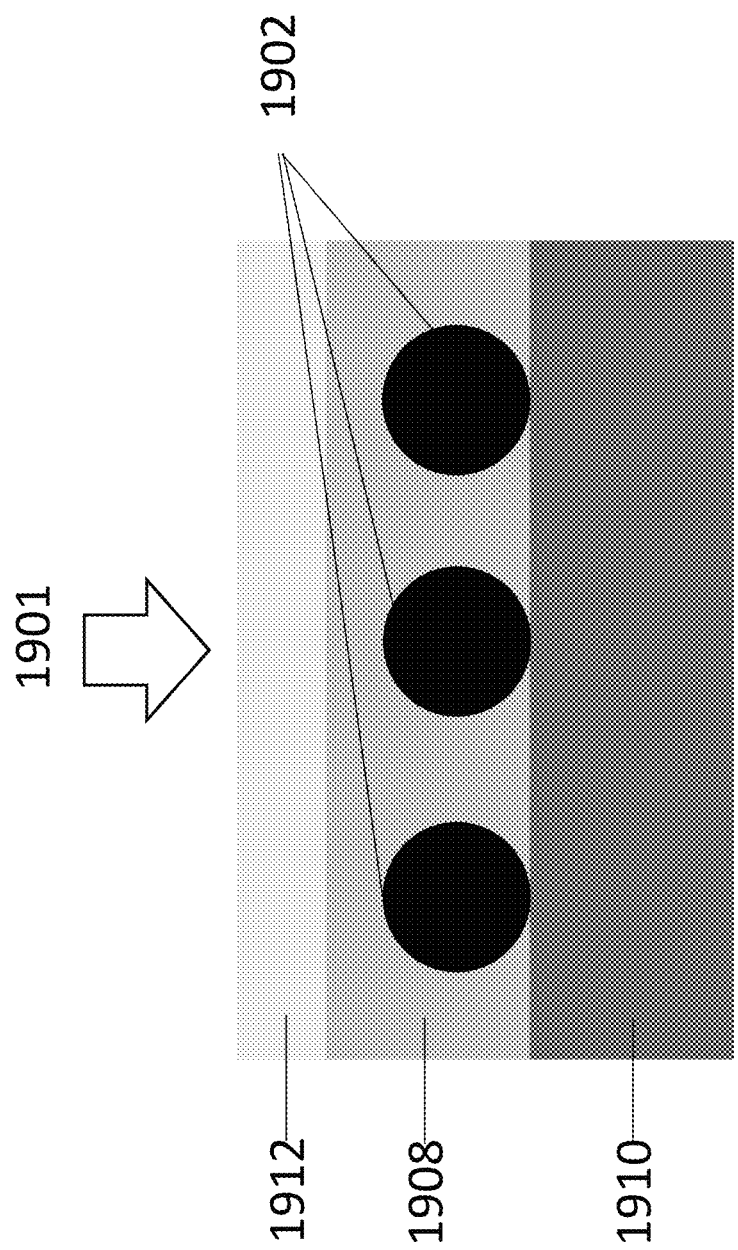
FIG. 19 is a schematic description of an exemplary variation of a packaged WGM resonator array.

FIG. 19 is a schematic description of an exemplary variation of a packaged WGM resonator array 1902. The polymer structure may include a matching region 1908, a backing region 1910, and one or more coating layers 1912. In some variations, the coating layer(s) 1912 and the matching region 1908 may comprise the same material. For example, the matching region 1908 and the coating layers 1912 may include multiple layers of a suitable matching material. Alternatively, in some variations, the material properties (e.g., acoustic impedance) in the polymer structure may change in a gradual manner (e.g., gradual change in material properties from the matching region 1908 to the one or more coating layers 1912), which may maximize the transmission of acoustic waves to the WGM resonator array 1902 in the polymer structure and/or minimize the undesirable reflection of ultrasound waves. In other variations, the coating layer(s) 1912 and the matching region 1908 may comprise different materials. For example, the matching region 1908 may include a polymer with a lower refractive index than the material of the WGM resonator(s), and/or may include material with low optical loss to better carry light to the WGM resonator(s). The WGM resonator array 1902 may be embedded in the matching region 1908.

When in use during ultrasound sensing, a set of ultrasonic echoes 1901 can transmit through the matching polymer 1908 and or other coating layers 1912, to reach the WGM resonator array 1902, with a transmission intensity of coefficient of:

$$T = \frac{4Z_1Z_3}{(Z_1 + Z_3)^2\cos^2(kd) + \left(Z_2 + \frac{Z_1Z_3}{Z_2}\right)^2\sin^2(kd)}$$

where $Z_1$ denotes an acoustic impedance of an environment above the matching polymer 1908 and or other coating layers 1912, $Z_2$ denotes an acoustic impedance of the matching polymer 1908, $Z_3$ denotes an acoustic impedance of the WGM resonators in the array 1902, and d denotes the thickness of the matching polymer 1908. When $Z_2^2=Z_1Z_3$ and d=λ/4 (where λ denotes a wavelength of the set of ultrasonic echoes), transmission intensity is unity. In cases when the matching polymer 1908 that follows the relationship $Z_2^2=Z_1Z_3$ cannot be found, the thickness of the matching polymer 1908 could be desired to be set to d=λ/4, because:

$$T = \frac{4Z_1Z_3}{(Z_1+Z_3)^2\cos^2(kd) + \left(Z_2 + \frac{Z_1Z_3}{Z_2}\right)^2 \sin^2(kd)} =$$

$$\frac{4Z_1Z_3}{\left[(Z_1+Z_3)^2 - \left(Z_2 + \frac{Z_1Z_3}{Z_2}\right)^2\right]\cos^2(kd) + \left(Z_2 + \frac{Z_1Z_3}{Z_2}\right)^2}$$

and for $0<Z_1<Z_2<Z_3$, $$(Z_1+Z_3)^2 - \left(Z_2 + \frac{Z_1Z_3}{Z_2}\right)^2 > 0$$

Therefore, it could be still desired for $\cos^2(kd)=0$, in which case, d=λ/4 to obtain a maximum transmission. In addition, it is also desired that the matching polymer 1908 have a low refractive index so that WGM resonator array 1902 can confine light to generate WGMs with high Q factors.

Making Sensing Devices and/or Sensing Apparatuses

Described herein are some exemplary variations of making the sensing devices and/or the sensing apparatuses described above. As discussed above, the operating bandwidth of a sensing device and/or a sensing apparatus may depend among other factors on the size of the WGM resonator(s), refractive index of the WGM resonator(s), and the acoustic impedance of the material used to fabricate the WGM resonator(s). Accordingly, the desired material for fabricating WGM resonator(s) may be chosen based on the sensing application and the operating bandwidth for the application.

For example, in the case of ultrasound sensing, the material for the WGM resonator(s) may be selected so that the acoustic impedance of the material matches the acoustic impedance of the polymer structure (e.g., polymer structure including the backing region and the matching region). This can eliminate echo in the sensing device and/or the sensing apparatus, minimize acoustic impedance mismatch between the WGM resonator(s) and the polymer structure, and enhance the acoustic wave penetrating into the WGM resonator(s). This in turn may increase the response of the WGM resonator(s) through elasto-optic effects and/or physical deformation of the WGM resonator(s). Furthermore, it may be desirable that the material has a low Young's modulus so as to increase the mechanical deformation induced by ultrasound in the material. Additionally, the material for fabricating the WGM resonator(s) may be selected so as to increase the contrast in the refractive index of the material and the refractive index of the surrounding medium (e.g., polymer structure). This can enable WGM resonator(s) with small diameters to increase their operating bandwidth, thereby increasing the sensitivity of the sensing device and/or the sensing apparatus. In some variations, the material for fabricating WGM resonator(s) may include an ultrasounic enhancement material such as for example, polyvinylidene fluoride, parylene, polystyrene, and/or the like. The ultrasonic enhancement material can increase the sensitivity of the WGM resonator(s). For example, the ultrasonic enhancement material may have a relatively high elasto-optic coefficient. Therefore, when a set of ultrasound echoes are received, the refractive index of the ultrasonic enhancement material may change more than the refractive index of a non-enhancement material (e.g., upon receiving a mechanical stress or strain induced by a set of ultrasound echoes). This can increase the response of the sensing device and/or the sensing apparatus to ultrasound signals.

In addition to selecting the material for WGM resonator(s) based on the sensing applications, the size of the WGM resonator(s) may be manipulated based on the sensing application. For example, it may be desirable to have WGM resonator(s) of smaller size (e.g., WGM resonator(s) with size smaller than 100 microns) for endoscopic applications. The size of the WGM resonator(s) may be manipulated by controlling the heating process. For example, the heating process may be controlled to be precise so as to apply heat at very specific and precise locations. Alternatively or additionally, the size of the WGM resonator(s) may be manipulated by controlling the amount of heat that is applied. Additionally or alternatively, the size of the fiber and/or capillary tube used to fabricate the WGM resonator(s) may be manipulated in order to manipulate the size of the WGM resonator(s).

Fabricating WGM Resonators

Figure 20B:
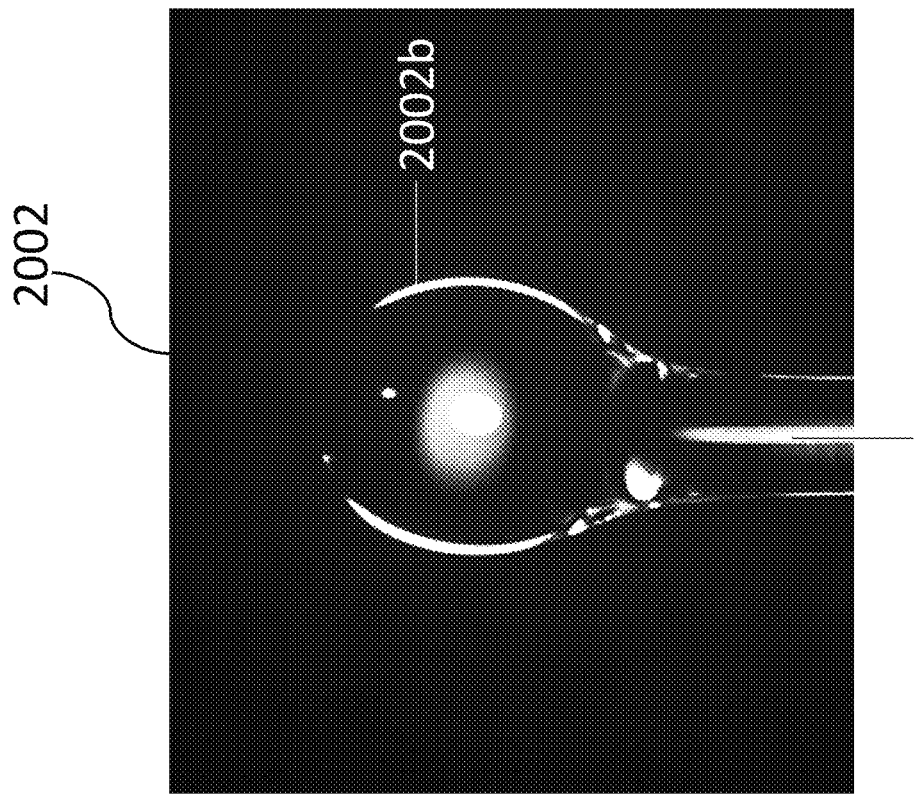
FIG. 20B illustrates an exemplary variation of a method of fabricating a WGM microsphere resonator using an optical fiber with a cleaved portion.
Figure 20A:
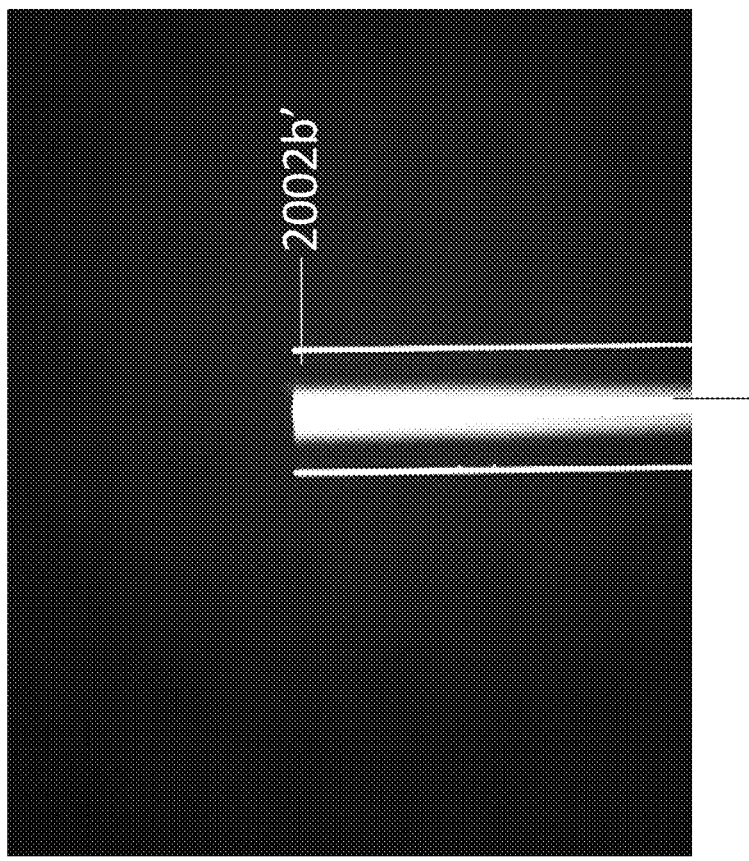
FIG. 20A illustrates an exemplary variation of a method of fabricating a WGM microsphere resonator by forming a cleaved portion on at least one end of an optical fiber.

FIG. 20A illustrates an exemplary variation of a method of fabricating a WGM microsphere resonator by forming a cleaved portion on at least one end of an optical fiber 2002'. In some variations, an optical transparent fiber such as silica fiber or polymer fiber can be used to fabricate the WGM microsphere resonator. In some variations, the optical fiber 2002' may be glass, transparent polymer (e.g., polydimethylsiloxane), silica glass, silicon nitride, titanium dioxide, and/or any other suitably optically transparent material. The optical fiber 2002' may be chosen based on, for example, its refractive index, acoustic properties, Young's modulus, and/or diameter. The sensing application that the WGM microsphere may be used for may be a factor that is considered when choosing the optical fiber 2002'. For example, the diameter of the optical fiber 2002' may affect the size of the WGM microsphere resonator.

In some variations, once the optical fiber 2002' is selected, cladding may be stripped (e.g., using a fiber coating stripper) from one end (e.g., end 2002b') of the optical fiber 2002', thereby exposing the inner core of the optical fiber 2002'. One end 2002b' (e.g., the end from which the cladding was stripped) may be cleaved (e.g., using an optical fiber cleaver). In contrast to cutting an optical fiber (e.g., using wire cutters), cleaving may produce a smooth uniform cut that can cause an even reflow in subsequent processes. The optical fiber 2002' may be cleaned using methanol, ethanol, isopropyl alcohol, etc. In one variation, the optical fiber 2002' may be cleaned after stripping the cladding. In another variation, the optical fiber 2002' may be cleaned after cleaving the optical fiber. In still another variation, the optical fiber 2002' may be cleaned after both stripping the cladding and cleaving.

FIG. 20B illustrates an exemplary variation of a method of fabricating a WGM microsphere resonator 2002 using an optical fiber 2002' with a cleaved end 2002b'. The WGM microsphere resonator 2002 can be fabricated from the optical fiber 2002' using a reflow process. The cleaved optical fiber 2002' may be subjected to heat at one end 2002b' (e.g., the end of the optical fiber that has been cleaved). A $CO_2$ laser, an arc discharger, a heating coil, or any other suitable heat source may be used to subject the end of the optical fiber to heat. In some variations, the heat source may be manipulated to control the amount of heat applied to the optical fiber. For example, the heat direction may be controlled with a set of one or more lenses, beamsplitters, mirrors, thermally conductive surfaces, etc. The melted end of the optical fiber forms a spherical shape 2002b due to the surface tension of the melted optical fiber. In some variations, the optical fiber may be a single-mode fiber.

In some variations, one end (e.g., the end of the optical fiber that has been cleaved) of the cleaved optical fiber 2002' may be placed into a fusion splicer to generate the spherical part 2002b of the WGM microsphere resonator. As discussed above, some WGM resonators may include a stem portion. The part of the cleaved optical fiber 2002' not subjected to the heat may form the stem portion 2002ab of the WGM microsphere resonator. In some variations, the diameter of the spherical portion 2002b of the WGM microsphere resonator may be between about 15 μm and about 500 μm. In some variations, the diameter of the WGM microsphere resonator may be 300 μm.

As discussed above, the size of a WGM microsphere resonator can be changed by varying the diameter on the optical fiber. In one variation, in order to fabricate smaller WGM microsphere resonators, one end of an optical fiber can be tapered. FIG. 21A illustrates an exemplary variation of a tapered optical fiber tip 2102 for use in fabricating WGM microsphere resonators of varying sizes. One end of an optical fiber (e.g., an optical fiber comprising material similar to the optical fiber in FIGS. 20A and 20B) may be tapered by gently stretching the end of the optical fiber while the end is subjected to heat using a suitable heat source. The optical fiber becomes soft. Stretching the end of the optical fiber may make the optical fiber thinner over at least some of the length. Put differently, stretching the end of the optical fiber may reduce the diameter of the optical fiber at least at the stretched end. In this manner, a tapered fiber tip 2102 may be produced. A WGM microsphere resonator may be fabricated from the tapered fiber tip 2102 using a reflow process such as the method described in FIGS. 20A and 20B.

Figure 21B:
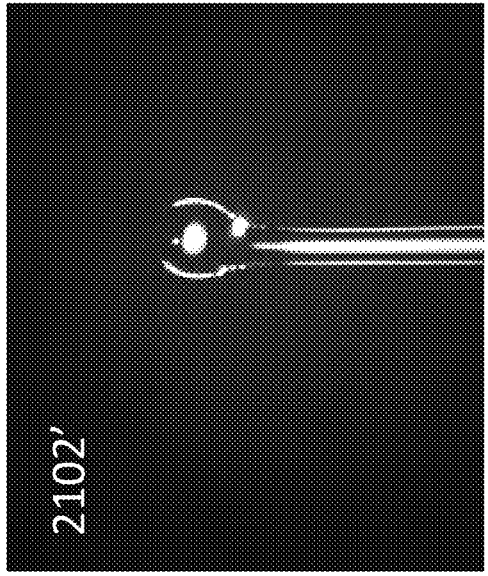
FIG. 21B illustrates an exemplary variation of a WGM microsphere resonator fabricated using a tapered optical fiber tip.
Figure 21C:
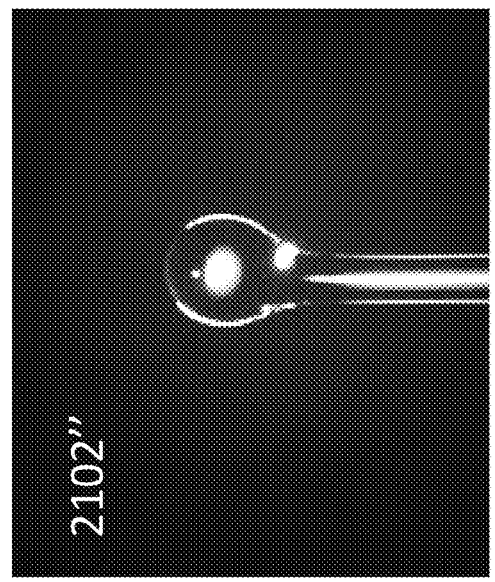
FIG. 21C illustrates an exemplary variation of a WGM microsphere resonator fabricated using a tapered optical fiber tip.
Figure 21A:
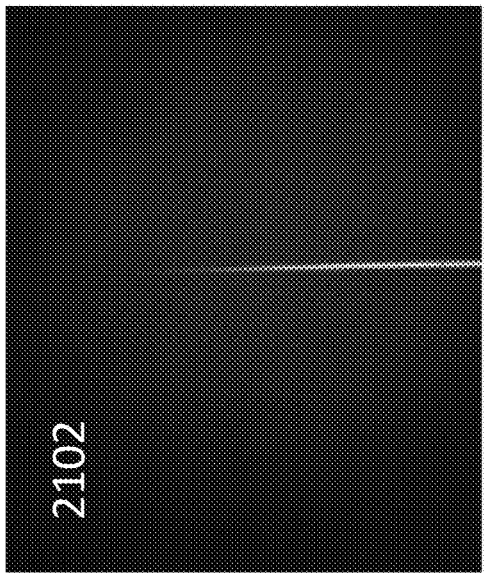
FIG. 21A illustrates an exemplary variation of a tapered optical fiber tip for use in fabricating WGM microsphere resonators of varying sizes.

FIG. 21B illustrates an exemplary variation of a WGM microsphere resonator 2102' fabricated using a tapered optical fiber tip 2012. Put differently, the end of the tapered fiber tip 2102 may be cleaved and heated to produce the substantially curved portion (e.g., the spherical portion) of the WGM microsphere resonator 2102'. The WGM microsphere resonator 2102' fabricated using the tapered fiber tip 2102 may have a smaller diameter. For example, the diameter of the substantially curved portion of the WGM microsphere resonator 2102' may be 130 μm. In order to increase the size of the WGM microsphere resonator 2102', a larger portion of the fiber tip 2102 may have to be heated. Heating more of the fiber tip 2102 increases the amount of material that may be reflowed into the substantially curved portion. FIG. 21C illustrates an exemplary variation of a method of a larger sized WGM microsphere resonator 2102" fabricated using a tapered optical fiber tip 2102. The WGM resonator 2102" can be fabricated by increasing the amount of portion on the fiber tip 2102 that is subject to heat. In this example, the diameter of the substantially curved portion of the WGM microsphere resonator 2102" is 180 μm.

Figure 22:
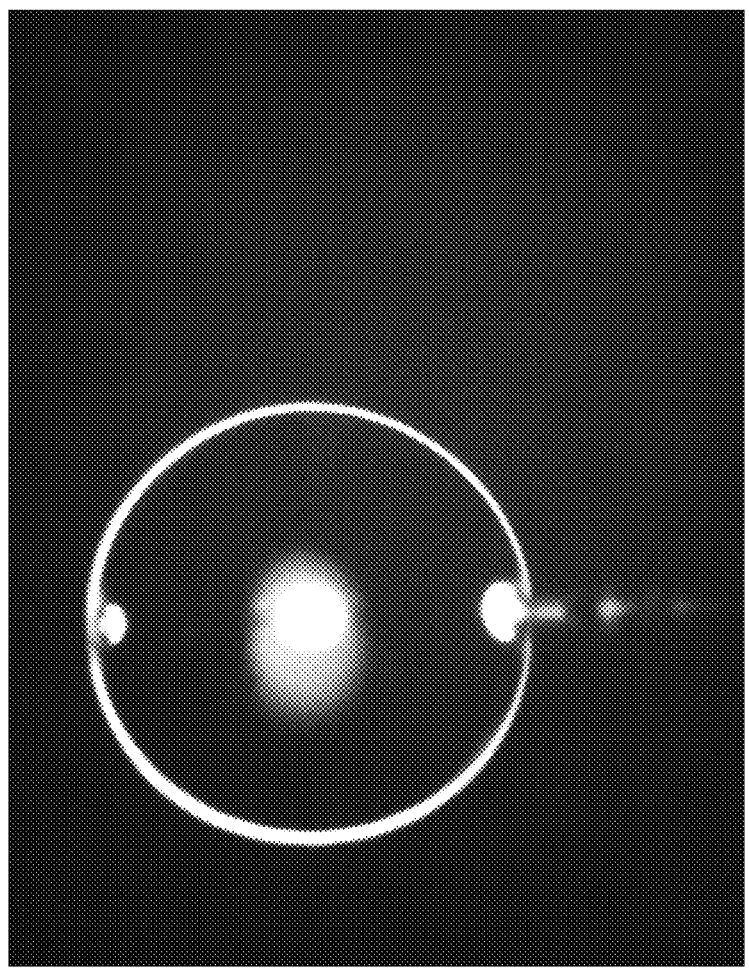
FIG. 22 illustrates an exemplary variation of a WGM microsphere resonator fabricated from a polymer fiber.

As described above, WGM microsphere resonators may be fabricated from silica fiber using the process disclosed in FIG. 20 and/or FIG. 21. The WGM microsphere resonators depicted in FIGS. 20 and 21 are fabricated from silica fiber. FIG. 22 illustrates an exemplary variation of a WGM microsphere resonator fabricated from a polymer fiber. For example, the polymer fiber may comprise polydimethylsiloxane. The WGM microsphere resonator in FIG. 22 may be fabricated using a process described in FIGS. 23A-23C and/or FIGS. 24A-24C described below.

FIGS. 23A-23C are schematic descriptions of an exemplary variation of a method of fabricating a WGM microsphere resonator using a transfer device 2314. The method includes using a transfer device 2314 to transfer a material onto a fiber tip 2316. For example, a transfer device 2314 may be used to extract a suitable material for fabricating the WGM microsphere resonator. In some variations, the transfer device 2314 may be a needle. In some variations, the transfer device 2314 may be a syringe. In yet another variation, the transfer device 2314 may be a syringe with a needle at one end. In some variations, the material may be glass, transparent polymer (e.g., polydimethylsiloxane), silica glass, silicon nitride, titanium dioxide, or any other suitably optically transparent material.

When the optically transparent material is extracted using the transfer device 2314, the optically transparent material may form a droplet 2302' on the transfer device 2314. The size of the WGM microsphere resonator may depend on the size of the droplet 2302'. The size of the droplet may be varied by changing the amount of pressure applied to the transfer device 2314, changing the size of a nozzle on the transfer device 2314, and/or changing the size of a needle on the transfer device 2314. In this manner, WGM microsphere resonators of varied sizes can be fabricated in a controlled manner.

The extracted droplet 2302' may be placed at the end of a fiber tip 2316 (e.g., droplet 2302"). In some variations, the fiber tip 2316 may comprise the same material as the droplet 2302". In some variations, the fiber tip 2316 may comprise an optically transparent material different from the droplet 2302". In some variations, one end (e.g., the end on which the droplet is placed) of the fiber tip 2316 may be tapered. In some variations, the fiber tip may be non-tapered. In some variations, the fiber tip 2316 may be a glass fiber tip. Once the droplet 2302" is placed on the fiber tip 2316, the transfer device 2314 may be retracted to form a spherical 2302 portion that subsequently forms the substantially curved portion of the WGM resonator. The surface tension of the material (i.e., the material of the droplet) may maintain the spherical shape. The spherical portion 2302 may be cured using heat, moisture, ultraviolet light, etc. to form a WGM microsphere resonator.

Figure 24B:
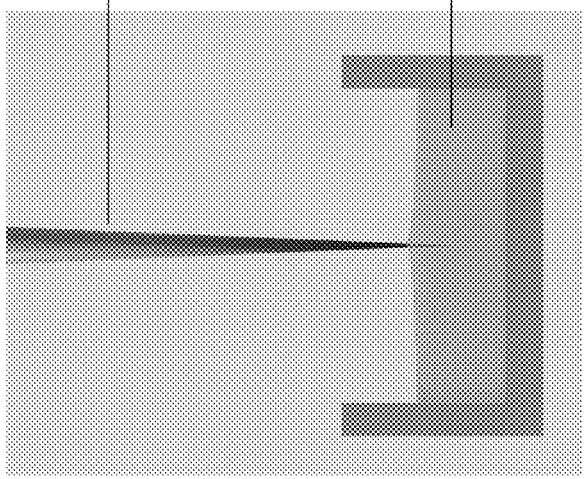
FIGS. 24A-24C are schematic descriptions of an exemplary variation of a method of fabricating a WGM microsphere resonator using a dip coating process.
Figure 24A:
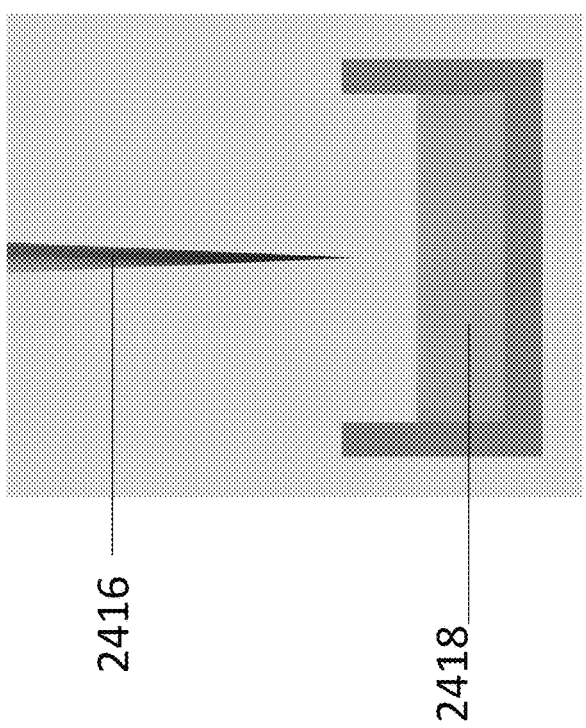
Figure 24C:
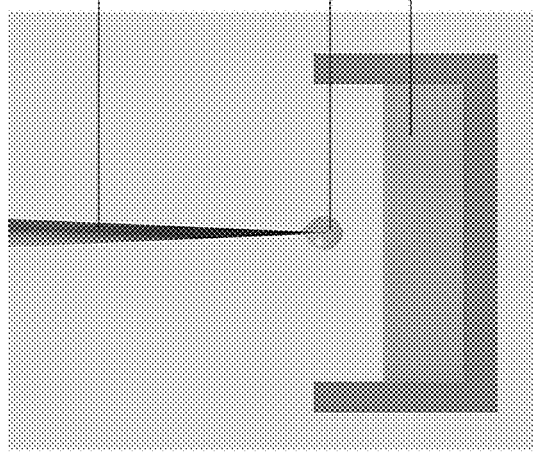

FIGS. 24A-24C is a schematic description of an exemplary variation of a method of fabricating a WGM microsphere resonator using a dip coating process. In one variation, an optical fiber 2416 may be dipped into a pool 2418 of optically transparent material (as shown in FIG. 24B). For example, the pool 2418 may comprise glass, transparent polymer (e.g., polydimethylsiloxane), silica glass, silicon nitride, titanium dioxide, or any other suitably optically transparent material. In some variations, the end of the optical fiber 2416 dipped into the pool 2418 may be tapered. In some variations, the optical fiber 2416 may be non-tapered. The pool 2418 may comprise optically transparent polymer. The optical fiber 2416 may be silica fiber or glass.

When the optical fiber 2416 is retracted from the pool 2418 (as shown in FIG. 24C), the retracted end of the optical fiber 2416 may include the optically transparent material from the pool 2418 such that the optically transparent material on the retracted end is spherical 2402 in shape.

Surface tension of the optically transparent material may maintain the spherical shape. The spherical shaped optically transparent material 2402 may be cured (e.g., using heat, moisture, ultraviolet light, etc.) to form the substantially curved portion of the WGM microsphere resonator. The portion of the optical fiber 2416 that is not dipped in the pool and not subject to heat may form the stem portion of the WGM microsphere resonator. The size of the WGM microsphere resonator (e.g., the diameter of the spherical portion) may be based on the diameter of the end of the optical fiber 2416 dipped into the pool 2418, the speed at which the optical fiber 2416 is retracted from the pool 2418, etc.

In another variation, a filament of the optically transparent material may be extracted from the pool 2418. In such a variation, the filament may be heated using a suitable heat source (e.g., a furnace, a butane flame, a hydrogen flame, or a laser). The heat may cause the optically transparent material to melt. The melted portion of the filament may form the substantially curved portion (e.g., spherical portion) of the WGM microsphere resonator using a reflow process (e.g., reflow process described in FIG. 20).

Figure 25:
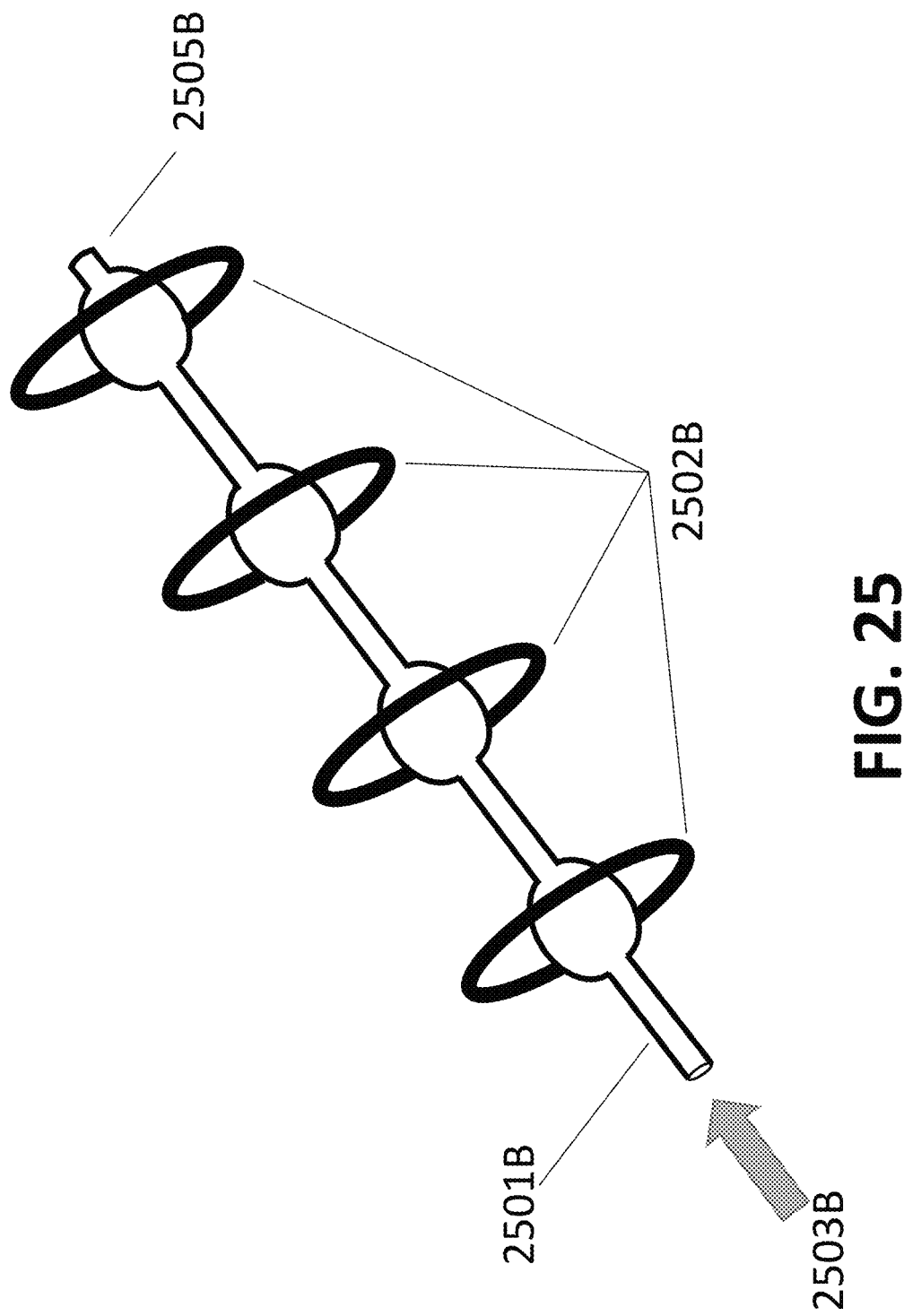
FIG. 25 is a schematic description of an exemplary variation of a method of fabricating a WGM microbubble resonator.

FIG. 25 is a schematic description of an exemplary variation of a method of fabricating a WGM microbubble resonator. The fabrication process may include sealing one end 2505B of a capillary tube 2501B. The seal on the end 2505B may, for example, be formed from a plug material (e.g., epoxy), by heating and pinching off an open end of the capillary tube 2501B, etc. Alternatively, the capillary tube 2501B may be molded with a closed end 2505B. The end opposite to the sealed end 2505B may be connected to a pressure source (e.g., pump or a compressor) to control a gas flow inside the capillary tube 2501B. A stable pressure may be maintained inside the capillary tube 2501B, sealed at the end 2505B, using a gas flow 2503B. The method may also include heating the capillary at one or more target microbubble locations using a set of resistive heating elements 2503B. Each resistive heating element 2503B can surround (e.g., encircle) the capillary tube 2501B at a respective target WGM microbubble resonator location, such that the set of resistive heating elements may precisely apply heat to a set of target WGM microbubble resonator locations. The fabrication process of the set of WGM microbubble resonators can be repeated with a precise controllability to consistently reproduce the set of WGM microbubble resonators with desired geometrical dimensions of the microbubble resonator 2502B including radius R of the outer microbubble and radius r of the inner microbubble and the wall thickness as describe with respect to FIG. 2. The precise controllability of the fabrication process can be used to fabricate the set of WGM microbubble resonators to have wall thickness smaller than the wavelength of a set of ultrasound echoes that the set of WGM microbubble resonators are designed to sense.

It should be readily appreciated that the WGM resonators can be fabricated using any suitable optically transparent material using any one or a combination of methods described in FIGS. 20-25.

Fabricating WGM Resonator Arrays

As discussed above, in some variations, a sensing device and/or a sensing apparatus may include an array of WGM resonators. The WGM resonator arrays may be fabricated by fabricating each individual WGM resonators and aligning one or more optical waveguides to the WGM resonators such that the WGM resonators couple with the one or more optical waveguides. Each individual WGM resonators of a WGM resonator array may be fabricated simultaneously at the same time. Alternatively, at least some WGM resonators of a WGM resonator array may be fabricated at a different time from some other WGM resonators of the WGM resonator array (e.g., sequentially).

In some variations, the individual WGM resonators for a WGM resonator array may be fabricated along a single fiber and/or a capillary tube. Referring back to FIG. 25, using the exemplary method described above with respect to FIG. 25, multiple WGM microbubble resonators can be fabricated from a single capillary tube 2501B. These multiple WGM microbubble resonators may be fabricated simultaneously by using a set of resistive heating elements at precise locations simultaneously. As discussed above with respect to FIG. 25, the size of each WGM microbubble resonator can be controlled in a precise manner. Accordingly, a WGM resonator array with WGM microbubble resonators of different sizes can be fabricated from the same capillary tube 2501B. Similarly, a WGM resonator array with WGM microbubble resonators of same size can be fabricated from the same capillary tube 2501B.

Figure 26:
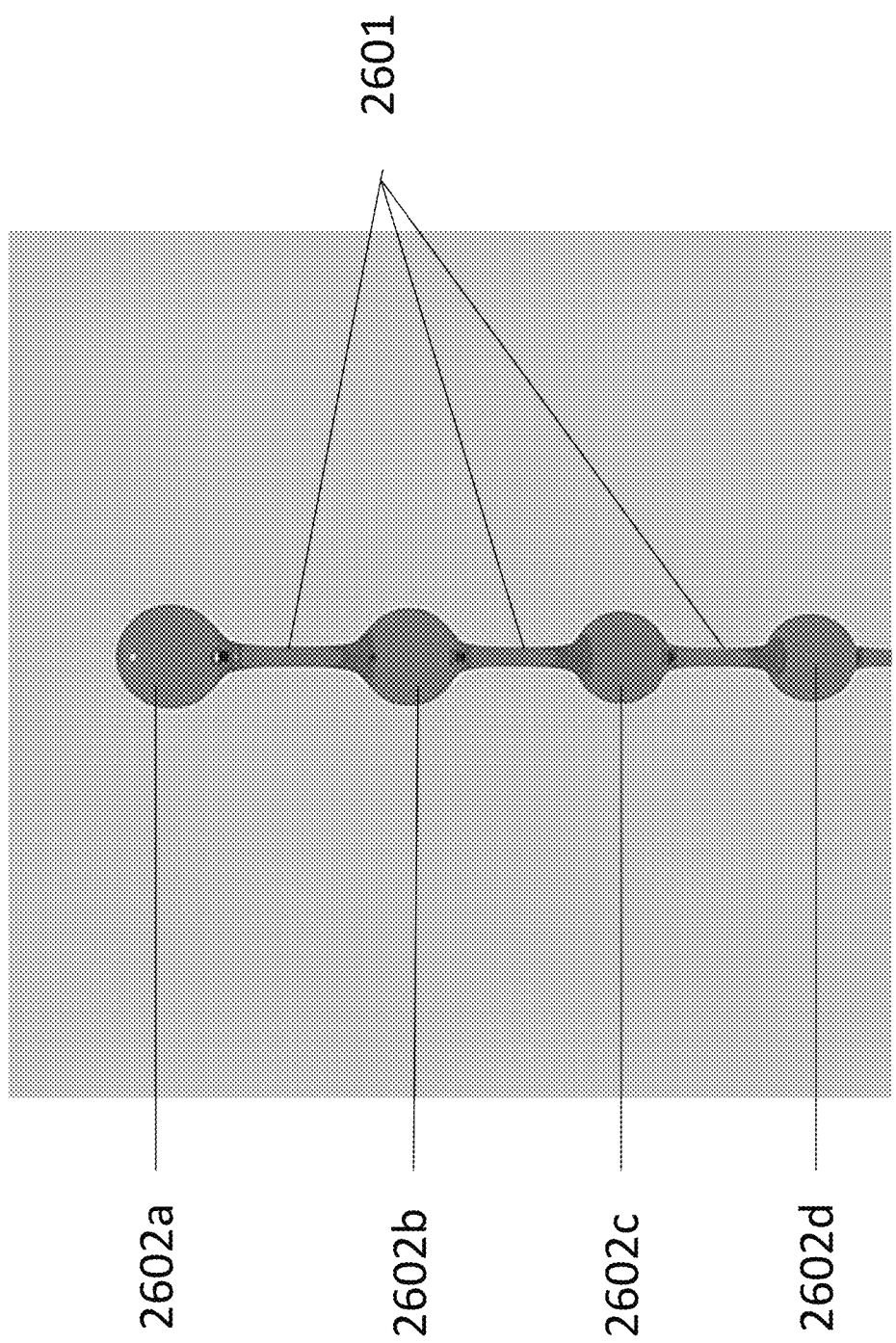
FIG. 26 illustrates an exemplary variation of a method for making individual WGM resonators for a WGM resonator array along a single fiber.

FIG. 26 illustrates an exemplary variation of a method of making individual WGM resonators for a WGM resonator array along a single optical fiber 2601. The optical fiber 2601 may comprise any suitable optically transparent material. Each WGM resonator for a WGM resonator array may be fabricated using a reflow process such as using one or more methods described above with respect to FIGS. 20-22. Similar to that shown in FIG. 25, target locations on the optical fiber 2601 may be subjected to heat (simultaneously or one after another). The reflow process generates the substantially curved portions (e.g., portions 2602a-2602d) of the WGM resonators.

Following the fabrication of the substantially curved portion for each individual WGM resonator using the methods described above with respect to FIG. 25 or FIG. 26, the optical fiber and/or the capillary tube may be cleaved at specific locations to produce each individual WGM resonator. For example, the optical fiber and/or the capillary tube may be cleaved such that each individual WGM resonator may include the substantially curved portion and the stem portion. Alternatively, the optical fiber and/or the capillary tube may be cleaved such that each individual WGM resonator may include only the substantially curved portion.

In some variations, each of multiple WGM resonators in a WGM resonator array may be fabricated individually using the method discussed above with respect to FIG. 23 and/or FIG. 24. For example, multiple WGM resonators may be fabricated from multiple respective optical fibers and/or capillary tubes, rather than collectively from a single optical fiber or capillary tube. Each of the fabricated WGM resonators may be arranged together to form a WGM resonator array (e.g., any suitable arrangement such as arrangements shown in FIGS. 12-19).

Figure 27:
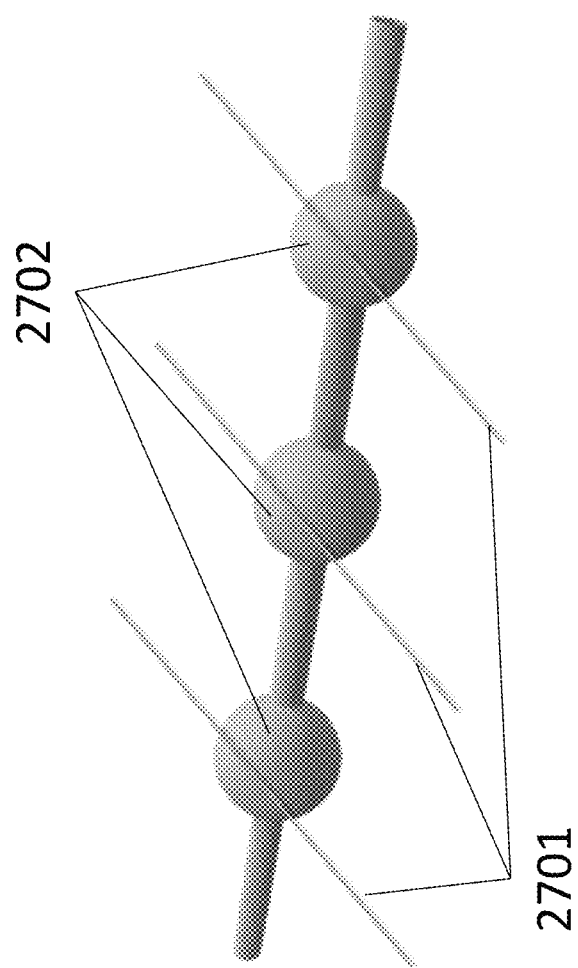
FIG. 27 is a schematic description of an exemplary variation of a method of fabricating a WGM microbubble resonator array and coupling the WGM microbubble resonators to an optical waveguide.

As discussed above, each WGM resonator in a WGM resonator array may be optically coupled to one or more waveguides. FIG. 27 is a schematic description of an exemplary variation of a method of fabricating a WGM microbubble resonator array and coupling the WGM microbubble resonators to an optical waveguide. The WGM microbubble resonator array 2702 can be fabricated from a single capillary tube and include multiple WGM microbubble resonators in a linear arrangement. In other words, multiple WGM microbubble resonators can be formed in series along a single capillary tube (e.g., method described in FIG. 25). For example, the capillary tube can be heated at multiple locations where the resonators in WGM microbubble resonator array 2702 are desired to be positioned. Furthermore, multiple instances of the WGM microbubble resonator array 2702 can be combined (e.g., in parallel) to form a WGM microbubble resonator array. As shown in FIG. 27, each optical waveguide in a set of multiple optical waveguides 2701 can then be aligned to a respective WGM microbubble resonator in the WGM microbubble resonator array 2701 so as to optically couple the optical waveguides 2701 to the WGM microbubble resonators. Additionally or alternatively, two or more WGM microbubble resonators in the WGM microbubble resonator array 2702 can be aligned to a single optical waveguide (e.g., similar to that shown in FIGS. 13-15).

Attenuating Higher Order Modes in WGM Resonators

As discussed above, numerous modes can be excited in a WGM resonator starting from a fundamental mode confined to an equatorial plane in WGM resonators that include a spherical portion to higher order modes that extend in polar and radial directions in WGM resonators that include a spherical portion. Each mode with different spatial distribution may have different bandwidth and sensitivity. For example, the fundamental mode has broader bandwidth than higher order modes. Accordingly, it may be advantageous to eliminate higher order modes for sensing applications so as to increase the Q factor and sensitivity of the WGM resonators.

Figure 28:
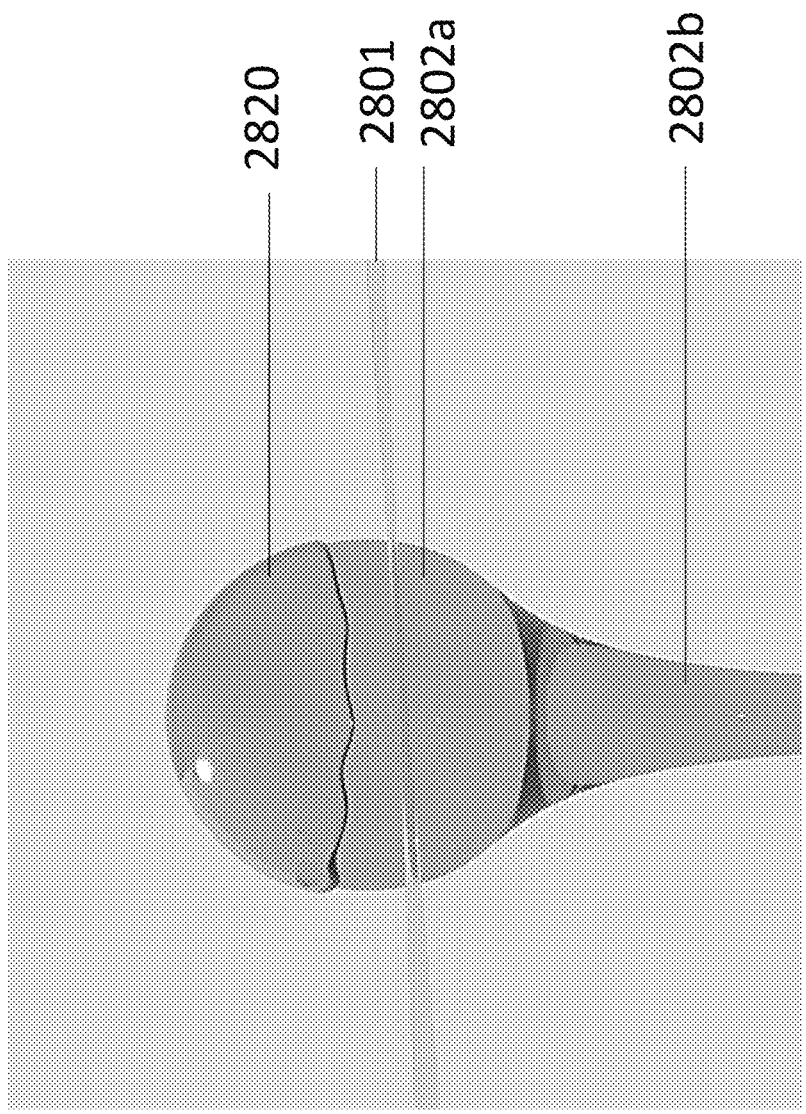
FIG. 28 illustrates an exemplary variation of a WGM microsphere resonator with polymer coating.

One way to attenuate higher order modes may include applying a coating of a polymer on the substantially curved portion of the WGM resonator. FIG. 28 illustrates an exemplary variation of a WGM microsphere resonator with polymer coating 2820. A WGM microsphere resonator may include a spherical portion 2802*a* and a stem portion 2802*b*. Polymer coating 2820 may be applied on the spherical portion 2802*a* of the WGM microsphere resonator. The polymer coating 2820 may be applied on the outer surface of the spherical portion 2802*a* of the WGM microsphere resonator. For example, the polymer coating 2820 may cover almost half of the circumference of the spherical portion 2802*a*, thereby partially coating the WGM microsphere resonator. Partially coating the WGM microsphere may attenuate higher order modes. Put differently, the operating frequency of the WGM microsphere may be limited to the fundamental mode (mode confined to the equatorial plane of the WGM microsphere).

An optical waveguide 2801 may be coupled with the WGM microsphere resonator. In some variations, the optical waveguide 2801 may be coupled with the WGM microsphere resonator before the application of the polymer coating 2820. In some variations, the polymer coating 2820 may comprise an optically transparent liquid photopolymer with high viscosity. Additionally, the polymer coating 2820 may include adhesive properties. In some variations, the refractive index of the polymer coating may be higher than the refractive index of the WGM microsphere resonator. For example, the refractive index of the polymer coating may be higher than 1.5. In some variations, the polymer coating 2820 may comprise Norland Optical Adhesive 68 ("NOA68").

In some variations, the polymer coating 2820 may be applied at the highest point/top-most point (e.g., zenith) of the spherical portion 2802*a*. In some variations, the polymer coating 2820 may be applied on a spherical cap of a considerably small height located at the top-most part of the spherical portion 2802*a*. For example, the polymer 2820 coating may be poured onto the highest point. The polymer coating 2820 may flow downward from the highest point to the lower regions of the spherical portion 2802*a*, thereby covering a spherical cap of the spherical portion 2802*a*. Due to its high viscosity, the polymer coating 2820 takes time to flow towards the lower regions of the spherical portion 2802*a*. When the polymer coating 2820 covers a suitable amount of the circumference of the spherical portion 2802*a* (e.g., a spherical cap with base that is at a suitable distance from the equatorial plane), the polymer coating 2820 may be cured (e.g., using ultraviolet light). For example, when the polymer coating 2820 covers nearly half the circumference of the spherical portion 2802*a*, the polymer coating 2820 can be cured. The time to cure the polymer coating 2820 may be dependent on a thickness of the polymer coating 2820, intensity of the ultraviolet light used for curing etc.

Consider that the polymer coating covers a spherical cap of the WGM resonator. The base of the spherical cap may be at a distance d from the equatorial plane. In order to limit the excitation of WGM in the resonator to the fundamental mode, the value for d may, in some variations, be between about 3 μm and about 15 μm.

Figure 29:
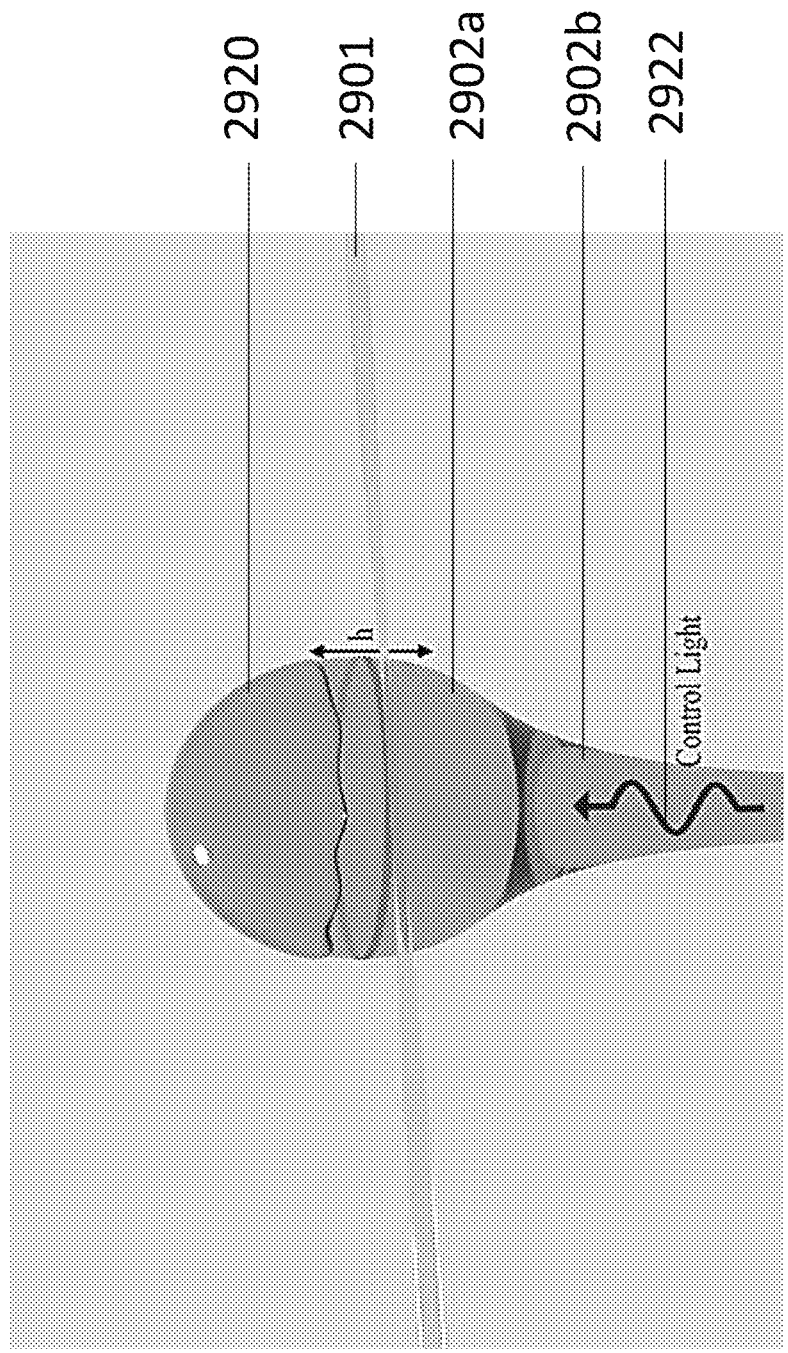
FIG. 29 illustrates an exemplary variation of a method of attenuating higher order modes.

FIG. 29 illustrates an exemplary variation of a method of attenuating higher order modes. Once a polymer coating 2920 is applied such that it covers a suitable amount of area on the circumference of a spherical portion 2902*a* of a WGM microsphere resonator, a control light 2922 may be transmitted to the spherical portion 2902*a* through the stem portion 2902*b* of the WGM microsphere resonator. The polymer coating 2920 may absorb power from the control light 2922. In some variations, the amount of power that the polymer coating 2920 absorbs from the control light 2922 may depend on the material(s) included in the polymer coating 2920. For example, the polymer coating 2920 may comprise material(s) that can absorb high amount of power from the control light 2922 (e.g., more than 50 percent, more than about 60 percent, more than about 70 percent, more than about 80 percent, or more than about 90 percent). This strong absorpotion of power from the control light 2922 may introduce loss to high-order modes that overlap with the polymer coating 2920.

This may change the temperature of the polymer coating, thereby changing the resonant frequencies of the WGM microsphere resonator. For example, the change in temperature may depend upon the power of the control light 2922, thermo-optic coefficient of the polymer coating 2920, and the material of the WGM microsphere resonator. The change in temperature of the polymer coating 2920 may cause a shift in the resonant frequency of the WGM microsphere resonator due to thermo-optic effects.

Figure 30:
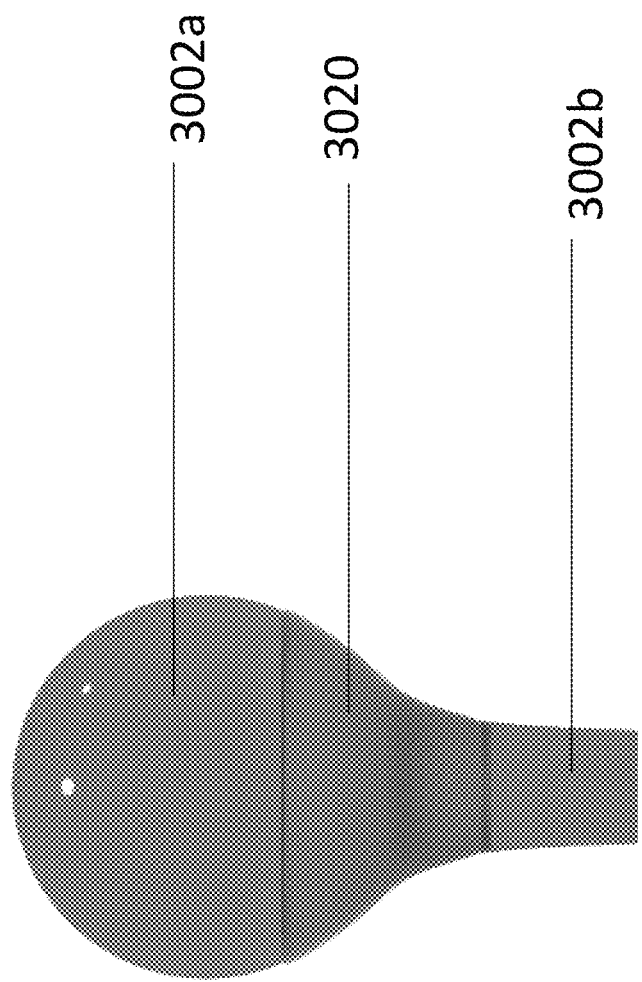
FIG. 30 illustrates an exemplary variation of a WGM microsphere resonator with polymer coating.
Figure 31:
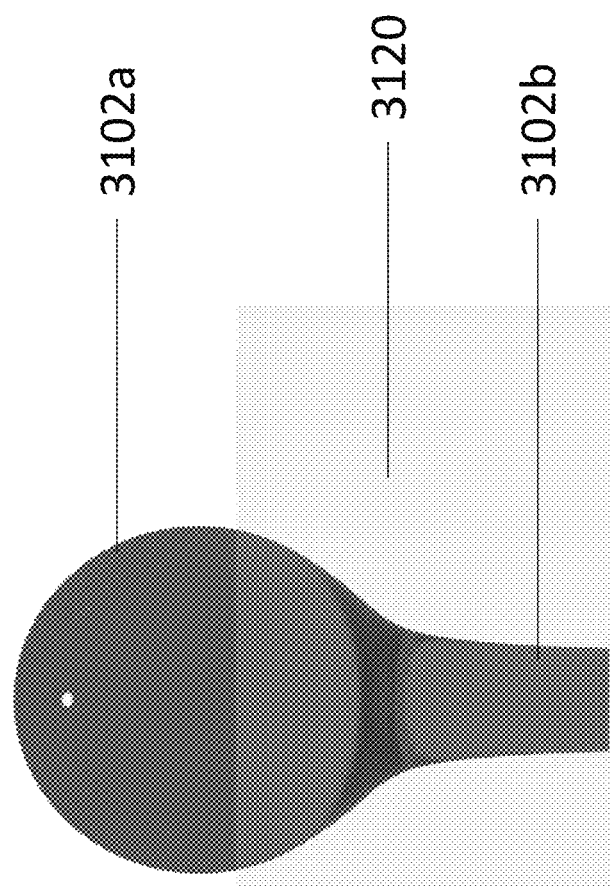
FIG. 31 illustrates an exemplary variation of a method of submerging a WGM microsphere resonator in a polymer to attenuate higher order modes.

In some variations, a polymer coating 3020 may be applied to both the spherical portion 3002*a* and the stem portion 3002*b* of a WGM microsphere resonator as shown in FIG. 30. For example, the polymer coating 3020 may be applied to almost half the circumference of the spherical portion 3002*a* and to at least some part of the stem portion 3002*b*. In some variations, the WGM microsphere resonator may be submerged in a pool of polymer coating 3120 as shown in FIG. 31. The effective thickness of the microsphere resonator may be controlled by submerging the appropriate region of the stem portion 3120*b* into the pool of polymer coating 3120.

Encapsulating Coupled WGM Resonators in Polymer Structure

A fabricated WGM resonator and/or WGM resonator array and one or more optical waveguides may be encapsulated in a polymer structure. In one variation, the optical waveguide may be embedded in a polymer structure and then a WGM resonator may be embedded in the polymer structure such that the optical waveguide optically couples with the WGM resonator. Alternatively, the WGM resonator may be embedded in a polymer structure and then the optical waveguide may be embedded in the polymer structure such that the optical waveguide optically couples with the WGM resonator. In another alternative variation, the optical waveguide and the WGM resonator may be optically coupled together. Following the optical coupling, the coupled waveguide and WGM resonator may be embedded in the polymer structure.

FIG. 32A is a schematic description of an exemplary method of encapsulating WGM resonator 3202a and/or an optical waveguide 3201a in a polymer structure to produce a packaged WGM resonator. The polymer structure can include a backing region 3210a and/or a matching region 3208a. In some variations, the backing region 3210a and/or the matching region 3208a can be layers deposited on a substrate 3206, as described in further detail below.

The method of packaging the WGM resonator 3202a can include cleaning the surface of a substrate 3206a such as, for example, silicon, silica, quartz, plastic, or any other material suitable to serve as a substrate of a sensing device. A suitable material to serve as substrate 3206a can include a damping material to eliminate a residual vibration and minimize ultrasound echoes within the WGM resonator 3202a. With reference to FIG. 32A, the substrate 3206a can then be coated with a set of one or more coating materials including the backing polymer 3210a. The backing polymer 3210a can be a damping material such as a polymer material with a low refractive index configured to obtain a broad whispering gallery mode (WGM) frequency response while having high ultrasound attenuation to prevent reverberation of a set of ultrasound echoes that the WGM resonator 3202a is designed to sense. In some variations, acoustic impedance of the damping material of the backing polymer 3210a can, for example, match with that of the layer of matching polymer 3208a utilized for packaging the WGM resonator 3202a as further described below.

As shown in FIG. 32A, one or more optical waveguides 3201a, such as an optical fiber or an integrated photonic waveguide, can be placed in the backing polymer 3210a. The optical waveguide can be an optical fiber receiving a light from a light source, an integrated photonic waveguide that is receiving the light from an on-chip light source, an integrated photonic waveguide that is coupled to the optical fiber that propagates the light from the light source, or any other suitable medium to propagate a light from a light source to a coupling point from the WGM resonator. In some variations, the one or more optical waveguide 3201a can be placed in the backing polymer 3210a before curing the backing polymer 3210a. Placing the one or more optical waveguides 3201a on an uncured backing polymer can result in the one or more optical waveguides to become embedded in the backing polymer 3210a. After placement of the one or more optical waveguides 3201a, the backing polymer 3210a may be cured, such as by baking the backing polymer 3210a at a preset temperature.

The method of packaging the WGM resonator 3202a can further include placing the WGM resonator 3202a proximate one or more optical waveguides 3201a so as to optically couple the WGM resonator to at least one optical waveguide. For example, the WGM resonator 3202a and an optical waveguide 3201a may be positioned such that the optical waveguide is aligned to the largest diameter of the WGM resonator. In one example, the WGM resonator 3202a can have an elliptical shape, and the largest circular diameter of the WGM resonator 3202a can be aligned to the one or more optical waveguides 3201a. Although the method of packaging the WGM resonator is primarily described with placement of the optical waveguide(s) prior to the WGM resonator, it should be understood that in some variations, the WGM resonator may be placed prior to the optical waveguide(s).

Referring to FIG. 32A, the method of packaging the WGM resonator 3202a can further include coating the WGM resonator 3202a, the backing polymer 3210a, and/or the substrate 3206a with a matching polymer 3208a. The matching polymer can be configured to promote ultrasound transmission from the medium in which the ultrasound sensor (embodying the WGM resonator(s)) is in contact. For example, the layer of matching polymer 3208a can be a polymer material with a low refractive index to reduce impedance of transmission of the set of ultrasound echoes to the WGM resonator 3202a. The matching polymer 3208a can have a lower refractive index compared to a refractive index of the WGM resonator 3202a and a refractive index of the one or more optical waveguides 3201a. The method of packaging the WGM resonator 3202a can include curing the layer of matching polymer.

Although the exemplary schematic of FIG. 32A depicts an optical waveguide 3201a as embedded in the backing polymer, in some variations, an optical waveguide may be in the matching polymer. For example, as shown in FIG. 32B, one or more optical waveguides 3201b may be placed on top of the backing polymer 3210b after curing the backing polymer 3210b and before the WGM resonator 3202b, the backing polymer 3210b, and/or the substrate 3206b is coated with a matching polymer 3208b, such that the optical waveguide 3201b is embedded in the matching polymer instead of the backing polymer. Furthermore, in some variations, an optical waveguide may be partially embedded in the backing polymer and partially embedded in the matching polymer (e.g., approximately half of its cross-sectional area in the backing polymer, and approximately half of its cross-sectional area in the matching polymer). Even further, it should be understood that in device embodiments having multiple optical waveguides in polymer, a portion of the optical waveguides may be wholly or partially embedded in the backing polymer, while another portion of the optical waveguides may be wholly or partially embedded in the matching polymer in any suitable combination.

In some embodiments, the packaged WGM resonators 3202a, 3202b can be used as an ultrasound sensor in the form generally shown in FIGS. 32A and 32B. However, alternatively, in some variations, the method of packaging the WGM resonator can include pre-coating the substrate with a release agent (e.g., polyvinyl alcohol, polyacrylic acid, polystyrene, fluorosilanes, self-assembled monolayers, OmniCoat, several types of photoresists such as the AZ-series, and/or the like) before coating the substrate with the backing polymer such that the substrate can be released from the rest of the packaged WGM resonator. Removal of the substrate can, for example, help to reduce the amount of reverberation of the set of ultrasound echoes that the WGM resonator is designed to sense.

Sensing Applications

WGM resonator and resonator arrays, such as those described herein, can be used in an ultrasound sensor device such as an acousto-optic sensor device. One or more elements in the acousto-optic sensor device may be configured to generate a set of ultrasound signals. Some non-limiting examples of these element(s) may include piezoelectric sensor, single crystal material sensor, piezoelectric micromachined ultrasound transducer (PMUT), capacitive micromachined ultrasound transducer sensor (CMUT), and/or the like. The ultrasound signals may induce at change in the refractive index and/or the physical structure of the WGM resonator(s). Such a change can be measured as described further in the description accompanying FIGS. 33-38.

Figure 33:
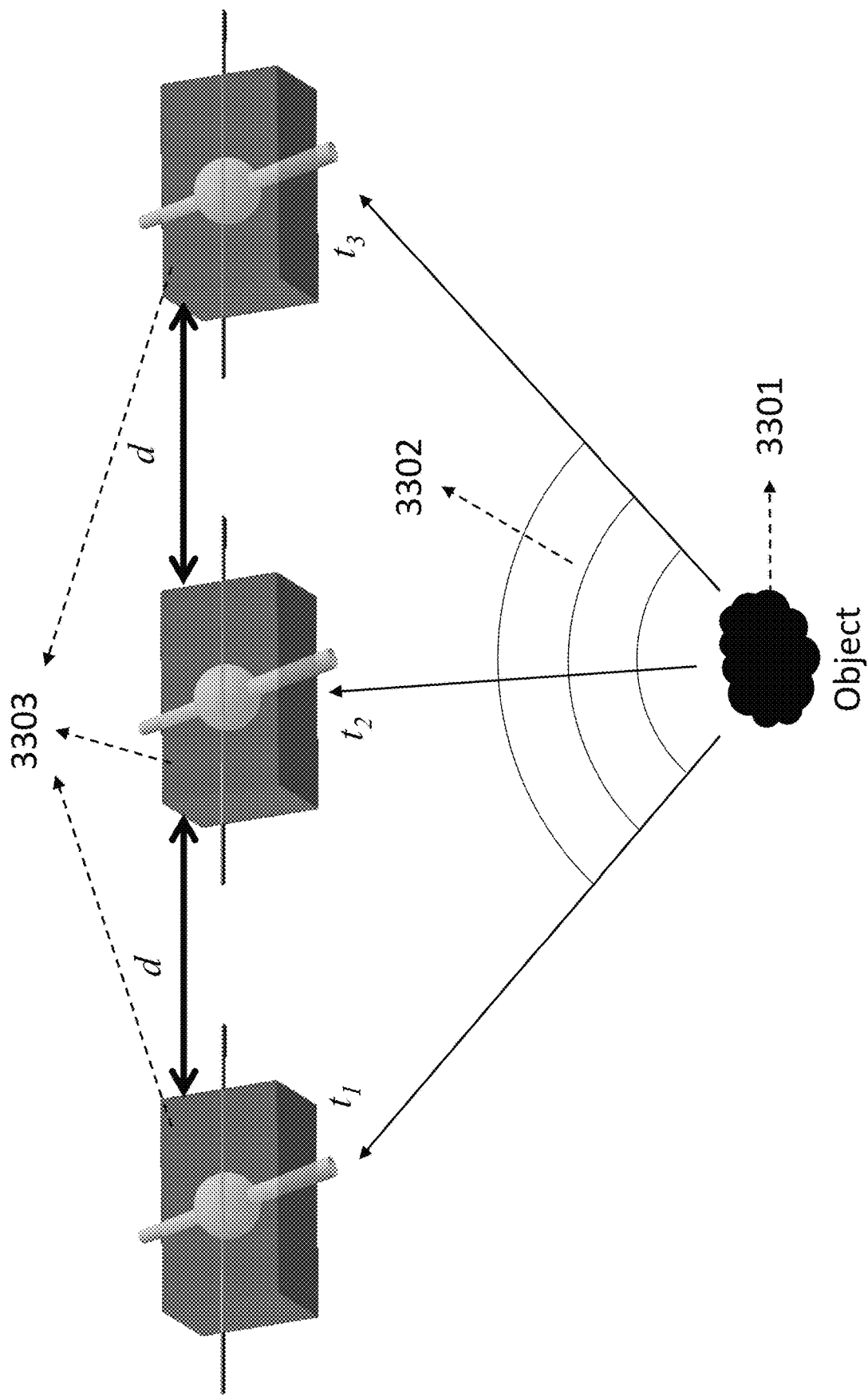
FIG. 33 is a schematic description of an exemplary method of sensing a set of ultrasonic echoes using a WGM resonator array.

FIG. 33 is a schematic description of sensing ultrasonic echo using an acousto-optic sensor device 3303. The acousto-optic sensor device 3303 includes a WGM resonator array. Although the WGM resonators are shown as linearly arranged at a predetermined distance d from each other, it should be understood that in some variations at least some of the resonators may be arranged at different distances from each other. The WGM resonator array can be configured to be optically coupled to one or more optical waveguides that propagate light from a light source. The light source can be a broadband light source, a tunable laser source, an optical frequency comb (OFC) laser source using either a digital modulating method or using a Kerr four-wave mixing (FWM) method, or any other light source suitable for the operation frequency band of the acousto-optic sensor device 3303. The light can be coupled to WGM resonator array to propagate a first set of whispering gallery modes (WGMs) around the wall of the circumference of each WGM resonator from the WGM resonator array. Propagation of the first set of WGMs results in generation of a first set of optical signals corresponding to a first set of resonant frequencies of the WGMs.

In use, the acousto-optic sensor device 3303 can be configured to receive a set of ultrasound echoes 3302 generated and/or reflected from an object 3301. The set of ultrasound echoes may have varying travel times ($t_1$, $t_2$, $t_3$, etc.) to the individual WGM resonators. That is, ultrasound echoes from the same object will reach each sensor in the array at slightly different times. With known distances between each sensor and these measured slight delays, the object's position is better calculated (e.g., with better spatial resolution). The set of ultrasound echoes can induce a set of changes to the radius and/or the refractive index of the WGM resonator material, and/or the refractive index of an ultrasonic enhancement material in the WGM resonator. The set of changes can propagate a second set of WGMs around the wall of the circumference of each WGM resonator from the WGM resonator array. Propagation of the second set of WGMs results in generation of a second set of optical signals corresponding to a second set of resonant frequencies of the WGMs. The first set of optical signals and the second set of optical signals can be configured to propagate in the one or more optical waveguides to an optical detector. The optical detector can be connected to a compute device to detect a difference between the first set of optical signals and the second set of optical signals.

Figure 34:
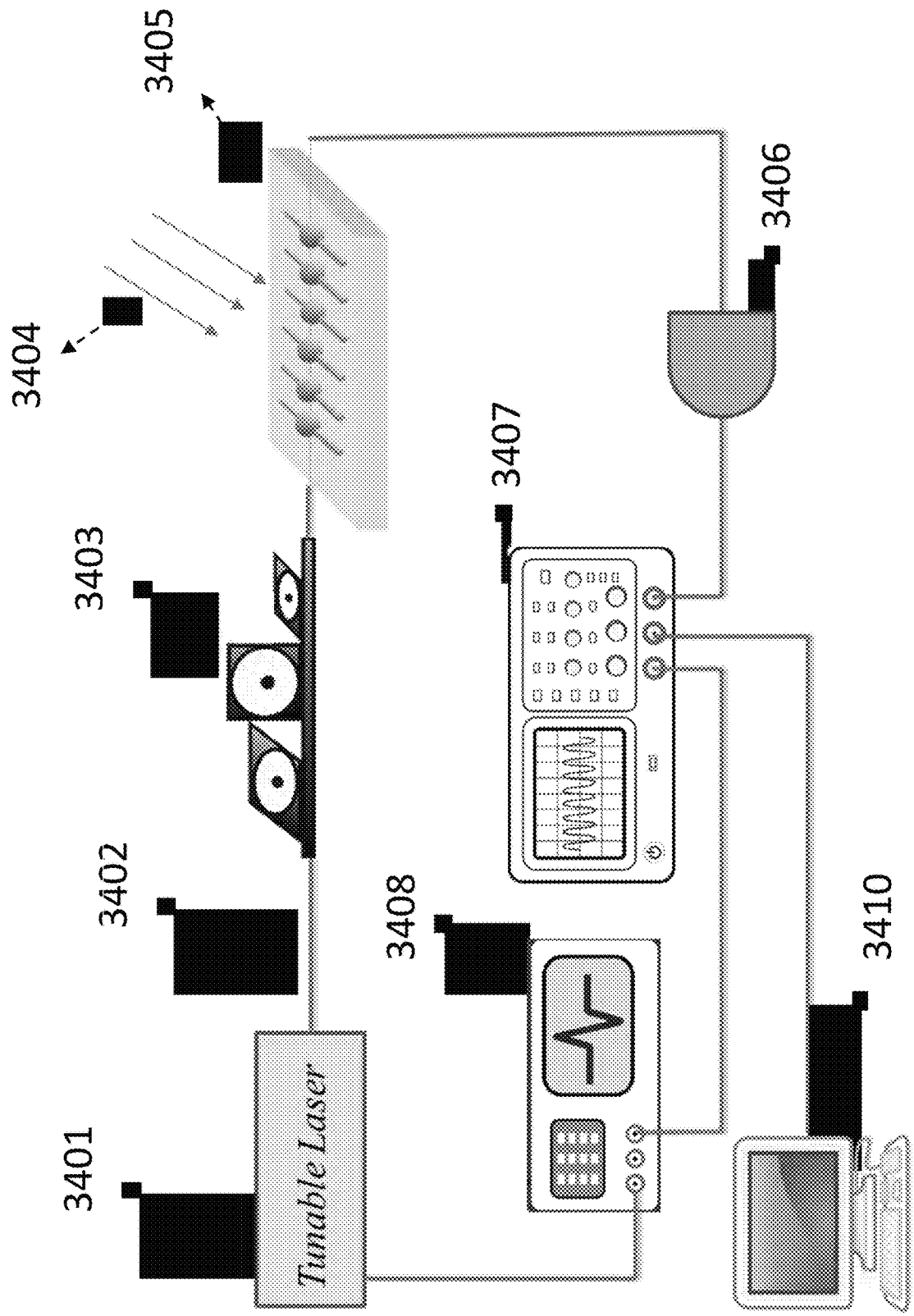
FIG. 34 is a schematic description of an exemplary method of measuring optical response of WGM resonator array.

FIG. 34 depicts an exemplary measurement setup that can be used to process a set of signals from an acousto-optic sensor device 3405 that senses a set of ultrasonic echoes (also referred to herein as the "ultrasonic signal"). The measurement setup can include a broadband light source or a tunable laser 3401 propagating a light in an optical fiber 3402, a fiber polarization controller 3403 that can be configured to control the polarization of the light. The measurement setup can further include an acousto-optic sensor device 3405 that can be configured to propagate a first set of optical signals based on propagating a first set of whispering gallery modes (WGMs) in a WGM resonator array included in the acousto-optic device 3405. The acousto-optic sensor device 3405 can be configured to receive a set of ultrasonic signals 3404 and propagate a second set of optical signals based on propagating a second set of WGMs propagating in the WGM resonator array. The acousto-optic sensor device 3405 can be configured further to transmit the first set of optical signals and/or the second set of optical signals to the optical fiber 3402. The measurement setup can further include a photodetector (also referred to herein as "an optical detector") 3406 that receives the first set of optical signals and/or the second set of optical signals and converts them to a first set of electrical signals and/or a second set of electrical signals. The photodetector 3406 can be configured further to transmit the first set of electrical signals and/or the second set of electrical signals to an oscilloscope 3407 operatively connected to a computer device 3410 to process and analyze the first set of signals and/or the second set of signals. The oscilloscope 3407 can be configured further to transmit a set of analyzed signals to a function generator 3408. The function generator can be configured to generate and transmit a set of generation signals to the broadband light source or the tunable laser 3401 to control propagation of light in the optical fiber 3402.

Figure 35:
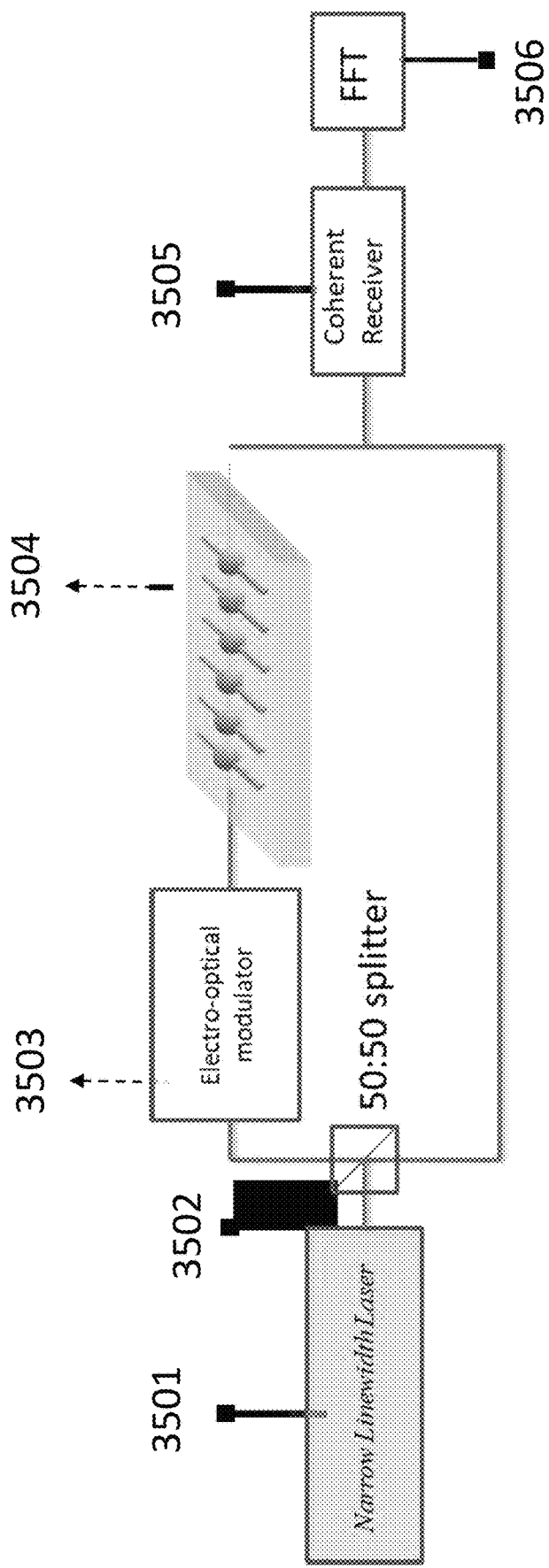
FIG. 35 is a schematic description of an exemplary method of measuring optical response of WGM resonator array.

FIG. 35 depicts an exemplary measurement setup that can be used to process a set of signals from an acousto-optic sensor device 3504 that senses a set of ultrasonic echoes. The measurement setup can include a laser 3501 such as, for example, an optical frequency comb (OFC) laser source generated using either a digital modulating method or using a Kerr four-wave mixing (FWM) method, or any other laser suitable for the operation frequency band of the acousto-optic sensor device 3504, to generate a laser light. The measurement setup can further include a beamsplitter 3502 such as, for example, a 50:50 beamsplitter, an 80:20 beamsplitter, or any other beamsplitter. The beam splitter can be configured to split the laser light to a first laser light and a second laser light. The measurement setup can be configured to direct the first laser light to an electro-optical modulator 3503 to generate and transmit a modulated laser light. The measurement setup can be configured further to direct the modulated laser light to the acousto-optic sensor device 3501 to generate a first set of signals corresponding to a first set of whispering gallery modes (WGMs). The acousto-optic sensor device 3501 can be configured to receive a set of ultrasound signals and generate a second set of signals corresponding to a second set of WGMs. The measurement setup can be configured further to direct the first set of signals, the second set of signals, and/or the second laser light to a coherent receiver 3505 to mix the second laser light with the first set of signals and/or the second set of signals and generate an electronic frequency signal. The measurement setup can be configured to transmit the electronic frequency signal to a Fast Fourier Transformation (FFT) module 3506 operatively connected to a compute device to process and analyze a difference between the first set of signals and the second set of signals. In one example, the OFC laser can generate a set of comb beams, and each comb beam from the set of comb beams can generate a data point to detect the difference between the first set of signals and the second set of signals. In this example one set of comb beams can generate a set of data points corresponding to the set of comb beams. In some embodiments, use of an OFC laser source can advantageously reduce sensing time from milliseconds to a sensing time on the order of microseconds.

Figure 36:
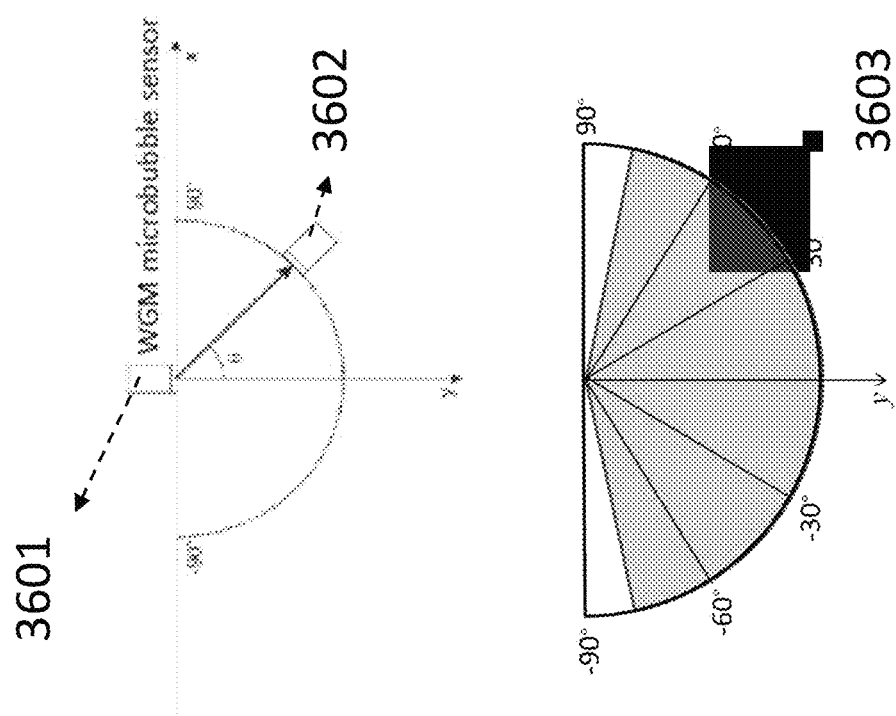
FIG. 36 is a diagram of optical response of an exemplary WGM resonator array.

FIG. 36 is a schematic description of optical response of an acousto-optic sensor device 3601. The acousto-optic sensor device 3601 can be configured to receive a set of ultrasound echoes from an object 3602 positioned at any angle and detect the ultrasound echoes using a set of WGM resonators (e.g., as described in further detail with respect to FIG. 34 and or FIG. 35). In one example, the acousto-optic sensor device 3601 can have an angle of detection 3603 of approximately 160 degrees. In other words, the acousto-optic device 3601 has a wider angle of detection than a conventional piezoelectric ultrasound sensor.

Ultrasound Probe

In some embodiments, a WGM resonator array such as those described herein may be included in an ultrasound probe (also referred to herein as "ultrasound system"). The ultrasound probe can include at least one optical waveguide to propagate a light. The ultrasound probe can further include multiple piezoelectric elements to generate a set of ultrasound signals. The ultrasound probe can further include multiple piezoelectric elements to receive a set of ultrasound echoes corresponding to the set of ultrasound signals. The ultrasound probe can further include multiple WGM resonators in a polymer structure, each WGM resonator configured to receive multiple ultrasound echoes and propagate a set of whispering gallery modes (WGMs). At least one WGM resonator is optically coupled to the at least one optical waveguide such that the WGM resonator is configured to communicate to the at least one optical waveguide a first set of signal corresponding to the first set of WGMs.

Figure 37:
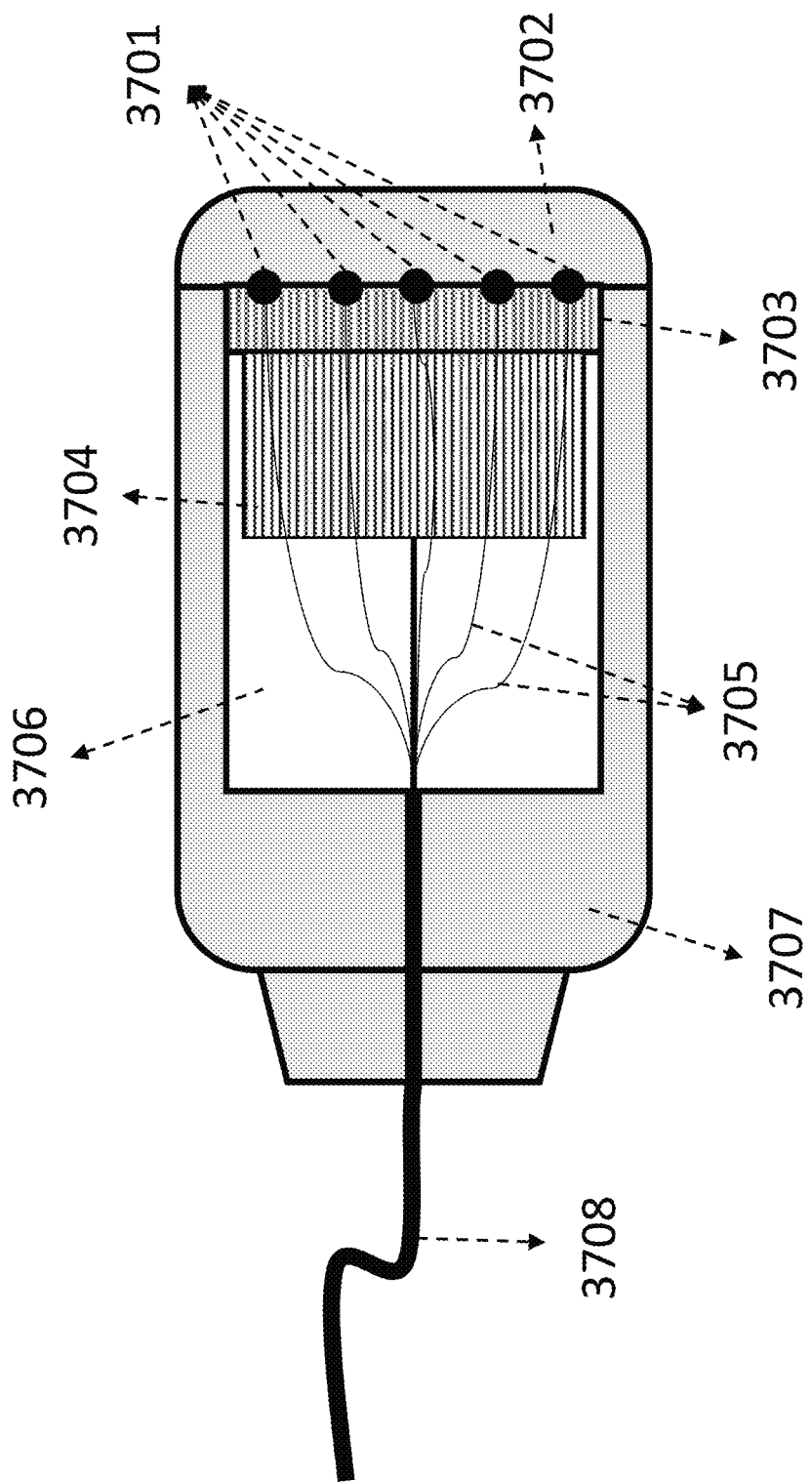
FIG. 37 is a schematic description of an exemplary ultrasound probe.
Figure 38:
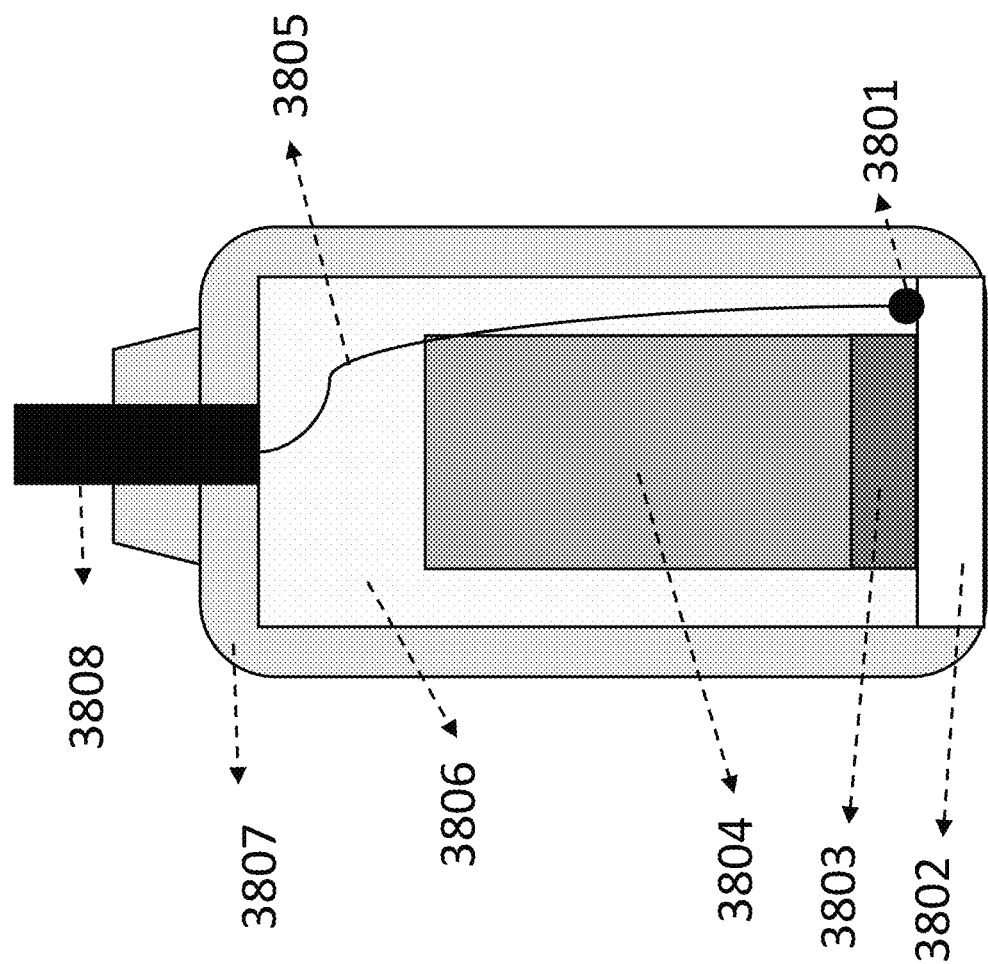
FIG. 38 is a schematic description of an exemplary ultrasound probe.

For example, FIG. 37 is a schematic description of an ultrasound probe, utilizing WGM resonators such as those described herein. FIG. 38 is a cross-sectional view of the probe depicted in FIG. 37. The ultrasound probe can include a WGM resonator array 3701, a matching layer 3702, a piezoelectric crystal array 3703, an electrical connection array 3704, a set of optical fibers 3705, a backing material 3706, an acoustic insulator 3707, and a cable 3708 connected to an ultrasound data acquisition. The ultrasound probe can be coupled to a control system, and a display, to perform an operation procedure as described in further detail herein. The backing material can include a damping material bonded to the back of the package of the probe to eliminate residual vibrations of operation environment, to improve portability, and to minimize echoes generated within the sensor structure.

The ultrasound probe can be configured to propagate a set of light from a light source to the set of WGM resonator array 3701 to generate a first set of optical signals corresponding to a first set of WGMs propagating in each WGM resonator in the WGM resonator array 3701. The piezoelectric crystal array 3703 can be configured to receive an electrical signal from the control system via the cable 3708 and the electrical connection array 3704 to generate a set of ultrasound signals towards an object such that a set of reflected ultrasound echoes are generated in a direction toward the ultrasound probe. The ultrasound probe can be configured further to generate a second set of optical signals corresponding to a second set of WGMs in the WGM resonator array 3701, after receiving the set of ultrasound echoes. The ultrasound probe can be optionally configured to receive the set of ultrasound echoes to generate a set of electrical signals. The ultrasound probe can be configured further to transmit the first set of signals and/or the second set of signals via the set of optical fibers 3705, and/or optionally transmit a set of electrical signals via the electrical connection array 3704 to the cable 3708 connected to the ultrasound data acquisition, the control system, or the display.

In some variations, the ultrasound probe, such as that as described above with respect to FIGS. 37 and 38, can be configured to repeat the operation procedure while scanning across a field of view by using a phased array of the piezoelectric crystal array. Doing so, will yield a line-by-line image using the piezoelectric crystal array and one low-resolution image in a lateral direction, for each WGM resonator array sensor. Known Synthetic Aperture (SA) algorithms can then be used to generate a high-resolution WGM resonator array sensor image.

Furthermore, in some embodiments, one or more of the piezoelectric elements can be configured to receive ultrasound echoes corresponding to the set of transmitted ultrasound signals, and generate sensor signals based on these received ultrasound echoes. For example, the sensor signals generated by the piezoelectric elements may supplement or be combined with the signals communicated by the WGM resonators in any suitable manner (e.g., to provide a multi-modal sensor image).

Additionally or alternatively, in some embodiments, the ultrasound probe, such as that described above with respect to FIGS. 37 and 38, can be configured to use different patterns of excitation such as, for example, using a piezoelectric crystal element or a group of piezoelectric crystals to transmit the ultrasound signal, while using all piezoelectric crystal elements in the piezoelectric crystal array to receive the set of ultrasound echoes, also known as Compressed Sensing (CS) method. The general approach of CS method is to form a linear model that represents the process of signal acquisition from an image (also known as a forward model) and to solve the linear equation to get the image.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

The invention claimed is:

1. An apparatus comprising:
   at least one optical waveguide;
   a plurality of whispering gallery mode (WGM) resonators, each WGM resonator configured to propagate a first set of whispering gallery modes (WGMs); and
   a polymer structure encapsulating the at least one optical waveguide and at least one WGM resonator of the plurality of WGM resonators, the polymer structure comprising a first layer that reduces high-order modes in the at least one WGM resonator and a second layer comprising a material having an acoustic impedance matching an acoustic impedance of the at least one WGM resonator,
   wherein the at least one WGM resonator is optically coupled to the at least one optical waveguide such that the at least one WGM resonator is configured to communicate to the at least one optical waveguide a first set of signals corresponding to the first set of WGMs.

2. The apparatus of claim 1, wherein the polymer structure comprises at least one of:
   a backing region configured to attenuate residual ultrasound echoes to prevent reverberation, and
   a matching region configured to increase a bandwidth of a WGM frequency response of the plurality of WGM resonators.

3. The apparatus of claim 2, wherein the matching region is further configured to improve ultrasound transmission to the plurality of WGM resonators.

4. The apparatus of claim 3, wherein at least one of the backing region and the matching region has a first refractive index lower than a second refractive index of the at least one optical waveguide.

5. The apparatus of claim 2, wherein the at least one optical waveguide is embedded in the backing region of the polymer structure.

6. The apparatus of claim 2, wherein the at least one optical waveguide is embedded in the matching region of the polymer structure.

7. The apparatus of claim 2, wherein the at least one WGM resonator is embedded in the matching region of the polymer structure.

8. The apparatus of claim 1, wherein an effective refractive index of the polymer structure is lower than a refractive index of the at least one WGM resonator.

9. The apparatus of claim 1, wherein the polymer structure comprises an ultrasonic enhancement material, comprising polyvinylidene fluoride, parylene, or polystyrene.

10. The apparatus of claim 1, wherein an effective acoustic impedance of the polymer structure matches the acoustic impedance of the at least one WGM resonator.

11. The apparatus of claim 1, wherein the at least one WGM resonator comprises at least one of a ring-shaped portion.

12. The apparatus of claim 1, wherein the at least one WGM resonator is configured to:
receive a plurality of ultrasound echoes; and
in response to the plurality of ultrasound echoes, propagate a second set of WGMs.

13. The apparatus of claim 12, wherein the at least one WGM resonator is further configured to communicate to the at least one optical waveguide a second set of signals corresponding to the second set of WGMs.

14. The apparatus of claim 13, further comprising an optical detector communicably coupled to the at least one optical waveguide, wherein the at least one optical waveguide is configured to propagate the first set of signals and the second set of signals to the optical detector.

15. A system comprising the apparatus of claim 12 and a plurality of array elements configured to generate a set of ultrasound signals, wherein the plurality of ultrasound echoes correspond to the set of ultrasound signals.

16. The system of claim 15, wherein the array elements comprise at least array element selected from the group consisting of: a piezoelectric sensor, a single crystal material sensor, a piezoelectric micromachined ultrasound transducer (PMUT), and a capacitive micromachined ultrasound transducer sensor (CMUT).

17. The apparatus of claim 1, wherein the at least one optical waveguide comprises an optical fiber or an integrated photonic waveguide.

18. The apparatus of claim 1, wherein the at least one optical waveguide is coupled to a light source.

19. The apparatus of claim 18, wherein the light source comprises a broadband light source or a tunable laser source.

20. The apparatus of claim 1, wherein the at least one WGM resonator comprises a hollow chamber.

21. The apparatus of claim 20, wherein the hollow chamber includes an ultrasonic enhancement material, comprising polyvinylidene fluoride, parylene, or polystyrene.

22. The apparatus of claim 1, each WGM resonator of the plurality of WGM resonators is optically coupled to the at least one optical waveguide.

23. The apparatus of claim 1, wherein the at least one optical waveguide comprises a plurality of optical waveguides, and each WGM resonator of the plurality of WGM resonators is optically coupled to a respective optical waveguide of the plurality of optical waveguides.

24. The apparatus of claim 1, wherein at least a portion of the WGM resonators are grouped in a linear arrangement.

25. The apparatus of claim 24, wherein the WGM resonators in the linear arrangement are equally spaced apart.

26. The apparatus of claim 24, wherein the WGM resonators in the linear arrangement are unequally spaced apart.

27. The apparatus of claim 1, wherein the plurality of WGM resonators are bundled in a circular arrangement.

28. The apparatus of claim 1, wherein at least a portion of the WGM resonators are equal sizes.

29. The apparatus of claim 1, wherein at least a portion of the WGM resonators are unequal sizes.

30. The apparatus of claim 1, wherein at least one portion of a WGM resonator of the plurality of WGM resonators is applied with a polymer coating.

31. The apparatus of claim 1, wherein the apparatus is configured to detect ultrasound echoes from an object using the plurality of WGM resonators, wherein the apparatus has an angle of detection of approximately 160 degrees.

32. A method of ultrasound imaging comprising:
receiving, from at least one optical waveguide, a first set of signals corresponding to a first set of whispering gallery modes (WGMs) propagating in a plurality of WGM resonators, wherein the at least one optical waveguide and the plurality of WGM resonators are in a polymer structure, the polymer structure comprising a first layer that reduces high-order modes in at least one of the WGM resonators and a second layer comprising a material having an acoustic impedance matching an acoustic impedance of at least one of the WGM resonators;
receiving, from the at least one optical waveguide, a second set of signals corresponding to a second set of WGMs propagating in the plurality of WGM resonators, the second set of WGMs propagating in response to the plurality of WGM resonators receiving a plurality of ultrasound echoes; and
detecting a set of differences between the first set of signals and the second set of signals.

* * * * *